(12) United States Patent
Ikeda et al.

(10) Patent No.: US 8,782,559 B2
(45) Date of Patent: Jul. 15, 2014

(54) APPARATUS AND METHOD FOR DISPLAYING A THREE DIMENSIONAL GUI MENU OF THUMBNAILS NAVIGABLE VIA LINKED METADATA

(75) Inventors: Takuo Ikeda, Tokyo (JP); Kazuto Mugura, Tokyo (JP)

(73) Assignee: Sony Corporation, Tokyo (JP)

( * ) Notice: Subject to any disclaimer, the term of this patent is extended or adjusted under 35 U.S.C. 154(b) by 956 days.

(21) Appl. No.: 12/029,720

(22) Filed: Feb. 12, 2008

(65) Prior Publication Data

US 2009/0007018 A1 Jan. 1, 2009

(30) Foreign Application Priority Data

Feb. 13, 2007 (JP) .................................. 2007-032583

(51) Int. Cl.
*G06F 3/048* (2013.01)

(52) U.S. Cl.
USPC ............ 715/825; 715/818; 715/836; 715/838

(58) Field of Classification Search
USPC ......... 715/700, 737, 866, 200, 234–235, 243, 715/764, 838, 848, 850–855, 818, 825, 715/836; 345/418, 467, 471–472, 530; 725/105, 109, 110; 707/999.001, 707/999.003, 999.005, E17.001, 58, 93–94
See application file for complete search history.

(56) References Cited

U.S. PATENT DOCUMENTS

| | | | | |
|---|---|---|---|---|
| 5,608,850 A | * | 3/1997 | Robertson ..................... | 345/427 |
| 5,812,134 A | * | 9/1998 | Pooser et al. ................. | 715/848 |
| 6,301,579 B1 | * | 10/2001 | Becker ................................. | 1/1 |
| 6,346,938 B1 | * | 2/2002 | Chan et al. ..................... | 345/419 |
| 6,373,488 B1 | * | 4/2002 | Gasper et al. ................. | 345/427 |
| 6,466,237 B1 | * | 10/2002 | Miyao et al. ................... | 715/838 |
| 6,523,048 B2 | * | 2/2003 | DeStefano ..................... | 715/234 |
| 6,629,097 B1 | * | 9/2003 | Keith ................................. | 1/1 |
| 6,734,884 B1 | * | 5/2004 | Berry et al. ..................... | 715/848 |
| 6,754,906 B1 | * | 6/2004 | Finseth et al. ................... | 725/45 |
| 6,918,096 B2 | * | 7/2005 | Hugh ................................ | 715/854 |
| 6,928,436 B2 | * | 8/2005 | Baudel ............................. | 1/1 |
| 6,948,123 B2 | * | 9/2005 | Endou et al. ................... | 715/700 |
| 6,973,628 B2 | * | 12/2005 | Asami ............................. | 715/838 |
| 7,137,075 B2 | * | 11/2006 | Hoshino et al. ................. | 715/848 |
| 7,382,374 B2 | * | 6/2008 | Majer et al. ..................... | 345/473 |
| 2002/0109680 A1 | * | 8/2002 | Orbanes et al. ................ | 345/418 |
| 2002/0176636 A1 | * | 11/2002 | Shefi ............................... | 382/285 |
| 2003/0081012 A1 | * | 5/2003 | Chang ............................. | 345/848 |
| 2003/0160832 A1 | * | 8/2003 | Ridgley et al. ................. | 345/854 |
| 2004/0143604 A1 | * | 7/2004 | Glenner et al. ................ | 707/200 |

(Continued)

FOREIGN PATENT DOCUMENTS

| | | |
|---|---|---|
| JP | 04-227529 | 8/1992 |
| JP | 08-263255 | 10/1998 |
| JP | 10-312391 | 11/1998 |
| JP | 10-312392 | 11/1998 |

(Continued)

*Primary Examiner* — Steven Sax
*Assistant Examiner* — Wilson Varga
(74) *Attorney, Agent, or Firm* — Finnegan, Henderson, Farabow, Garrett & Dunner, L.L.P.

(57) ABSTRACT

A display control apparatus includes a search unit for searching for a second content linked to a first content and a display control unit for controlling display of a search history of content search performed in accordance with one of a first image and a first character, each indicating the first content, one of a second image and a second character, each indicating the second content and link information linking the first content to the second content.

7 Claims, 85 Drawing Sheets

(56) References Cited

U.S. PATENT DOCUMENTS

| | | | |
|---|---|---|---|
| 2005/0210410 A1* | 9/2005 | Ohwa et al. | 715/821 |
| 2005/0237320 A1* | 10/2005 | Itoh et al. | 345/418 |
| 2005/0273730 A1* | 12/2005 | Card et al. | 715/853 |
| 2005/0283742 A1* | 12/2005 | Gusmorino et al. | 715/839 |
| 2006/0069997 A1* | 3/2006 | Hsieh et al. | 715/713 |
| 2006/0236251 A1* | 10/2006 | Kataoka et al. | 715/757 |
| 2007/0214169 A1* | 9/2007 | Audet et al. | 707/102 |

FOREIGN PATENT DOCUMENTS

| | | |
|---|---|---|
| JP | 2000-105772 | 4/2000 |
| JP | 2001-312516 | 11/2001 |
| JP | 2002-073664 | 3/2002 |
| JP | 2002-140369 | 5/2002 |
| JP | 2004-164331 | 6/2004 |
| JP | 2005-010854 | 1/2005 |
| JP | 2006-4292 | 1/2006 |
| JP | 2006-301872 | 11/2006 |

* cited by examiner

FIG. 18
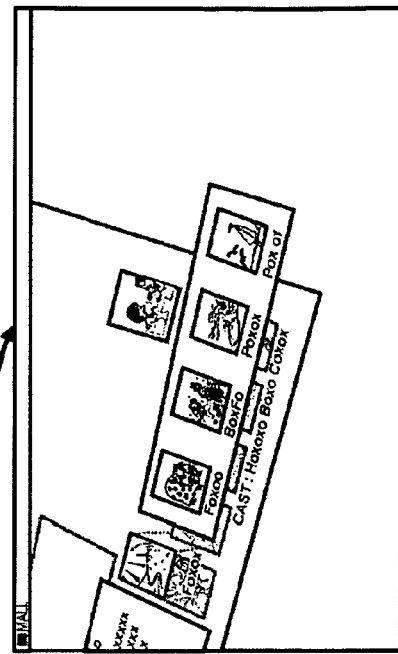
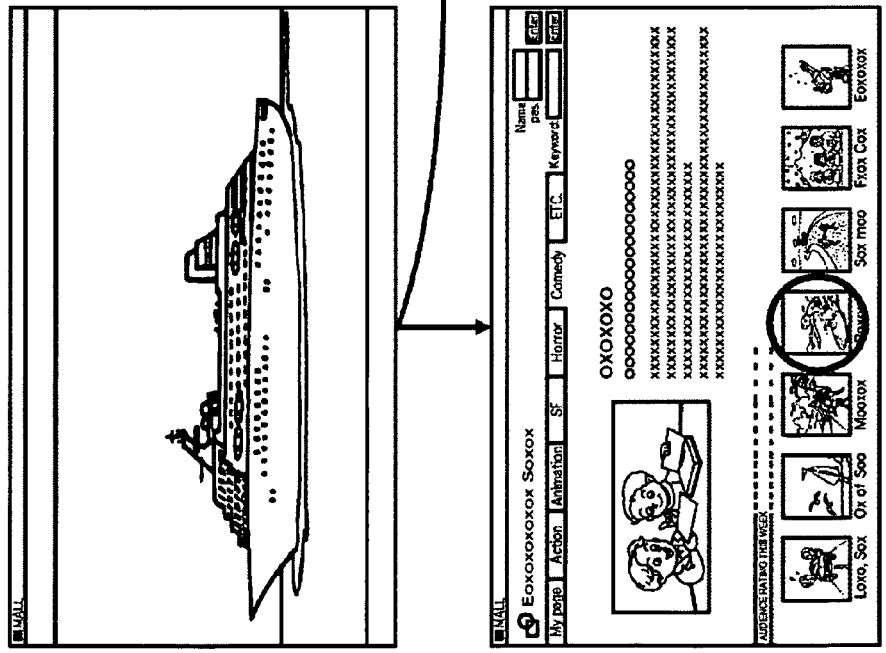

FIG. 21
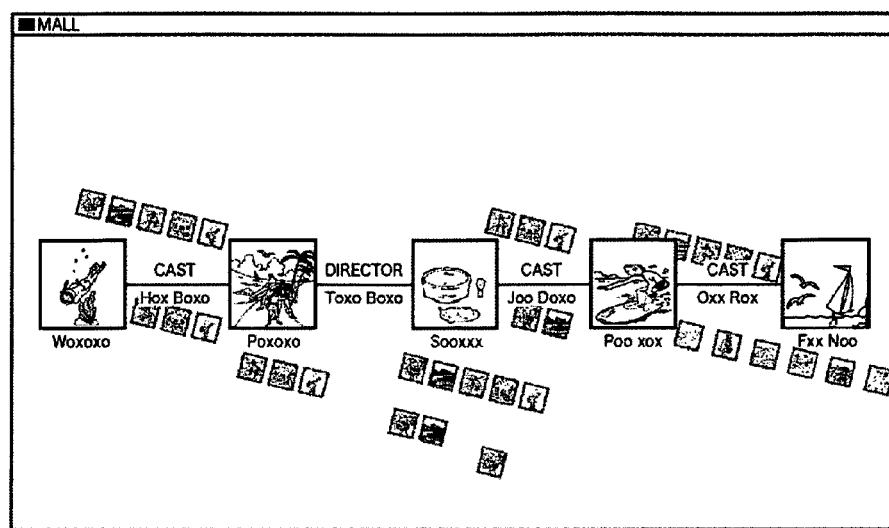
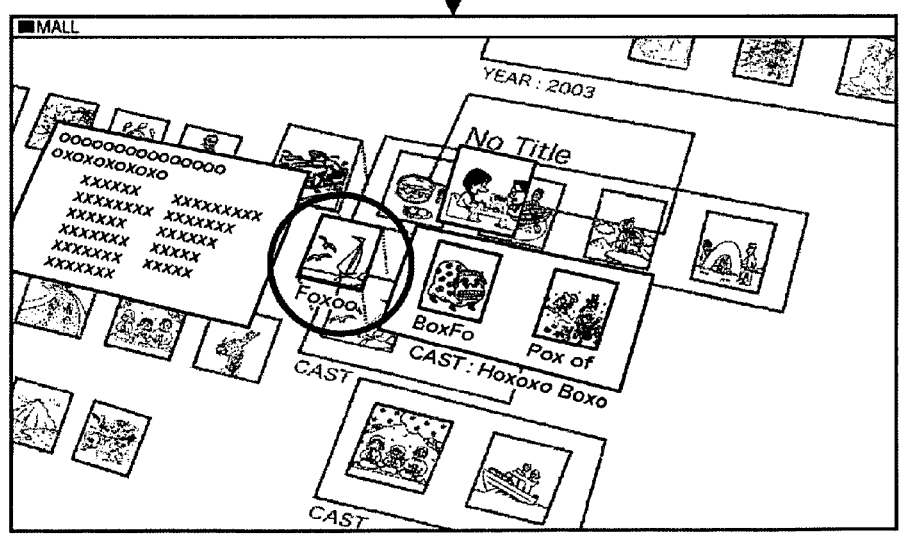

FIG. 34
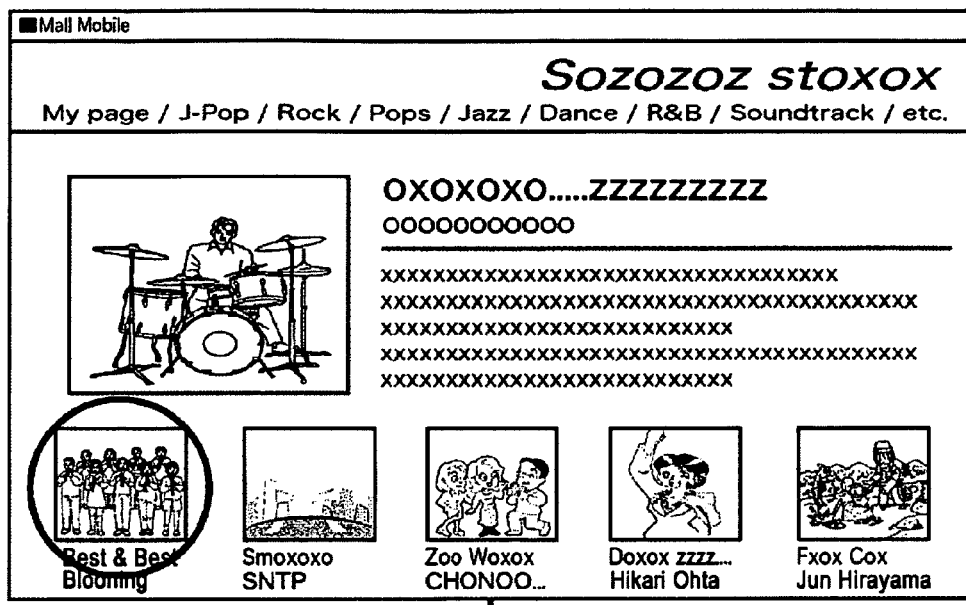
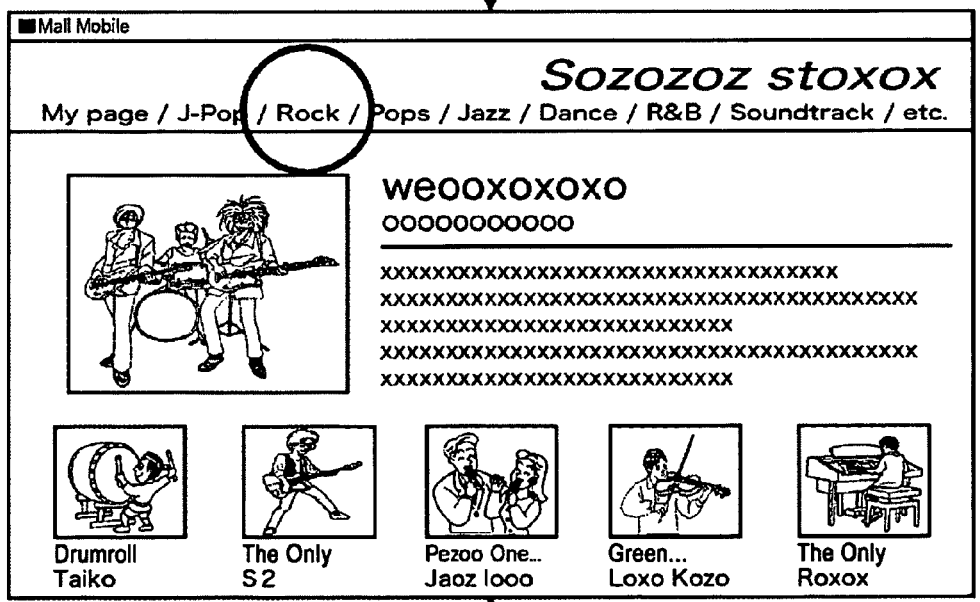

FIG. 36

■Mall Mobile

*Sozozoz stoxox*
My page / J-Pop / Rock / Pops / Jazz / Dance / R&B / Soundtrack / etc.

weooxoxoxo
ooooooooooo xxxxxxxxxxxxxxxxxxxxxxxxxxxxxx
xxxxxxxxxxxxxxxxxxxxxxxxxxxxxxxxxxx
xxxxxxxxxxxxxxxxxxxxxxxxxx
xxxxxxxxxxxxxxxxxxxxxxxxxxxxxxxxxx
xxxxxxxxxxxxxxxxxxxxxxxxx

| Drumroll Taiko | The Only S 2 | Pezoo One... Jaoz Iooo | Green... Loxo Kozo | The Only Roxox |

■Mall Mobile

XOXOXOXOXOXO zzzzzzzzz xxxxxxxxxxxxxxxxxxxxxxxxxxxx
xxxxxxxxxxxxxxxxxxxxxxxxxxxx
xxxxxxxxxxxxxxxxxxxxxxxxxxxx
xxxxxxxxxxxxxxxxxxxxxxxxxxxx xxxxxxxxxxxxxxxxxxxxxxxxxxx
xxxxxxxxxxxxxxxxxxxxxxxxxx
xxxxxxxxxxxxxxxxxxxxxxxxxxxx
xxxxxxxxxxxxxx FIG. 38
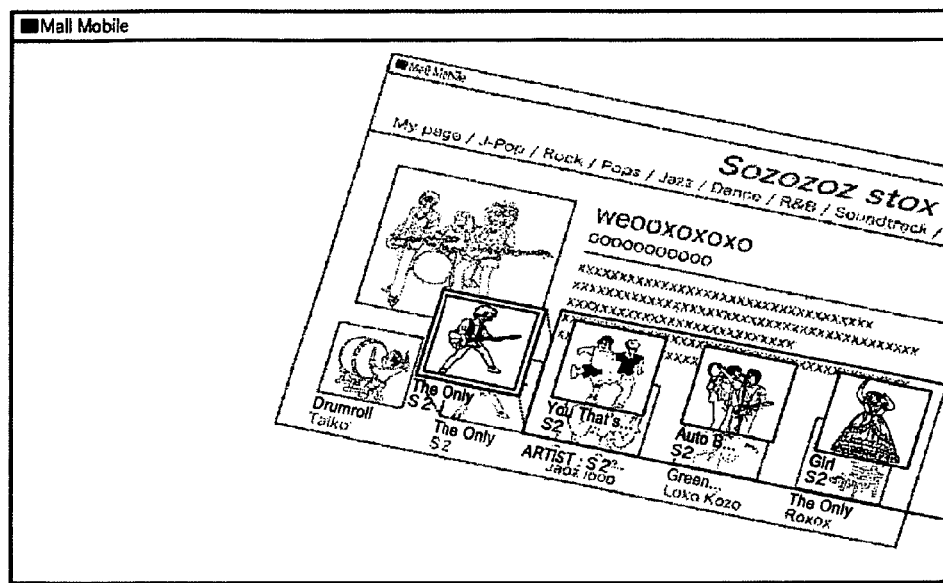
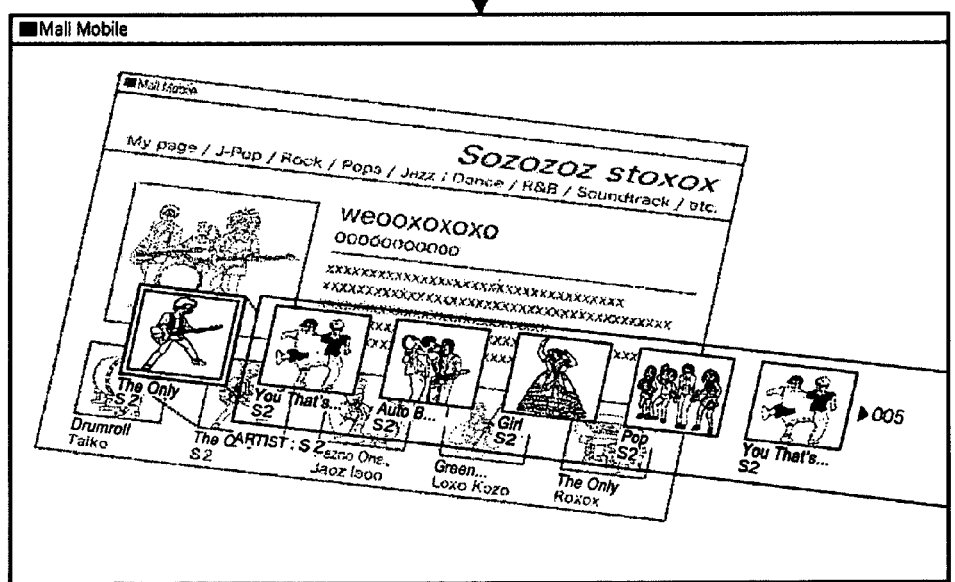

FIG. 40
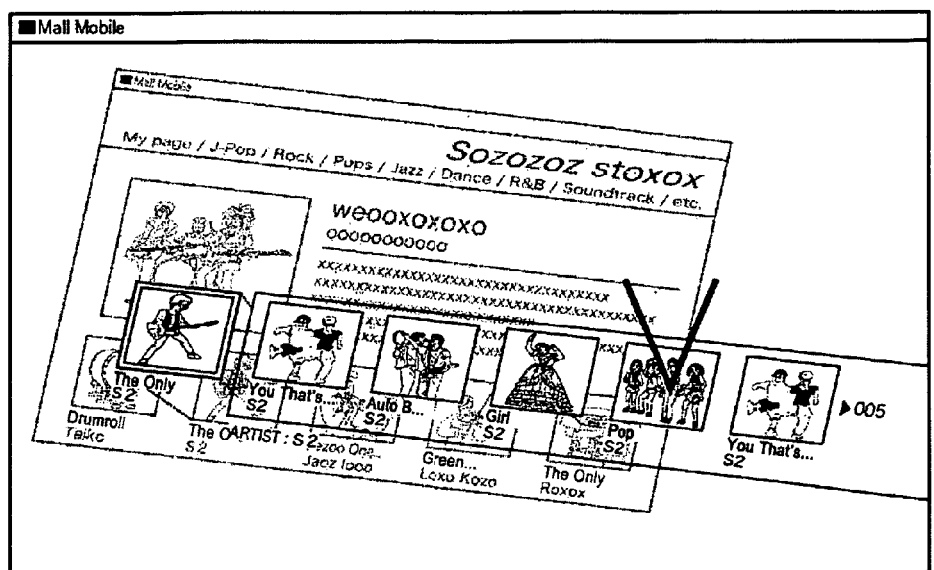
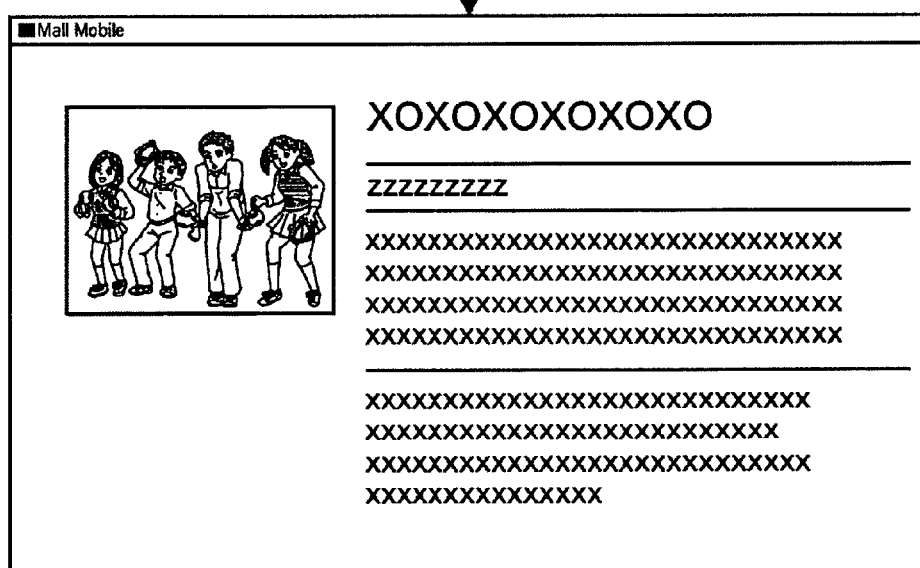

FIG. 44
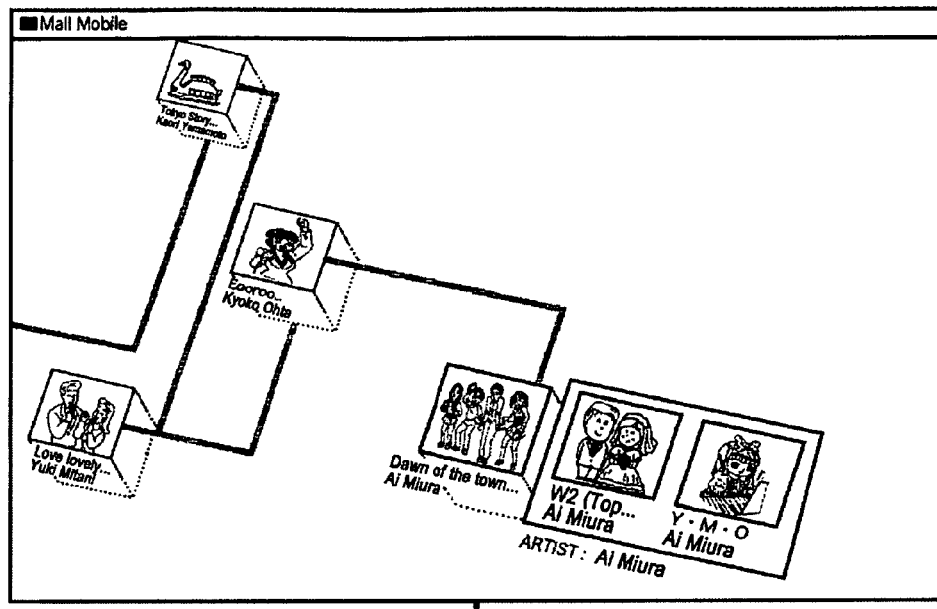
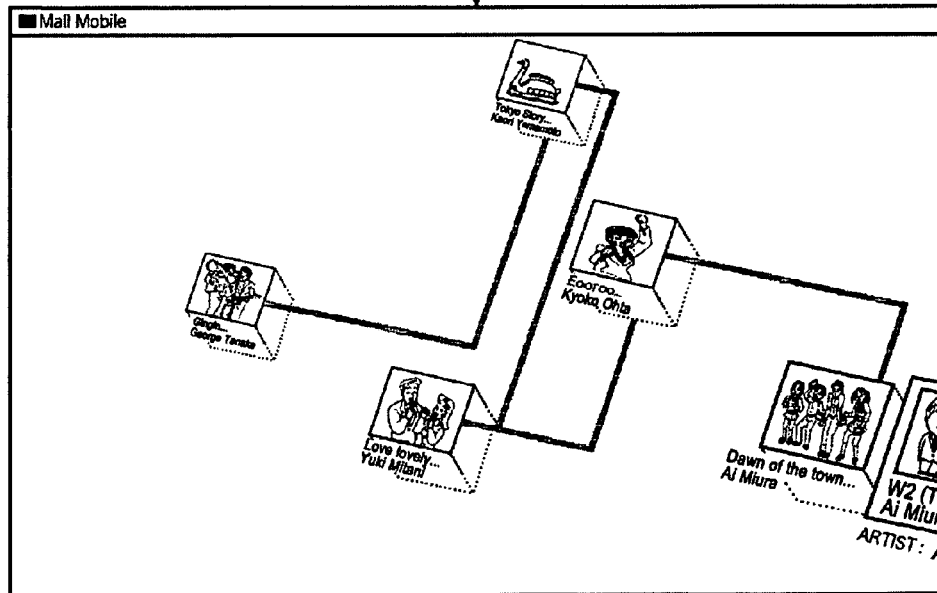

FIG. 47
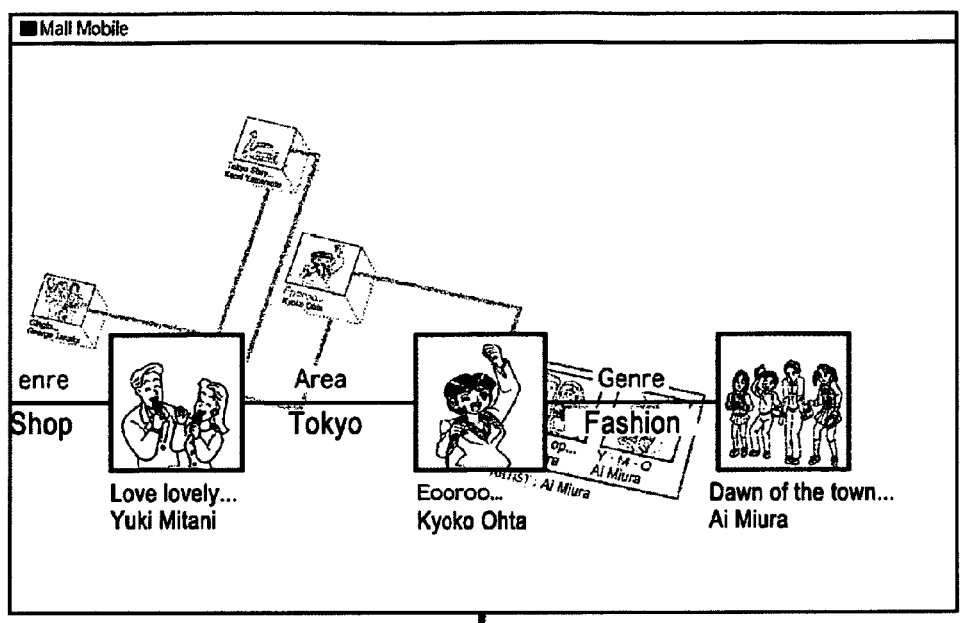
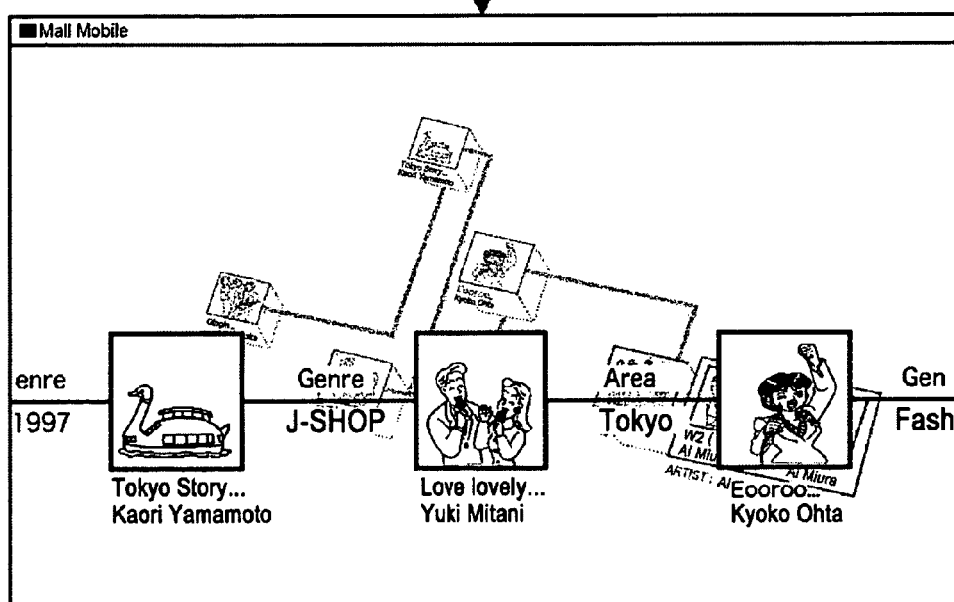

FIG. 49
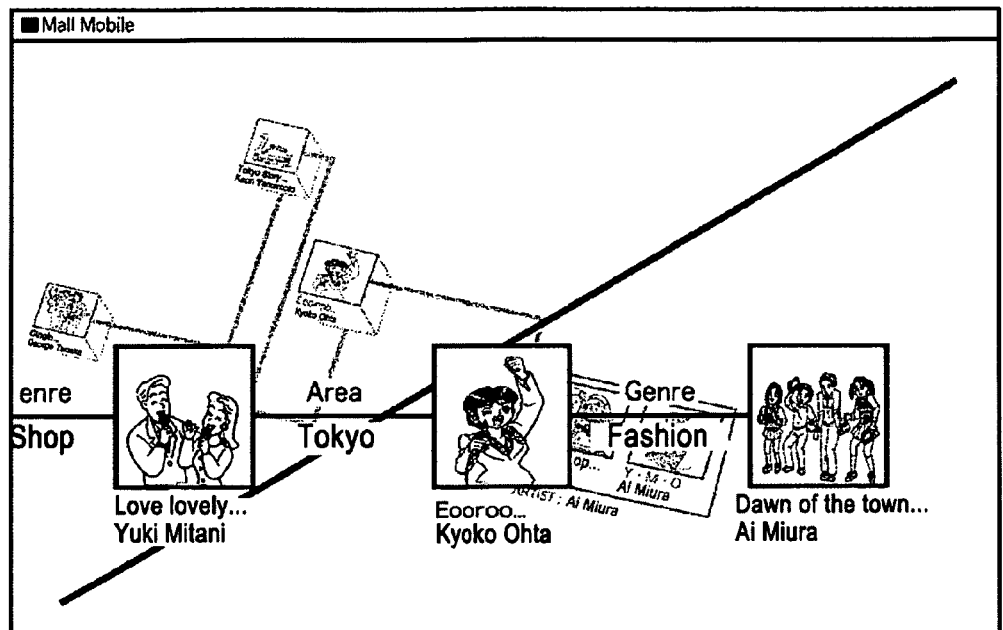
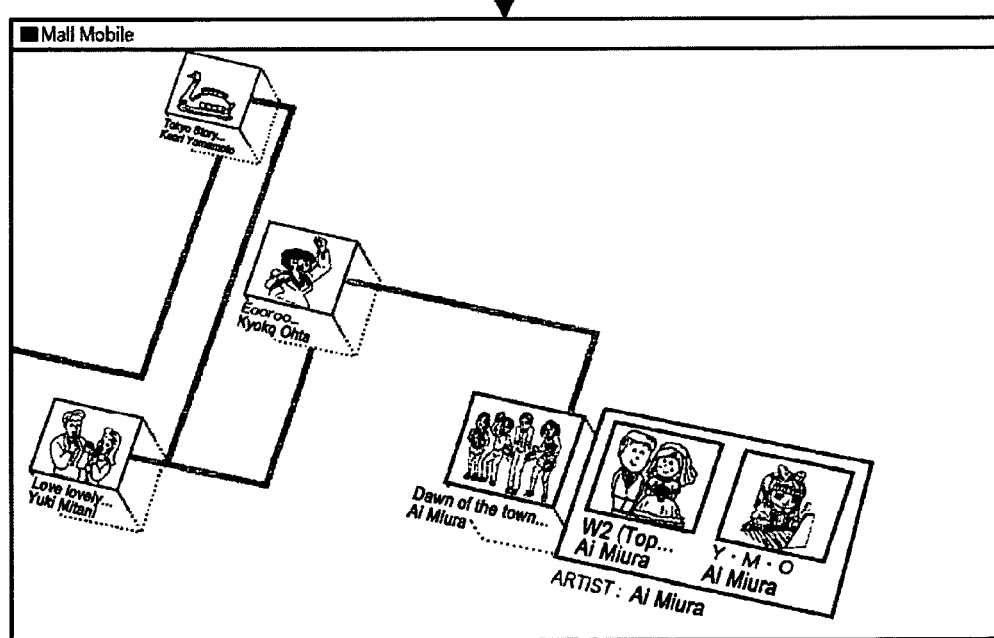

FIG. 55

|  | METADATA 1 | METADATA 2 | METADATA 3 | METADATA 4 | METADATA 5 |
|---|---|---|---|---|---|
| CONTENT 1 | 7 | 3 | 0 | 9 | 5 |
| CONTENT 2 | 5 | 2 | 4 | 9 | 7 |
| CONTENT 3 | 4 | 4 | 5 | 2 | 4 |
| CONTENT 4 | 6 | 4 | 7 | 5 | 3 |
| CONTENT 5 | 5 | 0 | 8 | 6 | 8 |

FIG. 56

|  | EUCLIDEAN DISTANCE |
|---|---|
| CONTENT 2 | 5.000 |
| CONTENT 3 | 9.220 |
| CONTENT 4 | 8.426 |
| CONTENT 5 | 9.747 |

FIG. 59

|  | METADATA 1 | METADATA 2 | METADATA 3 | METADATA 4 | METADATA 5 |
|---|---|---|---|---|---|
| PREFERENCE VECTOR | 5 | 0 | 3 | 3 | 8 |

FIG. 60

|  | COSINE SIMILARITY |
|---|---|
| CONTENT 2 | 0.877 |
| CONTENT 3 | 0.804 |
| CONTENT 4 | 0.749 |
| CONTENT 5 | 0.921 |

FIG. 63

|        | CONTENT 1 | CONTENT 2 | CONTENT 3 | CONTENT 4 | CONTENT 5 |
|--------|-----------|-----------|-----------|-----------|-----------|
| USER 1 | 3 | 3 | 5 | 4 | 5 |
| USER 2 | 2 | 3 | 4 | 2 | 2 |
| USER 3 | 3 | 5 | 2 | 2 | 1 |
| USER 4 | 5 | 1 | 4 | 5 | 1 |

FIG. 67

| ID | CATEGORY | METADATA |
|---|---|---|
| ALBUM 1 | AGE | 1980'S |
| ALBUM 1 | KEYWORD | MELANCHOLINESS |
| ... | | |

FIG. 68

| ID | CATEGORY | METADATA |
|---|---|---|
| MOVIE 1 | AGE | 1980'S |
| MOVIE 1 | KEYWORD | COMICAL |
| MOVIE 2 | AGE | 1990'S |
| MOVIE 2 | KEYWORD | MELANCHOLINESS |
| MOVIE 3 | AGE | 1980'S |
| MOVIE 3 | KEYWORD | MELANCHOLINESS |
| ... | | |

FIG. 69

| ID | CATEGORY | METADATA |
|---|---|---|
| BOOK 1 | AGE | 1990'S |
| BOOK 1 | KEYWORD | BUSINESS |
| BOOK 2 | AGE | 2000'S |
| BOOK 2 | KEYWORD | MELANCHOLINESS |
| BOOK 3 | AGE | 1980'S |
| BOOK 3 | KEYWORD | ENVIRONMENTAL PROBLEMS |
| ... | | |

FIG. 74

| ID | CATEGORY | METADATA |
|---|---|---|
| CONTENT 1 | AGE | 1980'S |
| CONTENT 1 | KEYWORD | MELANCHOLINESS |
| CONTENT 2 | AGE | 1980'S |
| CONTENT 2 | KEYWORD | COMICAL |
| CONTENT 3 | AGE | 1990'S |
| CONTENT 3 | KEYWORD | MELANCHOLINESS |
| CONTENT 4 | AGE | 1980'S |
| CONTENT 4 | KEYWORD | PASSION |
| CONTENT 5 | AGE | 2000'S |
| CONTENT 5 | KEYWORD | MELANCHOLINESS |
| ... | | |

FIG. 75

| | COSINE DISTANCE |
|---|---|
| CONTENT 2 | 0.927 |
| CONTENT 3 | 0.694 |
| CONTENT 4 | 0.766 |
| CONTENT 5 | 0.733 |

| SESSION ID | ORDER WITHIN SESSION | CATEGORY | METADATA |
|---|---|---|---|
| 1 | 1 | AGE | 1980'S |
| 1 | 2 | GENRE | ROCK |
| 1 | 3 | MOOD | RHYTHMIC |
| 2 | ... | | |

| ID | CATEGORY | METADATA |
|---|---|---|
| CONTENT 6 | AGE | 1980'S |
| CONTENT 6 | GENRE | ROCK |
| ... | | |
| CONTENT 9 | GENRE | ROCK |
| CONTENT 9 | MOOD | RHYTHMIC |
| ... | | |
| CONTENT 12 | KEYWORD | MELANCHOLINESS |
| CONTENT 12 | AGE | 1980'S |
| ... | | |
| CONTENT 17 | MOOD | RHYTHMIC |
| CONTENT 17 | AGE | 2000'S |
| ... | | |

| | METADATA 1 | METADATA 2 | METADATA 3 | METADATA 4 | METADATA 5 |
|---|---|---|---|---|---|
| PREFERENCE VECTOR | 11 | 7 | 5 | 11 | 9 |

| ID | CATEGORY | METADATA |
|---|---|---|
| CONTENT 1 | AGE | 1980'S |
| CONTENT 1 | KEYWORD | MELANCHOLINESS |
| CONTENT 2 | AGE | 1980'S |
| CONTENT 2 | KEYWORD | MELANCHOLINESS |
| CONTENT 3 | AGE | 1990'S |
| CONTENT 3 | KEYWORD | COMICAL |
| CONTENT 4 | AGE | 1980'S |
| CONTENT 4 | KEYWORD | PASSION |
| CONTENT 5 | AGE | 1980'S |
| CONTENT 5 | KEYWORD | MELANCHOLINESS |
| ... | | |

AGE: 1980'S

APPARATUS AND METHOD FOR DISPLAYING A THREE DIMENSIONAL GUI MENU OF THUMBNAILS NAVIGABLE VIA LINKED METADATA

CROSS REFERENCES TO RELATED APPLICATIONS

The present invention contains subject matter related to Japanese Patent Application JP 2007-032583 filed in the Japanese Patent Office on Feb. 13, 2007, the entire contents of which are incorporated herein by reference.

BACKGROUND OF THE INVENTION

1. Field of the Invention

The present invention relates to a display control apparatus, a display method and a computer program and, in particular, to a display control apparatus, a display method and a computer program for displaying information relating to contents.

2. Description of the Related Art

Apparatuses are currently in widespread use to download a large number of contents including still images, moving images and music via a communication network and store such contents.

When a content is downloaded, the downloading of a content related to the selected content is sometimes recommended. Some apparatuses display information relating to a content of interest when the content of interest is selected to be played from among a large number of stored contents.

Japanese Unexamined Patent Application Publication No. 8-263255 discloses a display technique. In accordance with the disclosure, a display screen is partitioned into a plurality of areas with one area displaying data icons representing data belonging to a parent layer and another area displaying a daughter layer. The younger (lower) the layer, the more each data icon in that layer is reduced in size. Further, the data icon is displayed in the simpler form with the layer becoming lower. The daughter layer is displayed within the background showing the parent layer. The younger the layer, the deeper the background color becomes. By performing a predetermined operation with a display area of a desired layer pointed, the desired layer can be zoomed up, and a zoom-out operation is thus smoothly performed from the zoomed layer to the parent layer in response to a predetermined operation.

Japanese Unexamined Patent Application Publication No. 10-312392 discloses another display technique. In accordance with the disclosure, two objects are displayed in an overlay fashion with one object cutting away the corresponding portion thereof from another object if the one object is contained in the other object. A layout direction of the contained object to the containing object is fixed. If the number of objects contained in a planar object exceeds a predetermined number, the contained objects corresponding to a leaf are arranged with respect to the contained object corresponding to a node in two lines in a direction opposite from a direction of expansion.

Japanese Unexamined Patent Application Publication No. 2006-4292 discloses yet another display technique. in accordance with the disclosure, a function icon row composed a plurality of function icons representing types of media to be played and a function icon row composed a plurality of content icons showing items of contents to be played are displayed to be intersected at an approximate center of a menu screen. A moving icon as a function icon displayed in an intersection area where the function icon row and the content icon row intersect each other is displayed in enlargement and in a color different from the other function icons. The layer structure of the contents is visibly represented in the content icon row.

SUMMARY OF THE INVENTION

A content may be selected by tracking back a large number contents through link. The link of the contents heretofore tracked cannot be displayed on a screen for selecting the content thereon.

It is thus desirable to allow the user to recognize the relationship of the tracked contents at a glance when the contents are tracked in a searching operation.

In accordance with one embodiment of the present invention, a display control apparatus includes a search unit for searching for a second content linked to a first content, and a display control unit for controlling display of a search history of content search performed in accordance with one of a first image and a first character, each indicating the first content, one of a second image and a second character, each indicating the second content and link information linking the first content to the second content.

The display control unit may control the display of the search history of the content search performed in accordance with the first image and the second image, each being a thumbnail image, and the link information between the first content and the second content.

The display control unit may control the display of the search history including an image indicating a link between one of the first image and the first character and one of the second image and the second character.

The search unit may search for the second content having the same metadata as metadata of the first content.

The search unit may search for a third content linked to the second content, and the display control unit may control the display of the search history of the content search performed in accordance with one of the first image and the first character, one of the second image and the second character, one of a third image and a third character, each indicating the third content, the link information linking the first content to the second content and link information linking the second content to the third content.

The display control apparatus may further include a generating unit for generating a three-dimensional model, the three-dimensional model including a first layer having one of the first image and the first character of the first content arranged therewithin, a second layer having one of the second image and the second character of the second content arranged therewithin and a third layer having one of the first image and the first character, one of the second image and the second character and text indicating the link information between the first content and the second content. Using the three-dimensional model, the display control unit may control the display of the search history of the content search performed in accordance with one of the first image and the first character, one of the second image and the second character and the text indicating the link information between the first content and the second content.

The display control unit may control the display of the search history of the content search performed in accordance with the link information indicating both a category related to each of the first content and the second content and a specific content of the category.

The search unit may search for the second content linked to the first content in accordance with at least part of metadata attached to each of the first content and the second content.

The display control unit may control the display of the search history in a two-dimensional image and control the display of the content search in a three-dimensional image if the second content is searched.

In accordance with one embodiment of the present invention, a display method include steps of searching for a second content linked to a first content, and displaying a search history of content search performed in accordance with one of a first image and a first character, each indicating the first content, one of a second image and a second character, each indicating the second content and link information linking the first content to the second content.

In accordance with one embodiment of the present invention, a computer program for causing a computer to perform a display control method, includes steps of searching for a second content linked to a first content, and controlling display of a search history of content search performed in accordance with one of a first image and a first character, each indicating the first content, one of a second image and a second character, each indicating the second content and link information linking the first content to the second content.

In accordance with embodiments of the present invention, the second content linked to the first content is searched for and display of a search history of content search is controlled. The content search is performed in accordance with one of the first image and the first character, each indicating the first content, one of the second image and the second character, each indicating the second content and the link information linking the first content to the second content.

In accordance with embodiments of the present invention, information relating to contents is displayed.

In accordance with embodiments of the present invention, if linking of contents is tracked in searching, a relationship of the tracked contents can be viewed at a glance.

BRIEF DESCRIPTION OF THE DRAWINGS

FIG. 18 illustrates a display example displayed on the display in the output unit;

FIG. 21 illustrates a display example displayed on the display in the output unit;

FIG. 34 illustrates a display example displayed on the display in the output unit;

FIG. 36 illustrates a display example displayed on the display in the output unit;

FIG. 38 illustrates a display example displayed on the display in the output unit;

FIG. 40 illustrates a display example displayed on the display in the output unit;

FIG. 44 illustrates a display example displayed on the display in the output unit;

FIG. 47 illustrates a display example displayed on the display in the output unit;

FIG. 49 illustrates a display example displayed on the display in the output unit;

FIG. 55 illustrates an example of metadata;

FIG. 56 illustrates an example of similarity;

FIG. 59 illustrates a preference vector that represents the preference information;

FIG. 60 illustrates an example of similarity;

FIG. 63 illustrates an example of an evaluation value;

FIG. 67 illustrates an example of metadata;

FIG. 68 illustrates an example of metadata;

FIG. 69 illustrates an example of metadata;

FIG. 74 illustrates an example of metadata;

FIG. 75 illustrates an example of cosine distance;

DESCRIPTION OF THE PREFERRED EMBODIMENTS

Before describing an embodiment of the present invention, the correspondence between the elements of the inventions and the specific elements disclosed in an embodiment of the present invention is discussed below. This description is intended to assure that embodiments supporting the invention are described in this specification. Thus, even if an element in the following embodiments is not described as relating to a certain element of the present invention, that does not necessarily mean that the element does not relate to that element of the present invention. Conversely, even if an element is described herein as relating to a certain element of the present invention, that does not necessarily mean that the element does not relate to other elements of the present invention.

In accordance with one embodiment of the present invention, a display control apparatus includes a search unit (for example, related content searcher 57 of FIG. 2) for searching for a second content linked to a first content, and a display control unit (for example, display controller 55 of FIG. 2) for controlling display of a search history of content search performed in accordance with one of a first image and a first character, each indicating the first content, one of a second image and a second character, each indicating the second content and link information linking the first content to the second content.

The display control apparatus may further include a generating unit (for example, three-dimensional model generator 54 of FIG. 2) for generating a three-dimensional model, the three-dimensional model including a first layer having one of the first image and the first character of the first content arranged therewithin, a second layer having one of the second image and the second character of the second content arranged therewithin and a third layer having one of the first image and the first character, one of the second image and the second character and text indicating the link information between the first content and the second content. Using the three-dimensional model, the display control unit may control the display of the search history of the content search performed in accordance with one of the first image and the first character, one of the second image and the second character and the text indicating the link information between the first content and the second content.

Figure 33:
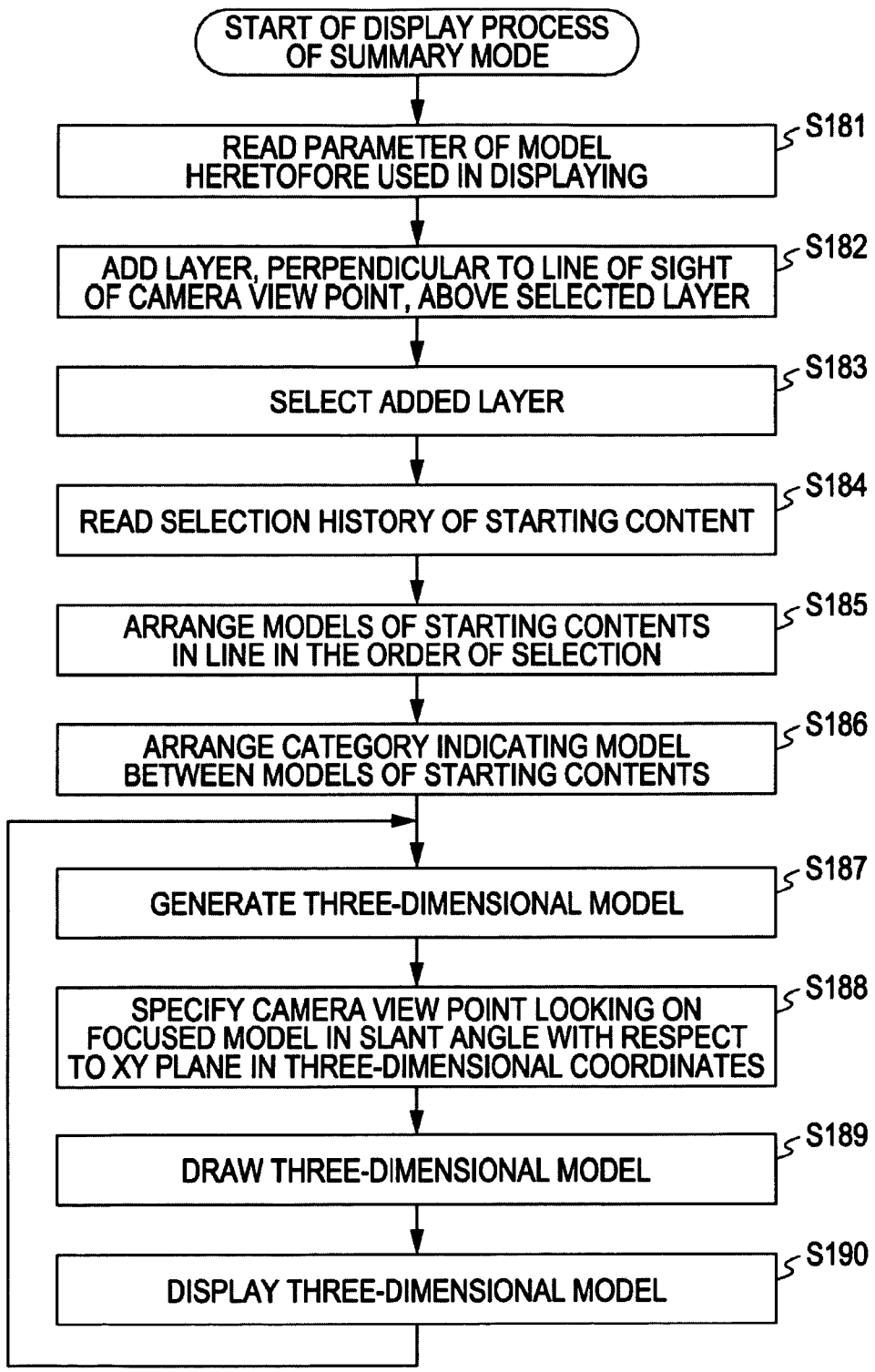
FIG. 33 is a flowchart illustrating a display process in a summary mode.

In accordance with one embodiment of the present invention, one of a display method and a computer program include steps of searching for a second content linked to a first content (for example, in step S110 of FIG. 29), and displaying a search history of content search performed in accordance with one of a first image and a first character, each indicating the first content, one of a second image and a second character, each indicating the second content and link information linking the first content to the second content (for example, in step S190 of FIG. 33).

Figure 1:
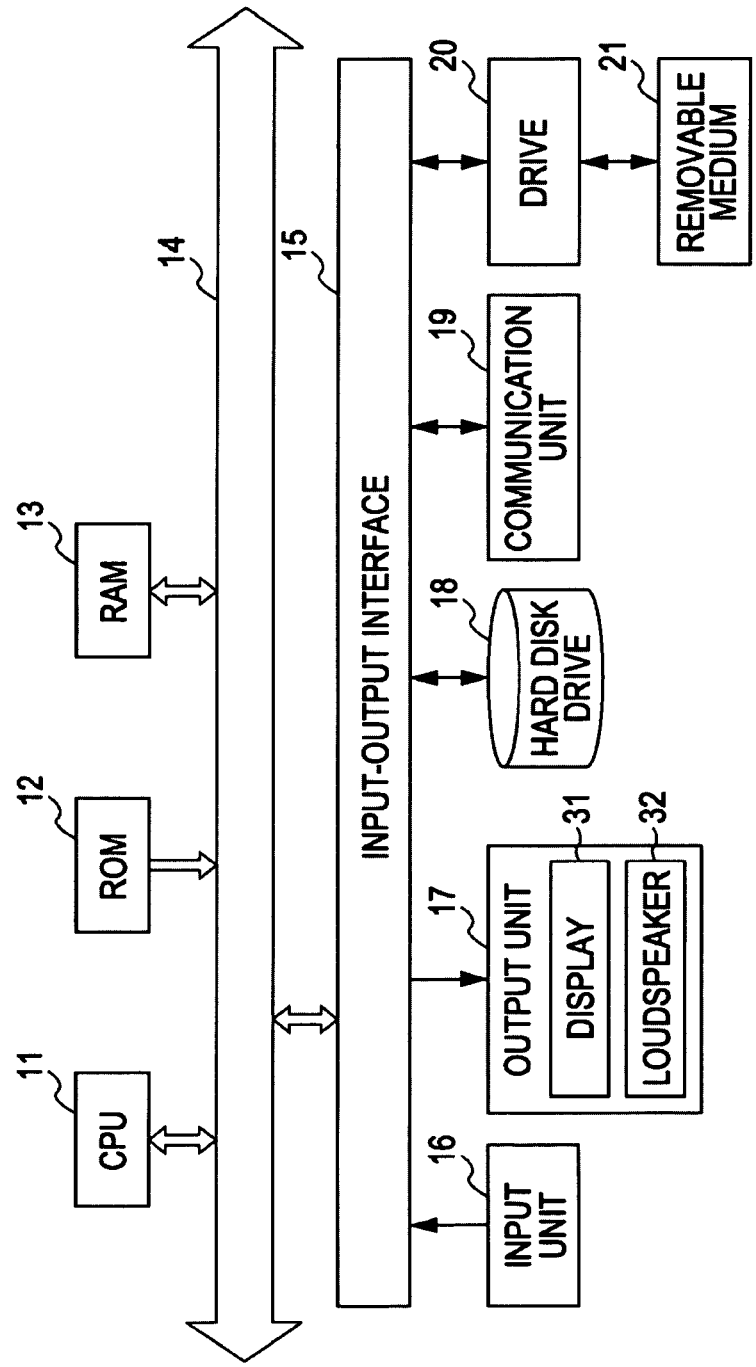
FIG. 1 is a block diagram illustrating a hardware structure of a personal computer as one example of a display control apparatus in accordance with one embodiment of the present invention.

FIG. 1 is a block diagram illustrating the hardware structure of a personal computer as one example of a display control apparatus in accordance with one embodiment of the present invention. In the personal computer, a central processing unit (CPU) 11, a read-only memory (ROM) 12 and a random-access memory (RAM) 13 are interconnected to each other via a bus 14.

The bus 14 connects to an input-output interface 15. Connected to the input-output interface 15 are an input unit 16 including a keyboard, a mouse, a microphone and a touchpanel, an output unit 17 displaying an image and/or emitting a sound, a hard disk drive 18 including a recording medium, a communication unit 19 including a network interface and a drive 20 for driving a removable medium 21 such as a magnetic disk, an optical disk, a magneto-optical disk or a semiconductor memory.

The output unit 17 includes a display 31 such as a liquid-crystal display (LCD), and a loudspeaker 32.

In the computer thus constructed, the CPU 11 loads a program stored on the hard disk drive 18 to the RAM 13. The CPU 11 executes the program loaded on the RAM 13, thereby performing a series of process steps to be described later.

The program to be executed by the CPU 11 as one example of computer is recorded on the removable medium 21 as a package medium including one of a magnetic disk (such as a flexible disk), an optical disk (such as compact disk read-only memory (CD-ROM) or digital versatile disk (DVD)), a magneto-optical disk and a semiconductor memory and then supplied. The program may also be supplied via a wired or wireless communication medium such as a local area network, the Internet or a digital broadcasting satellite.

By loading the removable medium 21 on the drive 20, the program is stored onto the hard disk drive 18 via the input-output interface 15. The program is thus installed on the personal computer. The program can also be received by the communication unit 19 via the wired or wireless communication medium and then stored on the hard disk drive 18 for installation. The program can also be pre-stored on one of the ROM 12 and the hard disk drive 18 for pre-installation.

Figure 2:
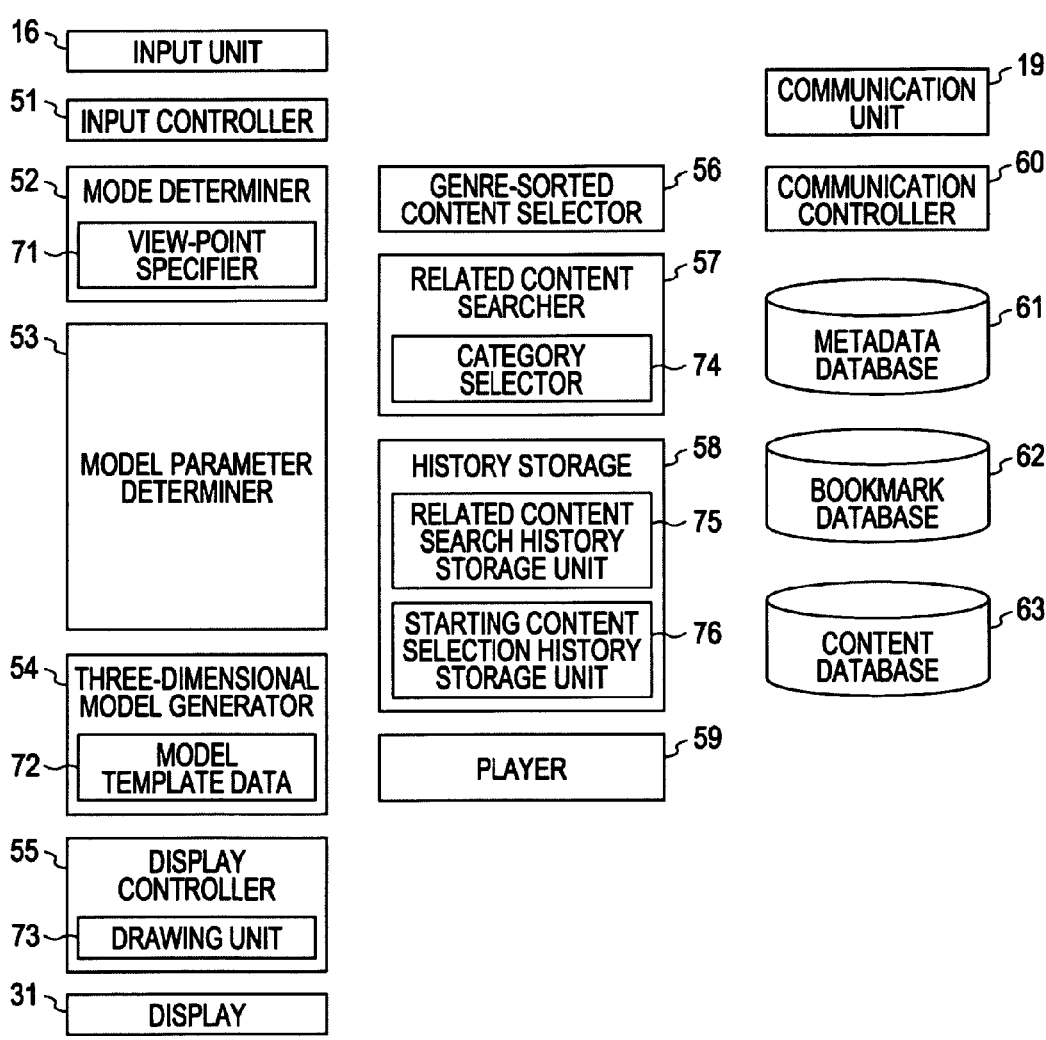
FIG. 2 is a functional block diagram illustrating the personal computer executing a program.

FIG. 2 is a functional block diagram illustrating a personal computer executing the program. The functional blocks illustrated in FIG. 2 are implemented when the personal computer executes the program. The personal computer includes an input controller 51 controlling the input unit 16, a mode determiner 52, a model parameter determiner 53, a three-dimensional model generator 54, a display controller 55 controlling the display 31, a genre-sorted content selector 56, a related content searcher 57, a history storage 58, a player 59, a communication controller 60 controlling the communication unit 19, a metadata database 61, a bookmark database 62 and a content database 63.

The input controller 51 is implemented by executing a driver of the input unit 16 as a program. The input controller 51 supplies data to each element of the personal computer in response to an operation of a user applied to the input unit 16 including the keyboard and the touchpanel.

The mode determiner 52 determines one of personal computer modes including a top-page display mode, a related search mode, a play mode, a summary mode and a overhead-view mode. The modes will be described in detail later.

The model parameter determiner 53 determines a parameter to identify a three-dimensional model. The three-dimensional model displays information, relating to contents, such as a thumbnail image and metadata of each content.

The thumbnail image is one example of image representing a content and may be produced from an image contained in the content or from a record jacket photograph.

The image forming a three-dimensional model may be anything representing the content and is not limited to the thumbnail image.

The thumbnail image is hereinafter quoted as an image representing the content.

The contents are data useful for a user and include a still image, a moving image, music (song), books (image and text), etc.

The parameters include information identifying a content, a thumbnail image as a still image, a scale-contracted moving image, information identifying the type of a model such as text, information identifying a thumbnail image used as a model and the number of models such as thumbnail images arranged along a line to be discussed later. The model parameter determiner 53 supplies the determined parameter to the three-dimensional model generator 54.

The three-dimensional model with the parameter thereof determined by the model parameter determiner 53 includes a model of at least one content.

The model of the content refers to a thumbnail image of the content, a scale-contracted moving image of a moving image content, text indicating information related to the content (for example, metadata such as a description attached to the content), text indicating information related to at least one content (for example, category to be discussed later), and a model indicating a group of a plurality of models.

Based on the parameter supplied by the model parameter determiner 53, the three-dimensional model generator 54 generates the three-dimensional model displaying a thumbnail image or metadata of a content. For example, the three-dimensional model is described using virtual reality modeling language (VRML). The three-dimensional model generator 54 supplies the generated three-dimensional model to the display controller 55. The three-dimensional model generator 54 generates a three-dimensional display model in which one of an image such as a thumbnail image representing a predetermined content and a character representing the content is arranged in a predetermined layer and one of an image, such as a thumbnail image, of another content related to the predetermined content and a character representing the other content is arranged in another layer. The three-dimensional model generator 54 will be described more in detail later.

The display controller 55 is implemented by executing a driver of the display 31 as a program. The display controller 55 causes the display 31 as an LCD to display one of the thumbnail image and the metadata of the content. For example, the display controller 55 causes the display 31 to display one of the thumbnail image and the metadata of the content by drawing and displaying the three-dimensional model.

Using a display model generated by the three-dimensional model generator 54, the display controller 55 controls displaying one of the image and the character of the predetermined content and one of the image and the character of the other content related to the predetermined content.

When a search history of contents is displayed, the display controller 55 controls displaying the predetermined image representing the predetermined content, the other image representing the other content related to the predetermined content and the search history of the contents based on a link between the predetermined content and the other content.

In response to a user operation on the input unit 16, the genre-sorted content selector 56 selects a content belonging to a genre selected by the user in the top-page mode.

In the related search mode, the related content searcher 57 searches for contents related to the content selected by the user in response to the user operation on the input unit 16. For example, the related content searcher 57 searches for a content related to the predetermined content in accordance with at least part of the metadata attached to the contents.

A content searched, hit and related to the content selected by the user is referred to as a related content. When the related contents are searched, the original content selected by the user is referred to as a starting content.

The history storage 58 stores the search history of the related contents.

In the play mode, the player 59 plays the content selected by the user in response to the user operation applied to the input unit 16. For example, the player 59 reads the content from the content database 63 and plays the content. The player 59 can also play a content received by the communication unit 19.

The communication controller 60 is implemented by executing the program of the driver of the communication unit 19 serving as a network interface. The communication controller 60 transmits and receives a variety of data via a network.

The communication controller 60 causes the communication unit 19 as the network interface to receive the content to be played from a server (not shown) via the network. The communication controller 60 causes the communication unit 19 to receive data related to the content, such as metadata of the content, from the server (not shown) via the network.

Each of the metadata database 61, the bookmark database 62 and the content database 63 has a database management function implemented by executing a database management program and includes a recording area having a predetermined recording capacity of a recording area of the hard disk drive 18 and managed by the database management function.

The metadata database 61 stores the metadata attached to the content. For example, the metadata database 61 stores the metadata attached to the content stored on the content database 63. In other words, the metadata database 61 stores the metadata mapped to the content stored on the content database 63. When requested to read any content or metadata as a key, the metadata database 61 supplies the metadata mapped to the key.

The bookmark database 62 stores information identifying a bookmarked content as a content selected by the user.

The content database 63 stores the content. When requested to read any content or metadata as a key, the content database 63 supplies the content mapped to the key.

The mode determiner 52 includes a viewpoint specifier 71. The viewpoint specifier 71 specifies a viewpoint at the drawing of the three-dimensional model to the display controller 55.

The three-dimensional model generator 54 stores model template data 72. The model template data 72 is template data such as a color of a group of at least one model, a thickness of a line connecting thumbnail images and a pattern of the line, such as a solid line or a broken line, with such color or line serving to surround at least one model such as the thumbnail image of the content searched and hit according to a predetermined category to be described later.

The display controller 55 includes a drawing unit 73. The drawing unit 73 draws the three-dimensional model supplied from the three-dimensional model generator 54, thereby generating display data to be displayed on the display 31.

The related content searcher 57 includes a category selector 74. The category selector 74 selects a category of the related content to be searched. As will be described more in detail later, the category is related to both the related content and the starting content.

The history storage 58 includes a related content search history storage unit 75 and a starting content selection history storage unit 76. The related content search history storage unit 75 stores the search history of the related content. The starting content selection history storage unit 76 stores the selection history of the starting content.

Figure 3:
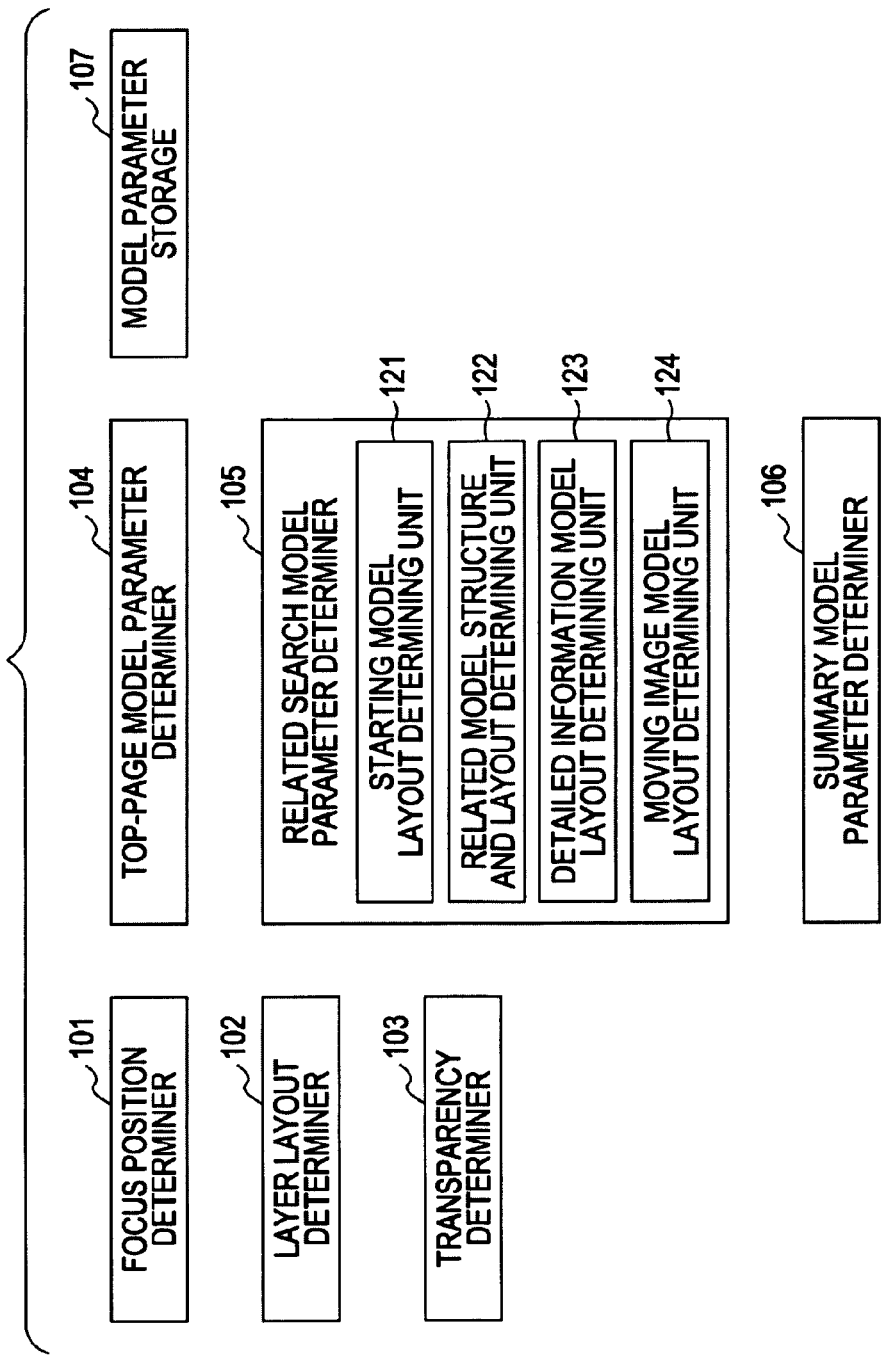
FIG. 3 illustrates the structure of a model parameter determiner.

FIG. 3 illustrates the structure of the model parameter determiner 53. The model parameter determiner 53 includes a focus position determiner 101, a layer layout determiner 102, a transparency determiner 103, a top-page model parameter determiner 104, a related search model parameter determiner 105, a summary model parameter determiner 106 and a model parameter storage 107.

The focus position determiner 101 determines a parameter indicating a focus position, from among parameters identifying the three-dimensional model.

The layer layout determiner 102 determines a parameter describing a position in the metadata of the layer where a model such as a thumbnail image is arranged.

The transparency determiner 103 determines a parameter describing the degree of transparency of a model.

The top-page model parameter determiner 104 determines a parameter of the three-dimensional model for displaying a top page in the top-page mode. The parameter identifies a model such as a thumbnail image or text displayed on the top page.

The related search model parameter determiner 105 determines a parameter of the three-dimensional model for displaying a model such as a thumbnail image of the related content and a thumbnail image of the starting content in the related search mode. More specifically, the related search model parameter determiner 105 determines the model as a parameter identifying the thumbnail image of the related content and a parameter describing the layout of the model as the thumbnail image.

The summary model parameter determiner 106 determines a parameter of the three-dimensional model for displaying a model such as a thumbnail image of the starting content in the summary mode. More specifically, the summary model parameter determiner 106 determines a parameter identifying the model as the thumbnail image of the starting content and a parameter describing the layout of the model as the thumbnail image.

The model parameter storage 107 stores the parameters of the three-dimensional model to be displayed.

The related search model parameter determiner 105 further includes a starting model layout determining unit 121, a related model structure and layout determining unit 122, a detailed information model layout determining unit 123 and a moving image model layout determining unit 124.

The starting model layout determining unit 121 determines a parameter identifying the layout of a model such as a thumbnail image of the starting content.

The related model structure and layout determining unit 122 determines a parameter describing the number models such as thumbnail images of the related content, a parameter identifying the thumbnail image of the related content used as a model and a parameter identifying the layout of each of model as the thumbnail image.

The detailed information model layout determining unit 123 determines a parameter identifying detailed information of the related content used as a detailed information model and a parameter identifying the layout of the detailed information model.

The moving image model layout determining unit 124 determines a parameter identifying the layout of a model as a scale-contracted moving image of one of the related content and the starting content as a moving image.

The display on the display of the display 31 in the output unit 17 is described below.

Figure 4:
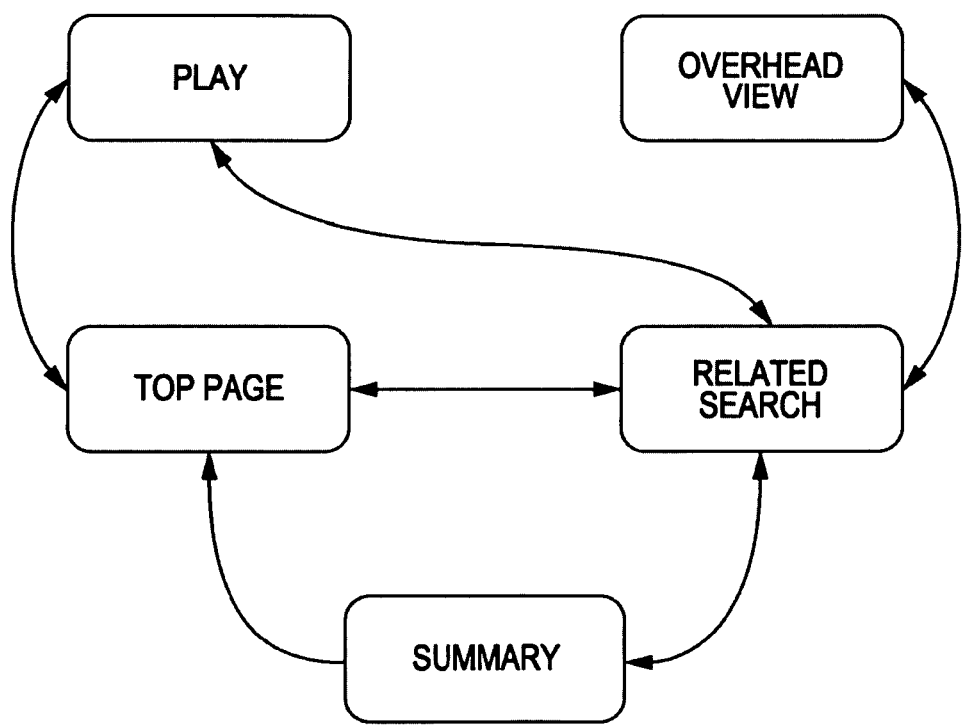
FIG. 4 illustrates display modes of the personal computer.

As shown in FIG. 4, the display modes of the personal computer include five modes, namely, the top-page mode, the related search mode, the play mode, the summary mode and the overhead-view mode. The top-page mode is used to display a list of contents on a per genre on the screen and appears first when a display process starts. The related search mode is used to search for a content related to a content selected by the user in response to a user operation applied on the input unit 16. In the related search mode, contents linked to the content selected by the user are searched.

The related content is a content related to a predetermined content, namely, a content linked to the predetermined content. The starting content is an original content linked to the related content.

The play mode is used to play the content.

The summary mode is used to display a list of starting contents in the search process of the related search mode. More specifically, in the summary mode, the thumbnail image of the related content linked to the starting content searched in the related search mode and the thumbnail image of the starting content are displayed and information linked to the starting content and the related content is also displayed.

The overhead-view mode is used to view the process of related search with a viewpoint of a camera changed. The viewpoint of the camera serves as a reference in the drawing of the three-dimensional model view.

The top-page mode as one display mode of the personal computer is transitioned to one of the related search mode, the play mode and the summary mode. The related search mode as one display mode of the personal computer is transitioned to one of the play mode, the summary mode and the overhead-view mode in response to a user operation.

The play mode as one display mode of the personal computer is transitioned to one of the top-page mode and the related search mode in response to a user operation. The summary mode as one display mode of the personal computer is transitioned to one of the top-page mode and the related search mode in response to a user operation.

The overhead-view mode as one display mode of the personal computer is transitioned to the related search mode in response to a user operation.

Display examples displayed on the display 31 in the output unit 17 in each of the top-page mode, the related search mode, the play mode, the summary mode and the overhead-view mode are described below with reference to FIGS. 5 through 23.

In the discussion that follows, the models of the contents include a thumbnail image of a content, a scale-contracted moving image of a moving image content, and detailed information of a content expressed in text.

FIGS. 5 through 9 illustrate the transition from the top-page mode or the screen in the top-page mode to another display mode.

Figure 5:
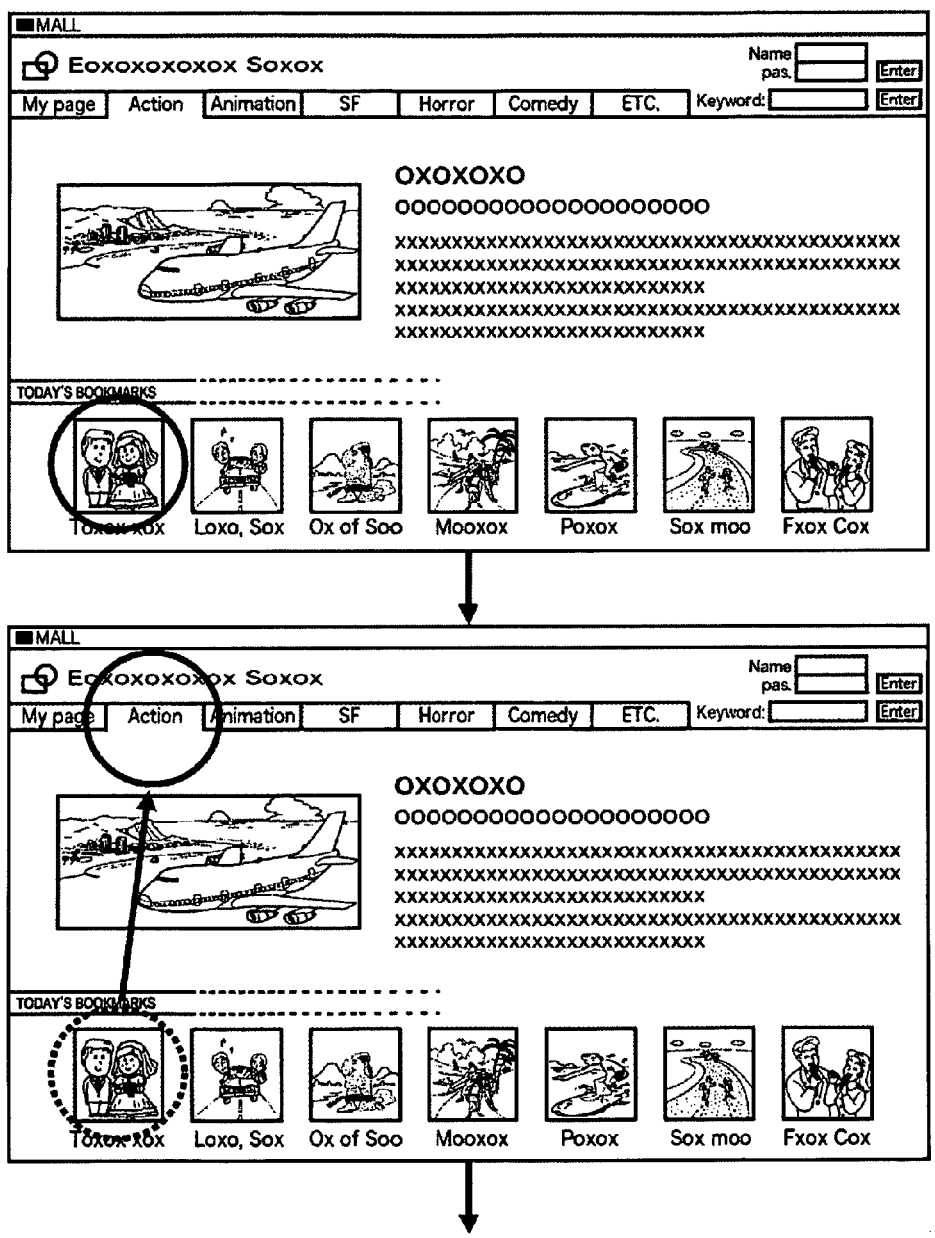
FIG. 5 illustrates a display example displayed on a display in an output unit.

When the display process starts, the screen of the top-page mode is displayed on the display 31 in the output unit 17 as shown in the top portion of FIG. 5. Arranged on one row in the top-page mode screen are buttons for selecting genre for my page, action, animation, science fiction (SF), horror, comedy, etc. One of the buttons for selecting genre is focused or selected.

Thumbnail images of contents belonging to the genre of the button focused or selected are arranged in a horizontal line on the bottom portion of the top-page mode screen.

When the display process starts, one button is selected as a default button from among the genre selecting buttons. For example, the button for action genre is selected as shown in FIG. 5.

When the display process starts, a leftmost thumbnail image from among thumbnail images of the contents belonging to the genre of the button selected as default is focused as default. For example, the leftmost thumbnail image on the screen is focused from among the thumbnail images belonging to the action genre as shown in FIG. 5.

When the display process starts, the focusing of the button for genre selection becomes invalid, and the focusing of the thumbnail image becomes valid.

If an upward looking arrow key of the keyboard in the input unit 16 is pressed with the thumbnail image focused, the button for the selected genre is focused. In other words, focusing shifts to the button of the selected genre.

If the upward looking arrow key of the keyboard in the input unit 16 is pressed with the thumbnail image focused, focusing of the button for selecting genre becomes valid while focusing of the thumbnail image becomes invalid.

Figure 6:
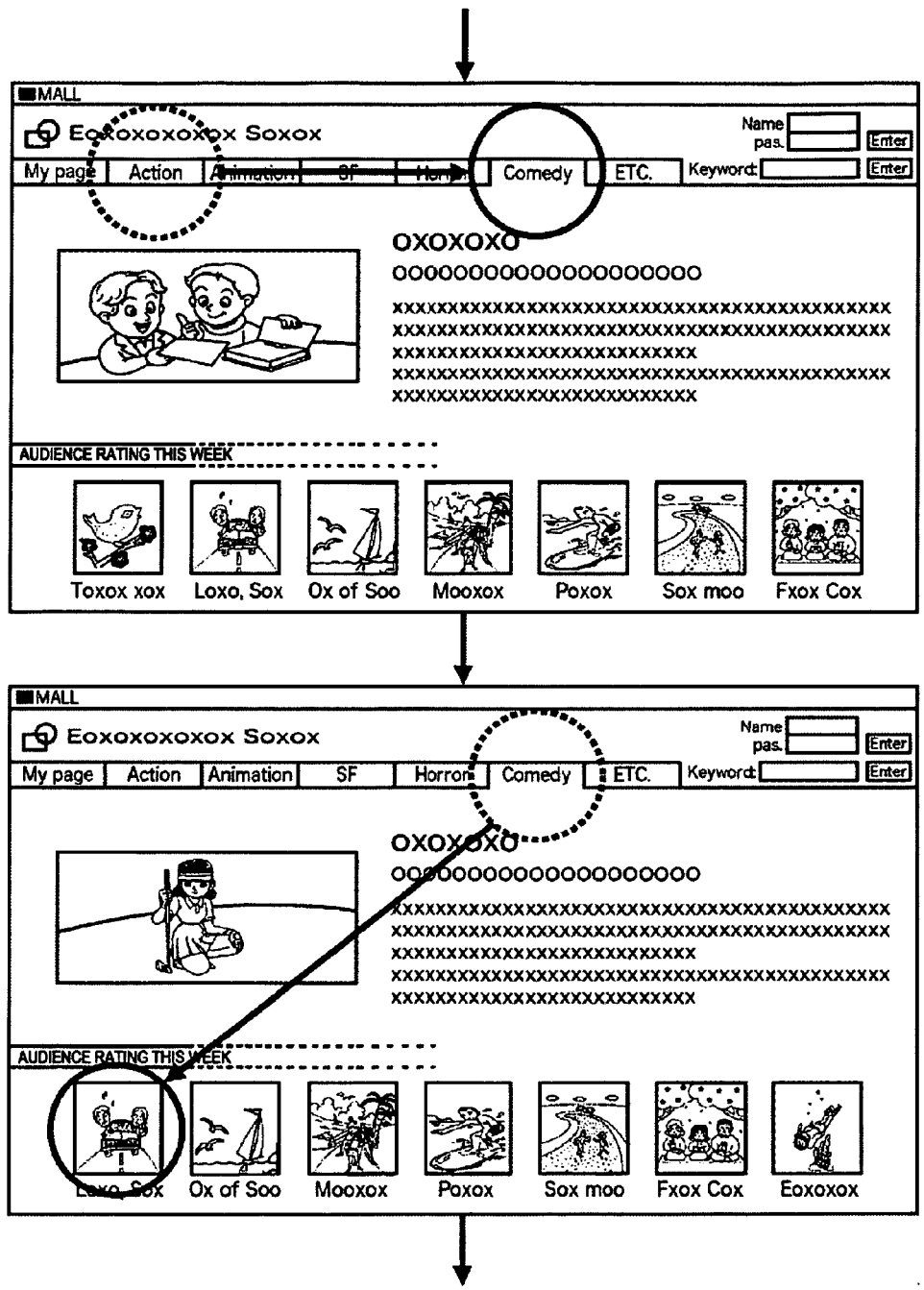
FIG. 6 illustrates a display example displayed on the display in the output unit.

If a rightward looking arrow key of the keyboard in the input unit 16 is pressed with the button for selecting genre focused as shown in FIG. 6, a button arranged to the right of the heretofore focused button is focused on the top-page mode screen. More specifically, focusing shifts rightward across the genre selecting buttons.

Thumbnail images of the contents belonging to the genre of the focused button are arranged in a horizontal line on the bottom side of the top-page mode screen.

For example, if the rightward looking arrow key of the keyboard in the input unit 16 is pressed four times consecutively with the action genre button focused, the comedy genre button is focused. The comedy genre button is on the right side of the action genre button and spaced from the action genre button by three buttons. Thumbnail images of contents belonging to the comedy genre are arranged in a horizontal line on the bottom portion of the top-page mode screen.

If a leftward looking arrow key of the keyboard in the input unit 16 is pressed with the button for selecting genre focused, a button to the left of the heretofore focused button is focused on the top-page mode screen. More specifically, focusing shifts leftward across the genre selecting buttons.

If a downward looking arrow key of the keyboard in the input unit 16 is pressed with a genre selecting button focused, the genre corresponding to the focused button is selected. Focusing shifts to one of the thumbnail images of the contents arranged in a horizontal line on the bottom portion of the top-page mode screen.

In other words, if the downward looking arrow key of the keyboard in the input unit 16 is pressed with the genre selecting button focused, focusing of the genre selecting button becomes invalid while focusing of the thumbnail image becomes valid.

For example, if the downward looking arrow key of the keyboard in the input unit 16 is pressed with the comedy genre button focused, the leftmost thumbnail image from among the thumbnail images of the contents belonging to the comedy genre is focused on the screen.

Figure 7:
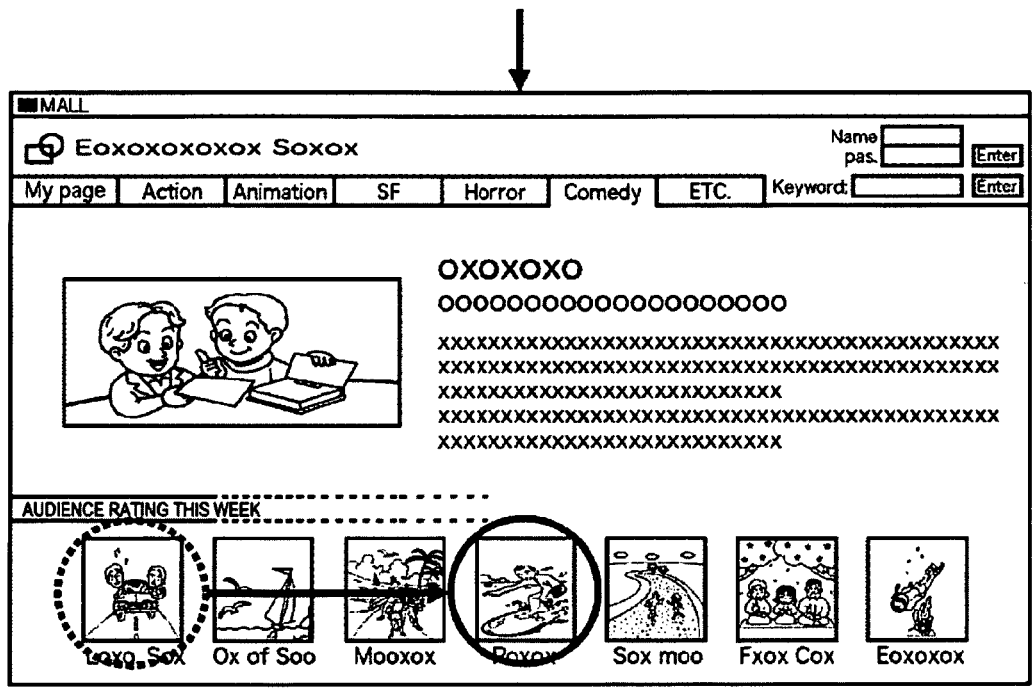
FIG. 7 illustrates a display example displayed on the display in the output unit.

As shown in FIG. 7, if the rightward looking arrow key of the keyboard in the input unit 16 is pressed with the thumbnail image focused, a thumbnail image to the right of the thumbnail image heretofore focused on the top-page mode screen is focused. More specifically, focusing shifts rightward across the thumbnail images.

For example, if the rightward looking arrow key of the keyboard in the input unit 16 is pressed three times consecutively with the leftmost thumbnail image focused on the screen, the fourth thumbnail image from the leftmost thumbnail image is focused.

If the leftward looking arrow key of the keyboard in the input unit 16 is pressed with a thumbnail image focused, a thumbnail image to the left of the heretofore focused thumbnail image is focused on the three-dimensional model. More specifically, focusing shifts leftward across the thumbnail images.

Figure 8:
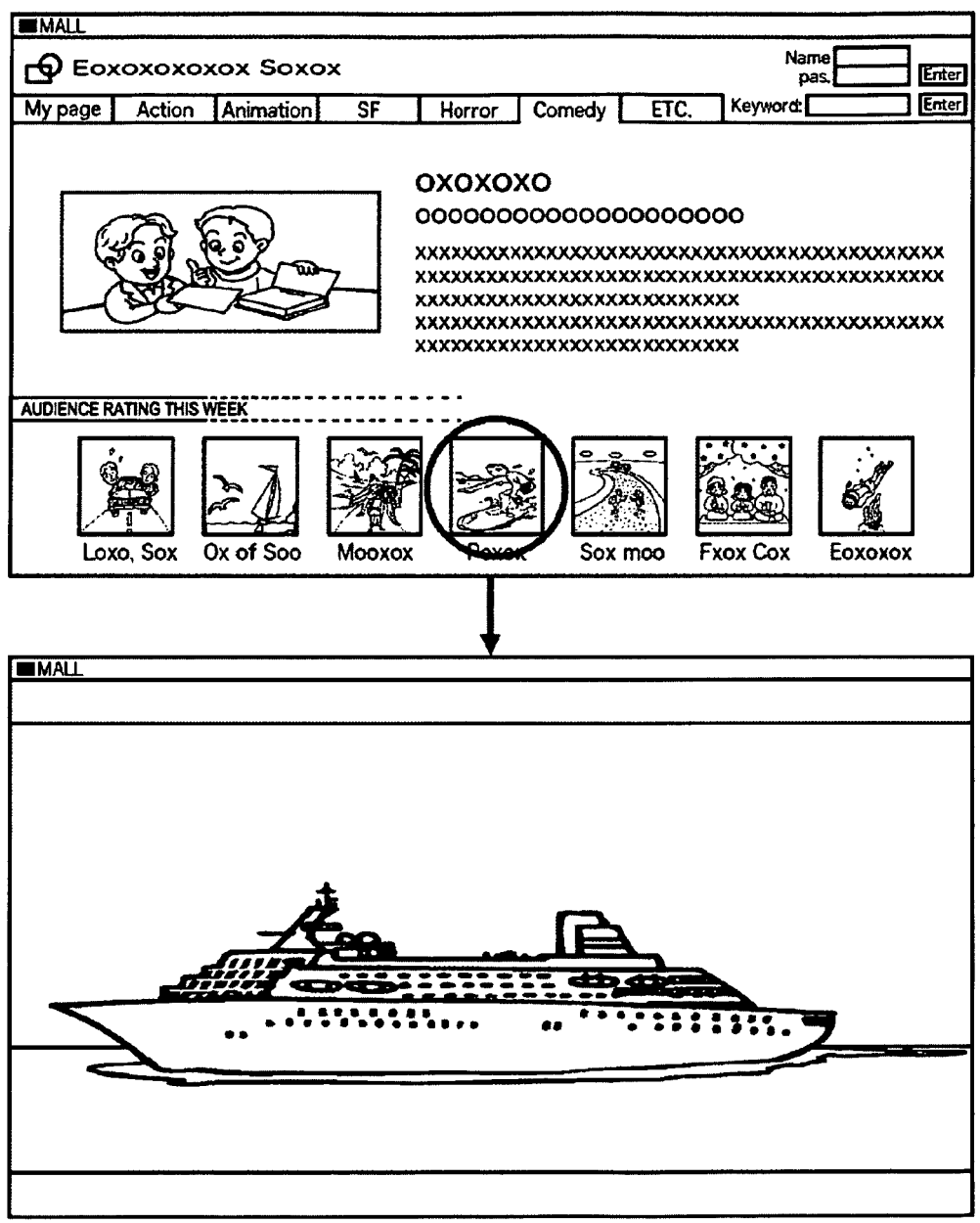
FIG. 8 illustrates a display example displayed on the display in the output unit.

If an enter key of the keyboard in the input unit 16 is pressed with the thumbnail image focused as shown in FIG. 8, the thumbnail image is selected. The content of the thumbnail image is then selected, the personal computer shifts to the play mode and the selected content starts to be played.

If the content is a moving image in the play mode as shown in the bottom portion of FIG. 8, the moving image is expanded and displayed instead of the focused thumbnail image.

Figure 9:
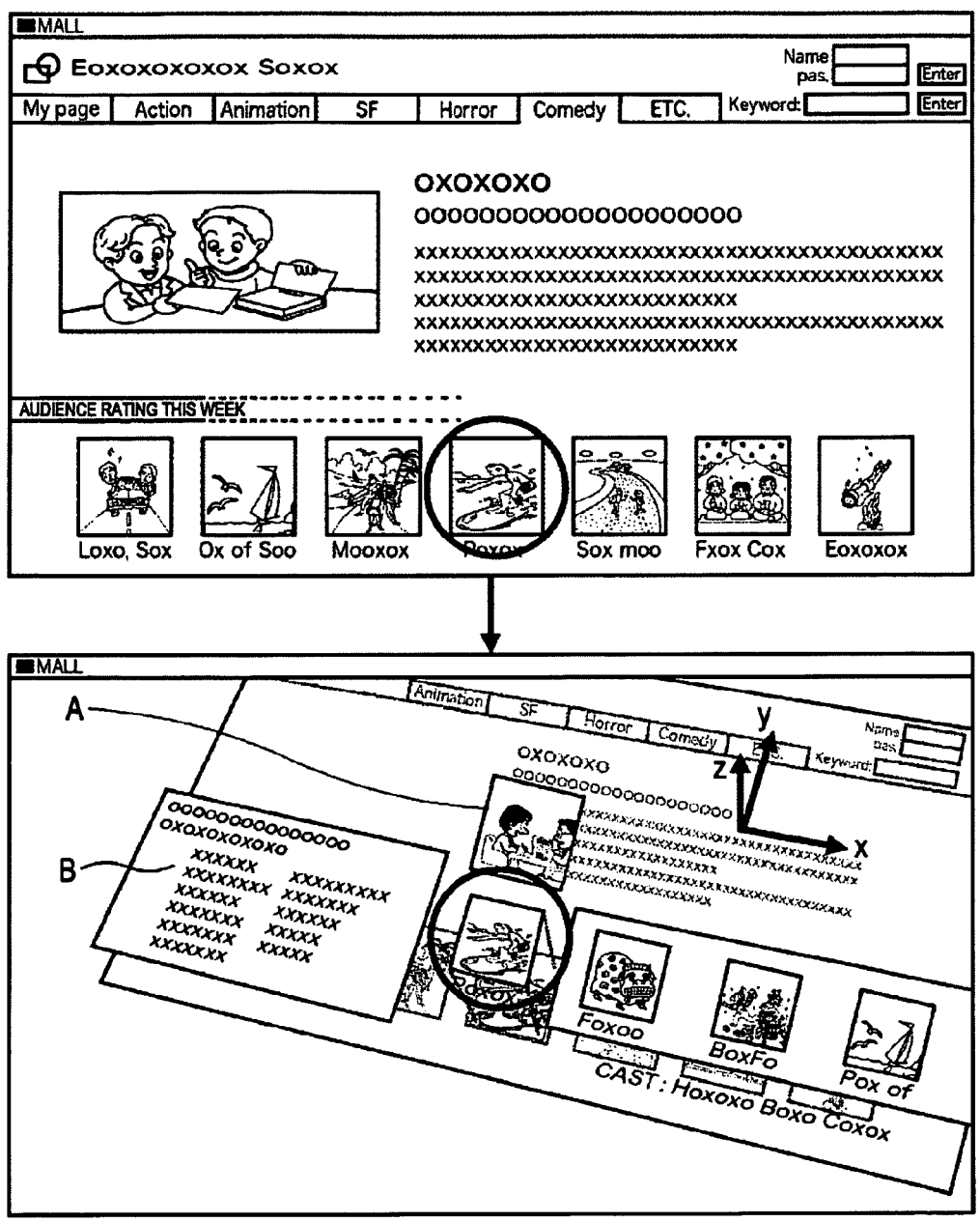
FIG. 9 illustrates a display example displayed on the display in the output unit.

If a left square bracket key ("[" symbol key) of the keyboard in the input unit 16 is pressed with the thumbnail image focused as shown in FIG. 9, the content of the focused thumbnail image is selected as a starting content. The personal computer is transitioned to the related search mode.

In the related search mode, a layer for displaying the thumbnail image of the related content related to the starting content is added in an overlay fashion to a layer for displaying the top-page mode screen as shown in the bottom portion of FIG. 9.

Axes of the image displayed in the related search mode are here described. The axes of the images displayed in the related search mode include mutually perpendicular axes, namely, x axis, y axis and z axis.

The layer for displaying the buttons and the thumbnail images is arranged in parallel with a plane of the x axis and the y axis (hereinafter referred to as an XY plane). The y axis represents a vertical direction of the buttons and the thumbnail images while the x axis represents a horizontal direction of the buttons and the thumbnail images.

The layer for displaying the thumbnail images of the related contents related to the starting content is arranged over the layer for displaying the top-page mode screen with a predetermined distance maintained therebetween in the direction along the z axis.

The layer for displaying the thumbnail images of the related contents related to the starting content displays, in addition to the thumbnail images of the related contents, a thumbnail image of the starting content, a scale-contracted moving image (thumbnail image of a moving image) and detailed information of the starting content.

As shown in FIG. 9, the thumbnail image of the starting content arranged in the layer for displaying the thumbnail image of the related content and the thumbnail image of the starting content arranged in the layer for displaying the top-page mode screen have the same positions along the x axis and the y axis but are spaced by a layer distance along the z axis.

In this way, the thumbnail image of the starting content is recognized at a glance. The user can thus come to grips with the current starting content.

A scale-contracted moving image of the starting content (thumbnail image as a moving image) labeled the letter A in FIG. 9 is displayed at a positive position along the y axis of the thumbnail image of the starting content arranged in the layer for displaying the thumbnail image of the related content. The detailed information in text of the starting content labeled the letter B is displayed at a negative position along the x axis at the thumbnail image of the starting content in the layer for displaying the thumbnail image of the related content.

The thumbnail image of at least one related content related to the starting content at a predetermined item is arranged along a line in parallel with the x axis at positive positions of the x axis at the thumbnail image of the starting content arranged in the layer for displaying the thumbnail image of the related content.

For example, if a performer of the starting content and a performer of the related content are the same person, the starting content and the related content are related to each other by the performer. If the film director of the starting content and the film director of the related content are the same person, the starting content and the related content are related to each other by the film director.

An item by which the starting content and the related content are related to each other is referred to as a category. If the starting content and the related content have the performer in common, the starting content and the related content are related by the category of the performer.

The category by which the starting content and the related content are related to each other and specific content of the category are displayed at a negative position along the y axis of the thumbnail images of a plurality of related contents arranged in a line in parallel with the x axis. More specifically, for example, a performer "aaa" in the starting content may also play in the related content. In such a case, the category of the performer and the name of the performer "aaa" are displayed at negative position along the y axis with respect to the thumbnail images of the plurality of related contents arranged in a line in parallel with the x line.

The thumbnail images of at least one related content in one category are surrounded by a model representing a group (for example, by a rectangular shape with a predetermined color).

The user can differentiate the category at a glance.

At least one model of the related contents in one category arranged in one line is also referred to as line.

When the personal computer is transitioned to the related search mode in response to the pressing of the left square bracket key of the keyboard in the input unit 16, the thumbnail image of the starting content arranged in the layer for displaying the thumbnail image of the related content is focused.

The focused thumbnail image is displayed in the center of the screen of the display 31.

As shown in FIG. 9, the line of sight of the camera serving as a reference in the drawing of the model such as the button and the thumbnail image is at a slant angle with respect to the layer in the related search mode. More specifically, the models such as the buttons and the thumbnail images are displayed in a manner such that the x, y and z axes are slant with respect to the screen of the display 31.

Figure 10:
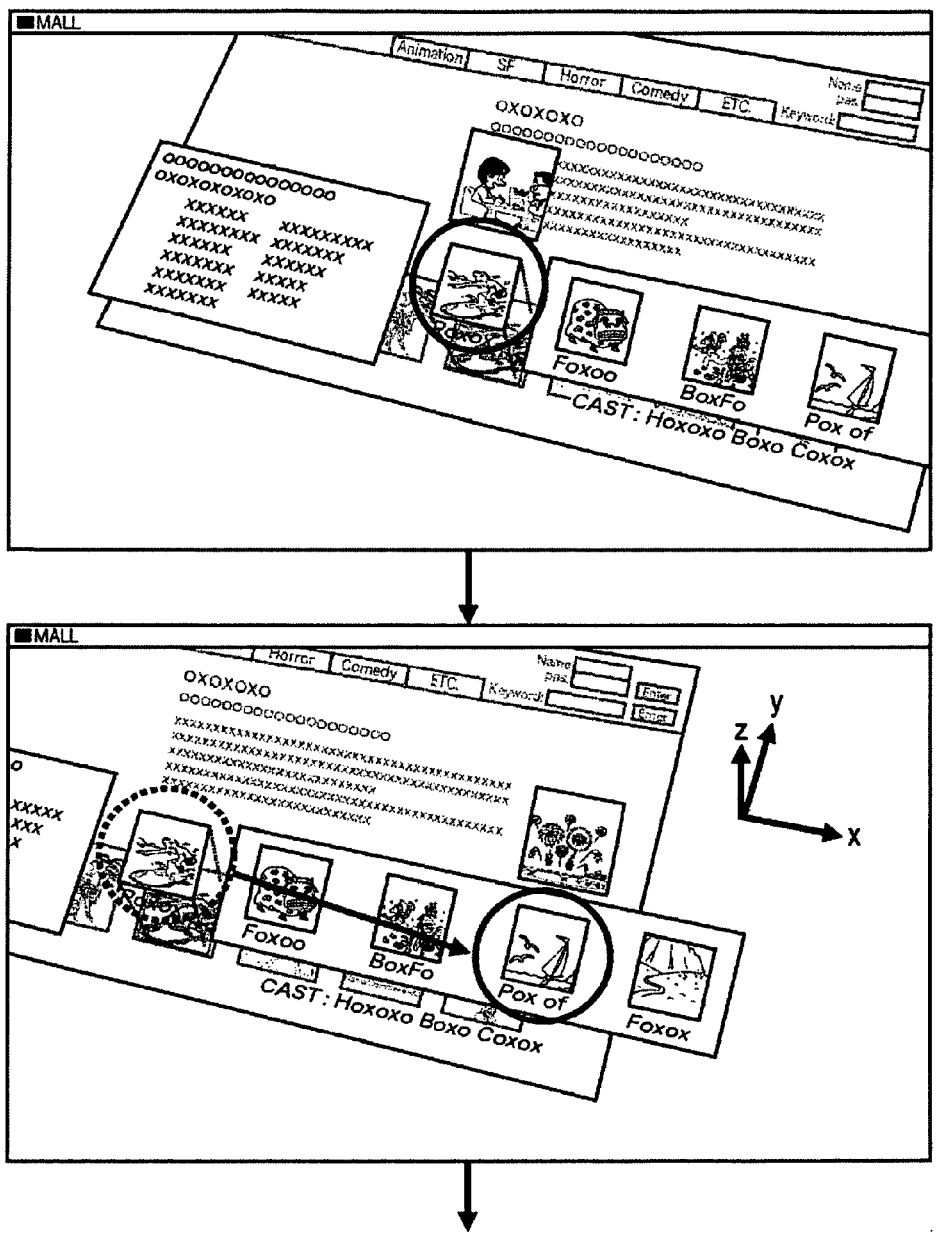
FIG. 10 illustrates a display example displayed on the display in the output unit.

The rightward looking arrow key of the keyboard in the input unit 16 may be pressed in the related search mode with one of the thumbnail image of the starting content and the thumbnail image of the related content focused as shown in FIG. 10. In such a case, a thumbnail image arranged next to the heretofore focused thumbnail image in the positive direction of the x axis is focused in the layer for displaying the thumbnail image of the related content in the related search mode. More specifically, focusing shifts across the thumbnail images in the positive direction along the x axis.

The leftward looking arrow key of the keyboard in the input unit 16 may be pressed in the related search mode with the thumbnail image of the related content focused. In such a case, a thumbnail image arranged next to the heretofore focused thumbnail image in the negative direction of the x axis is focused in the layer for displaying the thumbnail image of the related content in the related search mode. More specifically, focusing shifts across the thumbnail images in the negative direction along the x axis.

When focusing shifts across the thumbnail images, a scale-contracted moving image (thumbnail image as a moving image) of the focused thumbnail image of the related content is displayed at a position in the positive direction of the y axis. The moving image of the related content (thumbnail image as a moving image) having the unfocused thumbnail image is not displayed.

When focusing is shifted across the thumbnail images, a resulting focused thumbnail image is displayed in the center of the screen of the display 31.

Figure 11:
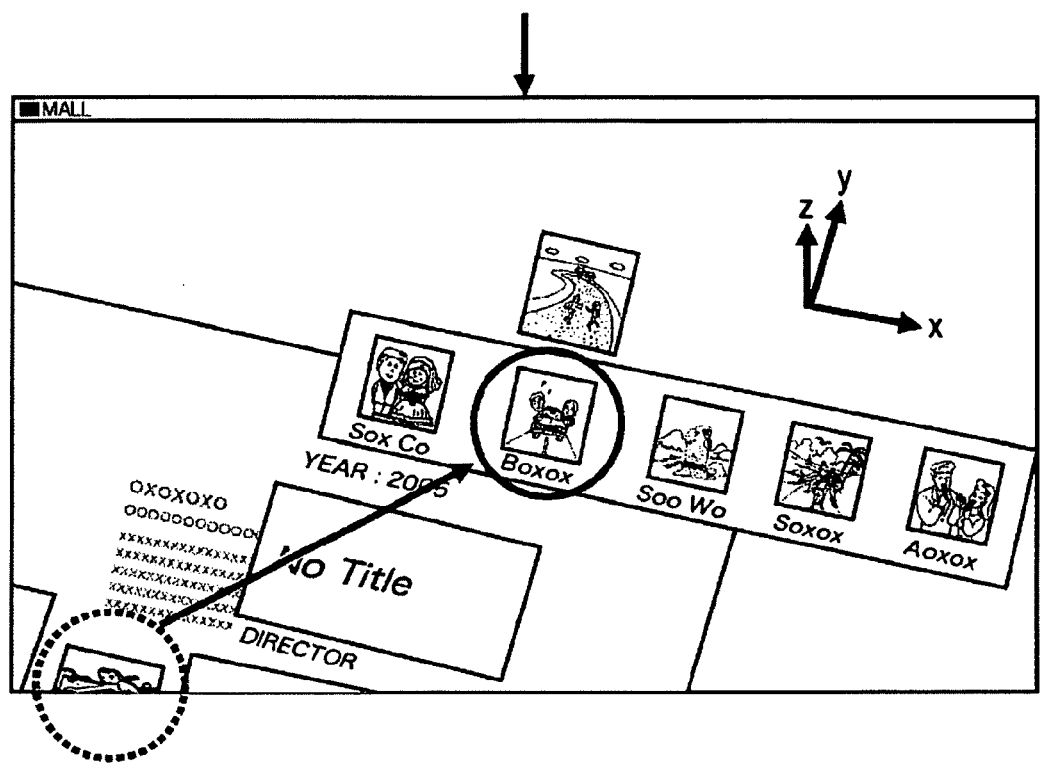
FIG. 11 illustrates a display example displayed on the display in the output unit.

The upward looking arrow key of the keyboard in the input unit 16 may be pressed in the related search mode. In response, thumbnail images of at least one related content related to the starting content by a new category are arranged in a line along the x axis at a position in the positive direction of the y axis with respect to the thumbnail images of at least one related content related to the starting content by a predetermined category arranged in a line along the x axis as shown in FIG. 11.

For example, thumbnail images of at least one related content related to the starting content by release year are arranged in a line along the x axis at a position in the positive direction of the y axis with respect to the thumbnail images of at least one related content related to the starting content by a performer "aaa."

The upward looking arrow key of the keyboard in the input unit 16 may be pressed in the related search mode, for example. In response, thumbnail images of the related content related to the starting content by director are arranged in a line along the x axis at a position in the positive direction of the y axis with respect to thumbnail images of at least one related content respectively related to the starting content by the performer "aaa" as shown in FIG. 11. Furthermore, thumbnail images of a plurality of related contents related to the starting content by release year are arranged in a line along the x axis at a position further in the positive direction of the y axis. As shown in FIG. 11, no related content related to the starting content by director is net-present and no corresponding thumbnail image is thus displayed.

The upward looking arrow key of the keyboard in the input unit 16 may be pressed in the related search mode, for example. In response, thumbnail images of at least one related content respectively related to the starting content by a new category are arranged in a line along the x axis. One of the thumbnail images related to the starting content by the new category is then focused.

The focused thumbnail image is displayed in the center of the screen of the display 31.

Similarly, the downward looking arrow key of the keyboard in the input unit 16 may be pressed in the related search mode, for example. In response, thumbnail images of at least one related contents respectively related to the starting content by a new category are arranged in a line along the x axis at a position in a negative direction of the y axis with respect to the thumbnail images of at least one related content respectively related to the starting content by a predetermined category arranged in a line along the x axis.

In response to the pressing of the downward looking arrow key of the keyboard in the input unit 16 in the related search mode, the thumbnail images of at least one related content respectively related to the starting content by the new category are thus arranged in a line along the x axis. One of the thumbnail images respectively related to the starting content by the new category is then focused. In this case as well, the focused thumbnail image is displayed in the center of the screen of the display 31.

The upward looking arrow key of the keyboard in the input unit 16 may be pressed in the related search mode with the thumbnail images of the related contents of the plurality of categories displayed. Focusing shifts upward through the thumbnail images in the positive direction of the y axis. If the downward looking arrow key of the keyboard in the input unit 16 is pressed, focusing shifts downward through the thumbnail images in a negative direction of the y axis.

Figure 12:
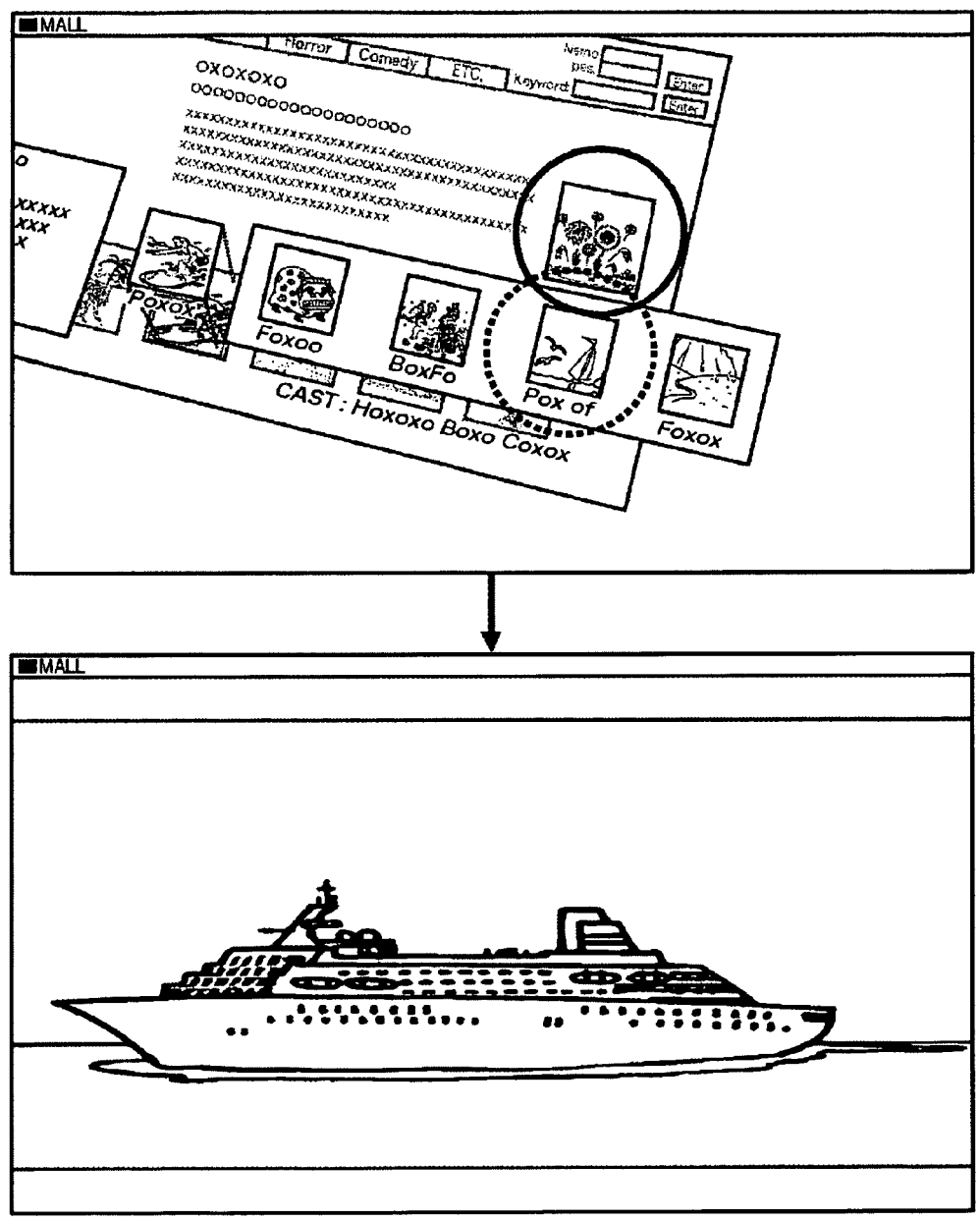
FIG. 12 illustrates a display example displayed on the display in the output unit.

The enter key of the keyboard in the input unit 16 may be pressed with the thumbnail image of the related content focused as shown in FIG. 12, for example. In response, the thumbnail image of the related content is selected and the related content is selected. The personal computer is transitioned to the play mode, thereby starting playing the selected content.

If the content is a moving image as shown in FIG. 12, the moving image is displayed instead of the focused thumbnail image. The moving image is expanded and displayed.

Figure 13:
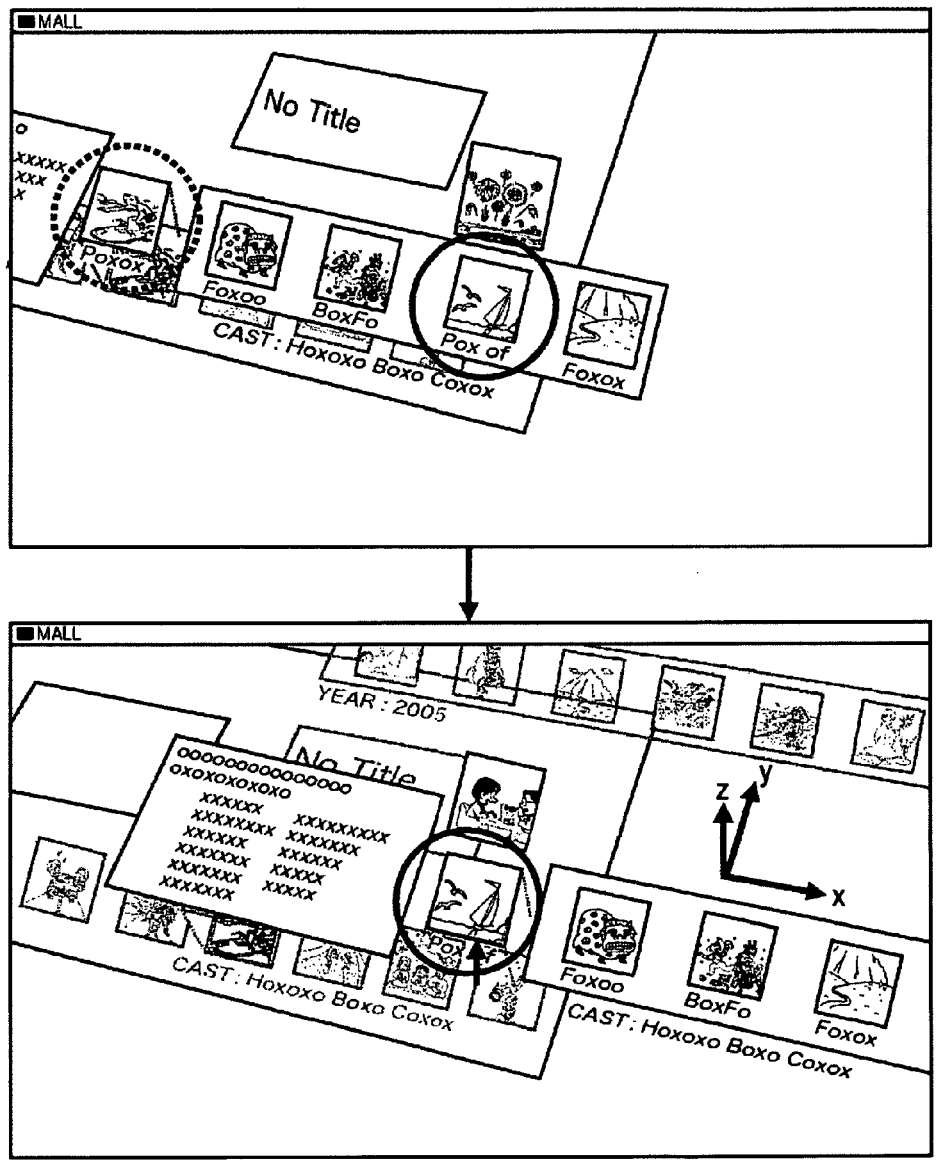
FIG. 13 illustrates a display example displayed on the display in the output unit.

The left square bracket key of the keyboard in the input unit 16 may be pressed in the related search mode with one of the thumbnail images of the related contents focused except the thumbnail image of the starting content. The related content of the focused thumbnail image is newly selected as a starting content as shown in FIG. 13. The layer for displaying the thumbnail image of the related content related to the newly selected starting content is placed over the layer for displaying the thumbnail image of the previous related content. The layer for displaying the thumbnail image of the related content related to the newly selected starting content is spaced from the layer for displaying the thumbnail image of the previous related content by a predetermined distance in the direction of the z axis.

One of the thumbnail images on the layer for displaying the thumbnail image of the related content related to the newly selected starting content is focused.

The images on the layer for displaying the thumbnail images of the preceding related content are displayed in a translucent state.

Figure 14:
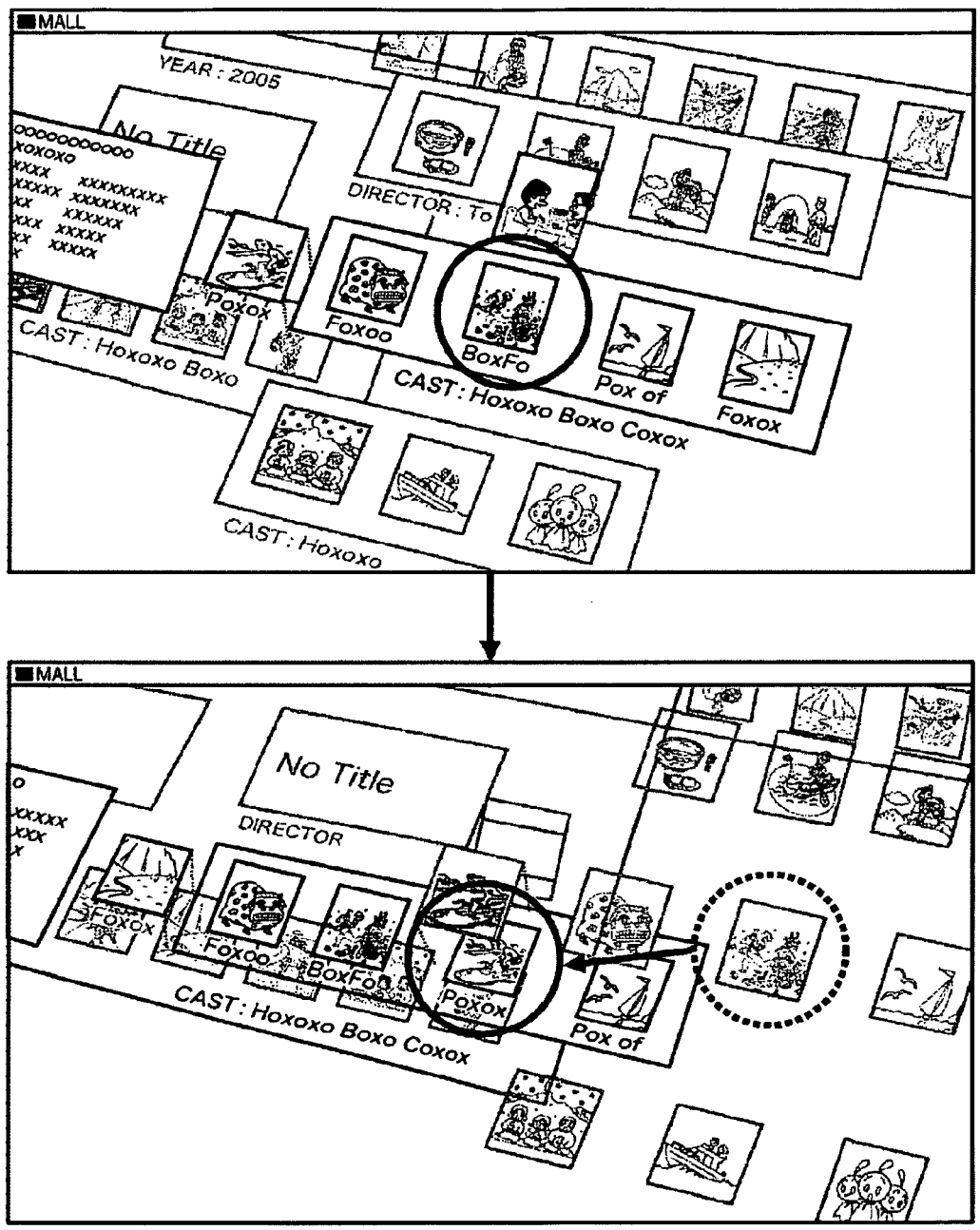
FIG. 14 illustrates a display example displayed on the display in the output unit.

The layer for displaying the thumbnail image of the related content related to the newly selected starting content is added as shown in FIG. 14. Then, the left square bracket key of the keyboard in the input unit 16 may be pressed with one of the thumbnail images of the new related contents focused. In response, focusing shifts to one of the thumbnail images displayed on the layer where the thumbnail images of the starting content of the related content having the preceding focused thumbnail image are displayed.

The images on the layer displaying the focused thumbnail image are displayed in a translucent state.

Focusing thus shifts, causing the resulting focused thumbnail image to be displayed in the center of the screen of the display 31.

The images on the layer for displaying the preceding focused thumbnail image are displayed in a translucent state. From among the thumbnail images including once focused one, one related content different from the one selected as the starting content may be selected as a new starting content. In response, the images on the layer for displaying the preceding focused thumbnail image are deleted.

More specifically, a past search sequence of the related content in the layer of the thumbnail image of the content newly selected as the starting content is deleted.

Figure 15:
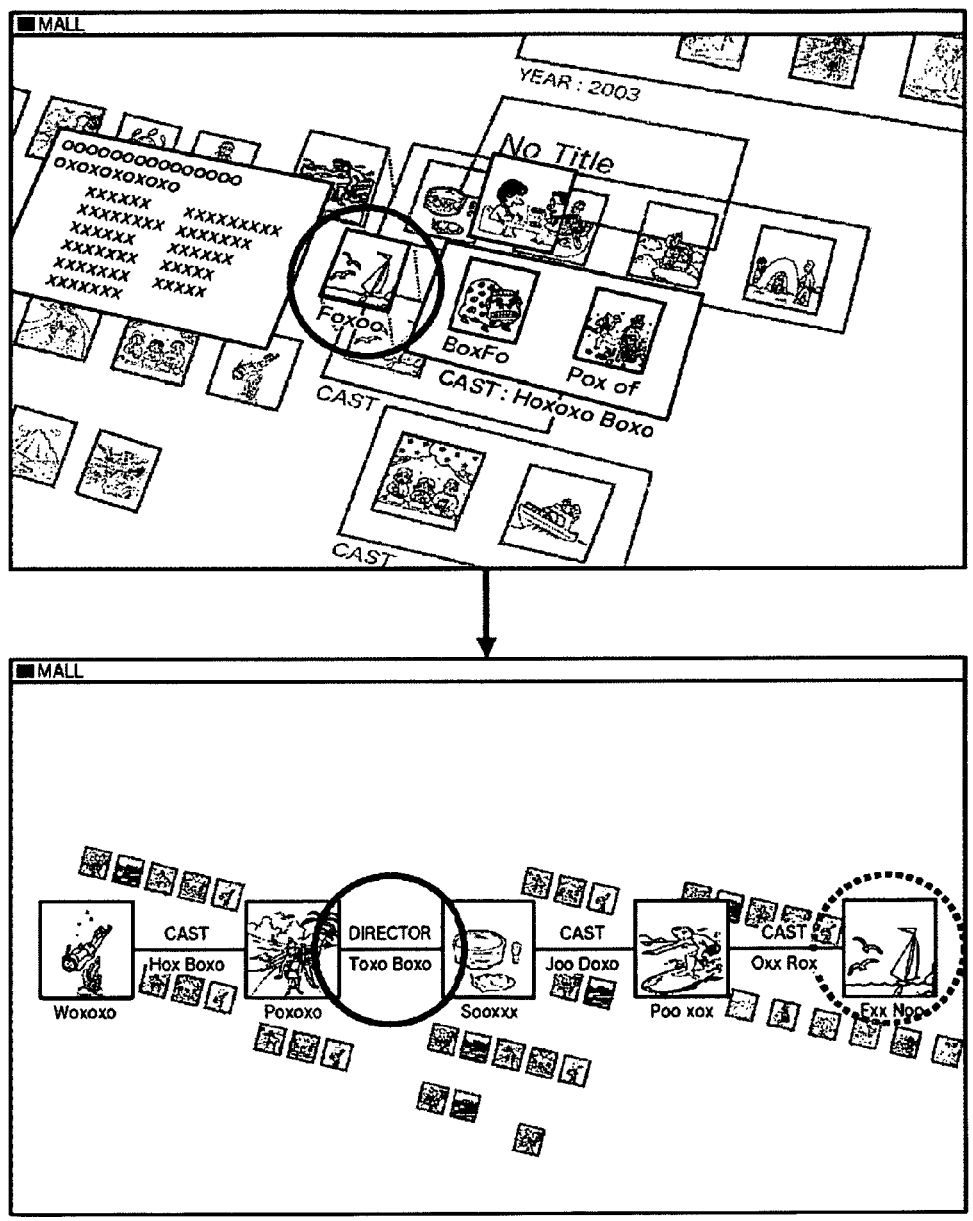
FIG. 15 illustrates a display example displayed on the display in the output unit.

As shown in FIG. 15, the personal computer is transitioned to the summary mode if the B key of the keyboard in the input unit 16 is pressed in the related search mode.

In the summary mode, the thumbnail images of the starting contents are arranged from left to right in the order of selection of the starting contents in a horizontal line on the screen of the display 31.

In the summary mode, the leftmost thumbnail image on the screen is a thumbnail image of the starting content selected first, the second thumbnail image from the left on the screen is a thumbnail image of the second starting content selected from the related contents related to the starting content selected first. The third thumbnail image from the left on the screen is a thumbnail image of the third starting content selected from the related contents related to the starting content selected second.

More specifically, if a left one of two thumbnail images juxtaposed is selected as a starting content, a right one of the two thumbnail images is a thumbnail image of a starting content selected from related contents related to the starting content of the left thumbnail image in the summary mode.

In the summary mode, the thumbnail images consecutively horizontally arranged are connected by horizontal lines.

In the summary mode, a category as a related item and a specific content of the category are described between the thumbnail image of the content selected as a starting content and the thumbnail image of the starting content selected from the related contents related to the first starting content.

If a P key of the keyboard in the input unit 16 is pressed in the summary mode, the personal computer is shifted to the overhead-view mode.

Figure 16:
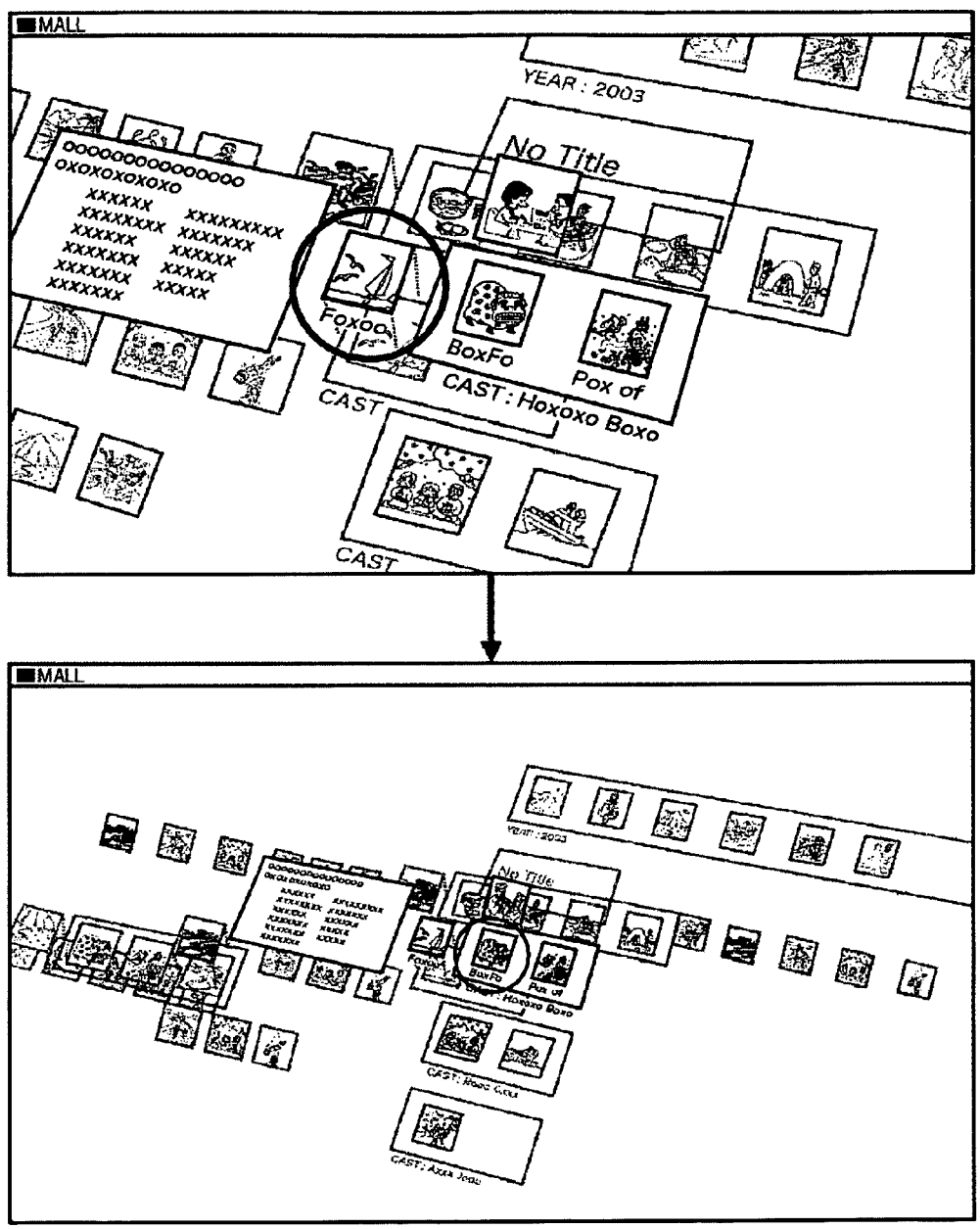
FIG. 16 illustrates a display example displayed on the display in the output unit.

In the overhead-view mode of FIG. 16, the viewpoint of the camera serving as a reference in the drawing of the three-dimensional model, namely, serving as a reference in the drawing of the buttons and the thumbnail images is withdrawn in a direction away from the model such as the button and the thumbnail image. More specifically, the camera retreats.

Figure 17:
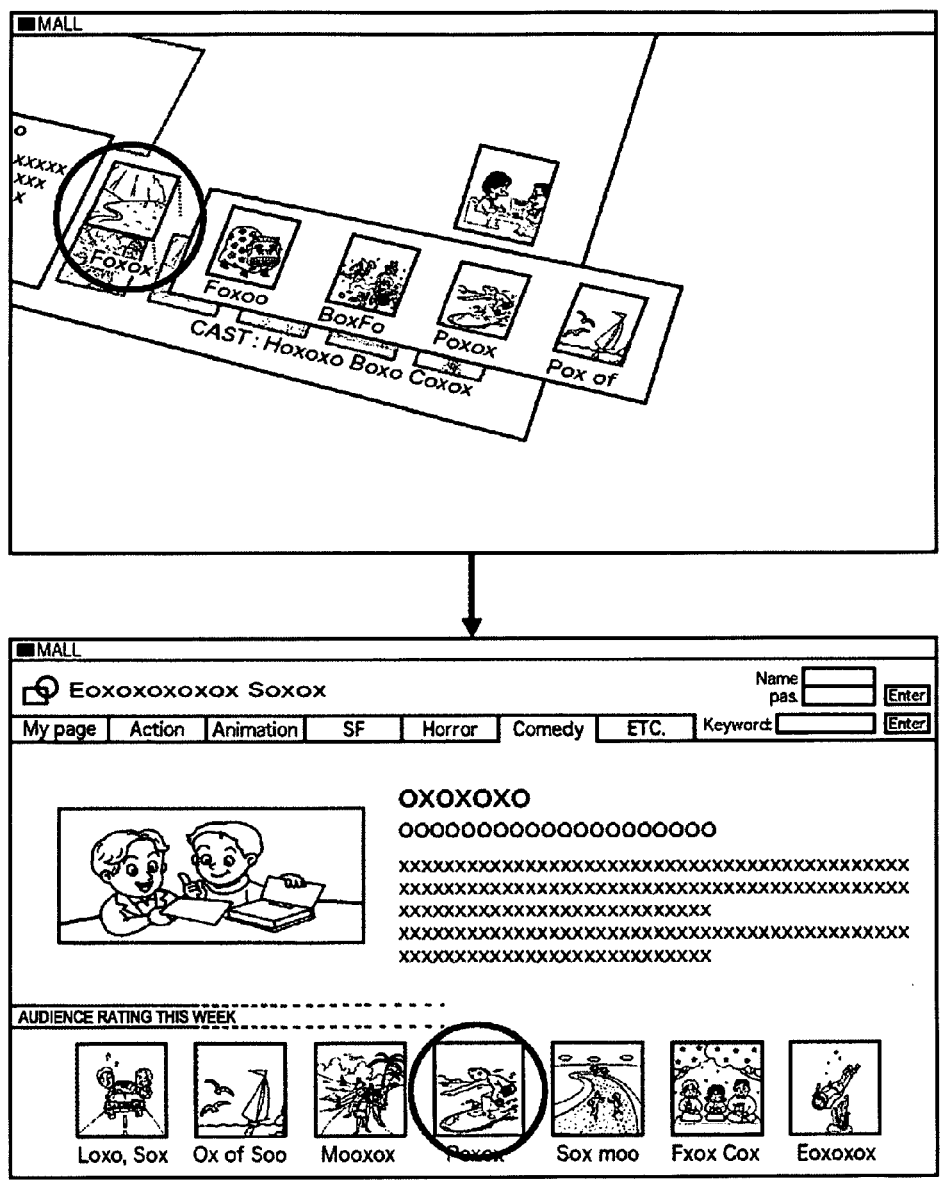
FIG. 17 illustrates a display example displayed on the display in the output unit.

As shown in FIG. 17, the thumbnail image of the first searched related content is focused, i.e., the content of the thumbnail image in the top-page mode is selected as a starting content and the thumbnail image of the related content searched in accordance with the selected starting content is focused. If in this state a right square bracket key ("]" symbol key) of the keyboard in the input unit 16 is pressed, the personal computer is transitioned to the top-page mode.

In response to the transition from the related search mode to the top-page mode, the past search sequence of the related contents is deleted.

The line of sight of the camera serving as a reference in the drawing the three-dimensional model is forced to be in alignment with the z axis.

Focusing shifts to a thumbnail image of a content selected as a starting content in the top-page mode prior to transitioning to the related search mode.

If one of the enter key and the right square bracket key of the keyboard in the input unit 16 is pressed in the play mode as shown in FIG. 18, the playing of the content is quit. The personal computer is transitioned to one of the top-page mode and the related search mode. If the mode prior to the play mode is the top-page mode, the personal computer is transitioned to the top-page mode subsequent to the end of playing. If the mode prior to the play mode is the related search mode, the personal computer is transitioned to the related search mode subsequent to the end of playing.

Figure 19:
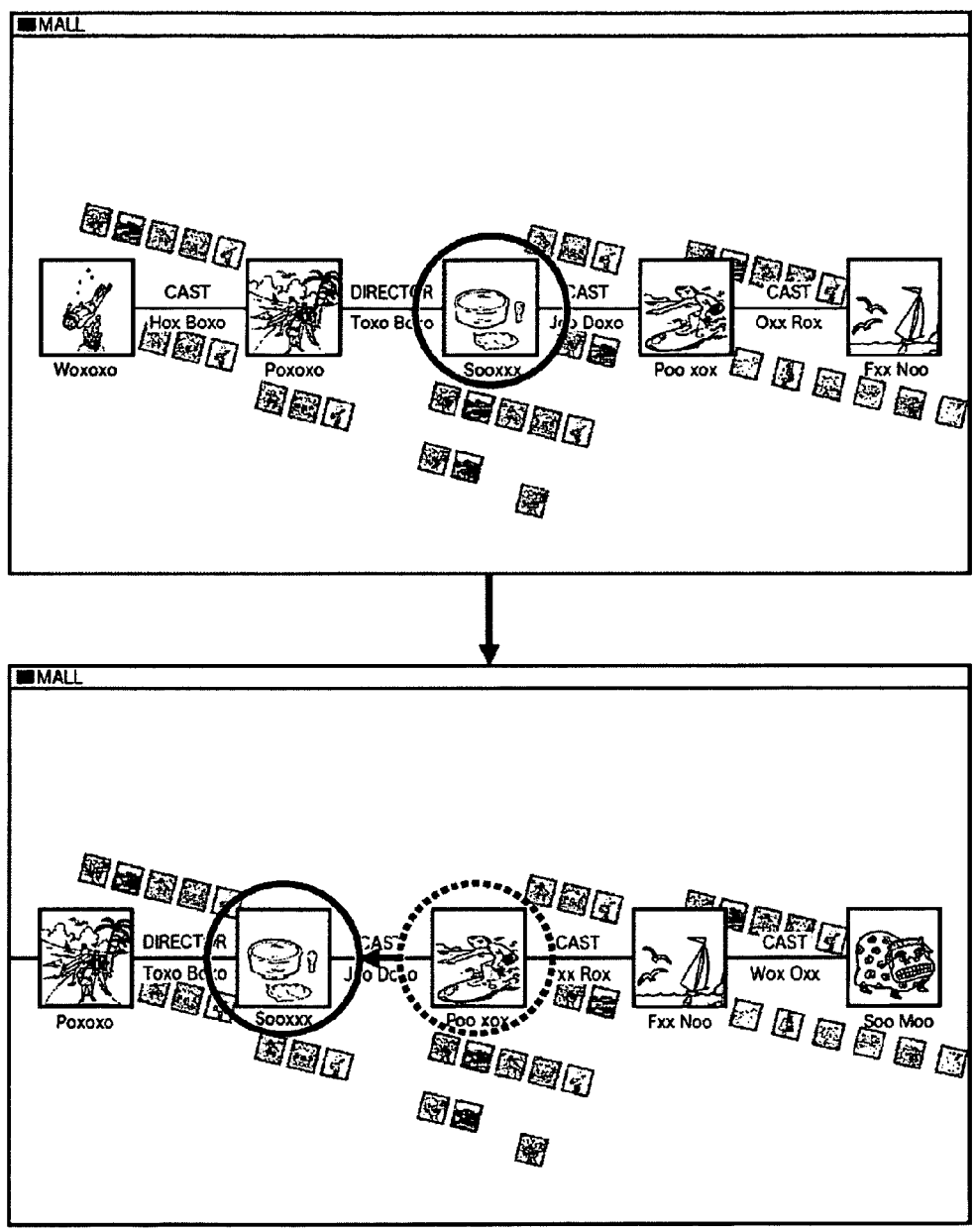
FIG. 19 illustrates a display example displayed on the display in the output unit.

If the rightward looking arrow key of the keyboard in the input unit 16 is pressed in the summary mode, the thumbnail image to the right of the heretofore focused thumbnail image is focused as shown in FIG. 19. Focusing thus shifts rightward across the thumbnail images.

If the leftward looking arrow key of the keyboard in the input unit 16 is pressed in the summary mode, the thumbnail image to the left of the heretofore focused thumbnail image is focused. Focusing thus shifts leftward across the thumbnail images.

If focusing shifts across the thumbnail images in the summary mode, the focused thumbnail image is displayed in the center of the screen of the display 31.

Figure 20:
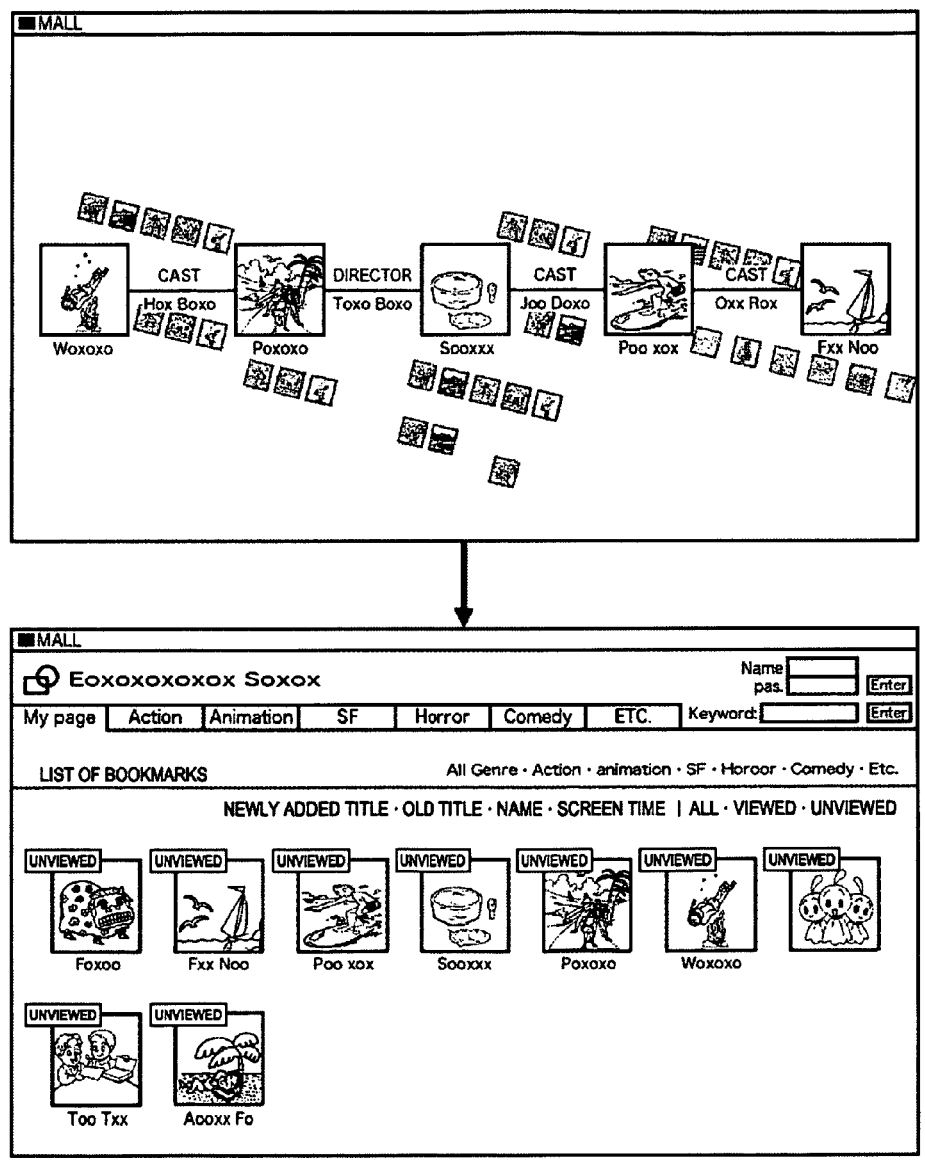
FIG. 20 illustrates a display example displayed on the display in the output unit.

If the left square bracket key of the keyboard in the input unit 16 is pressed in the summary mode, the content selected as a starting content is bookmarked as shown in FIG. 20. More specifically, information identifying the content selected as the starting content is stored on the bookmark database 62. The personal computer is then transitioned to the top-page mode. When the personal computer is transitioned from the summary mode to the top-page mode, the past search sequence of the related contents in the related search mode is deleted.

If one of the right square bracket key and the B key of the keyboard in the input unit 16 is pressed in the summary mode, the personal computer is transitioned to the related search mode as shown in FIG. 21. Subsequent to transitioning to the related search mode, the personal computer deletes thumbnail images of the starting contents displayed in the selection order of the starting contents from the left, the categories as the related items and the specific contents of the categories.

Figure 22:
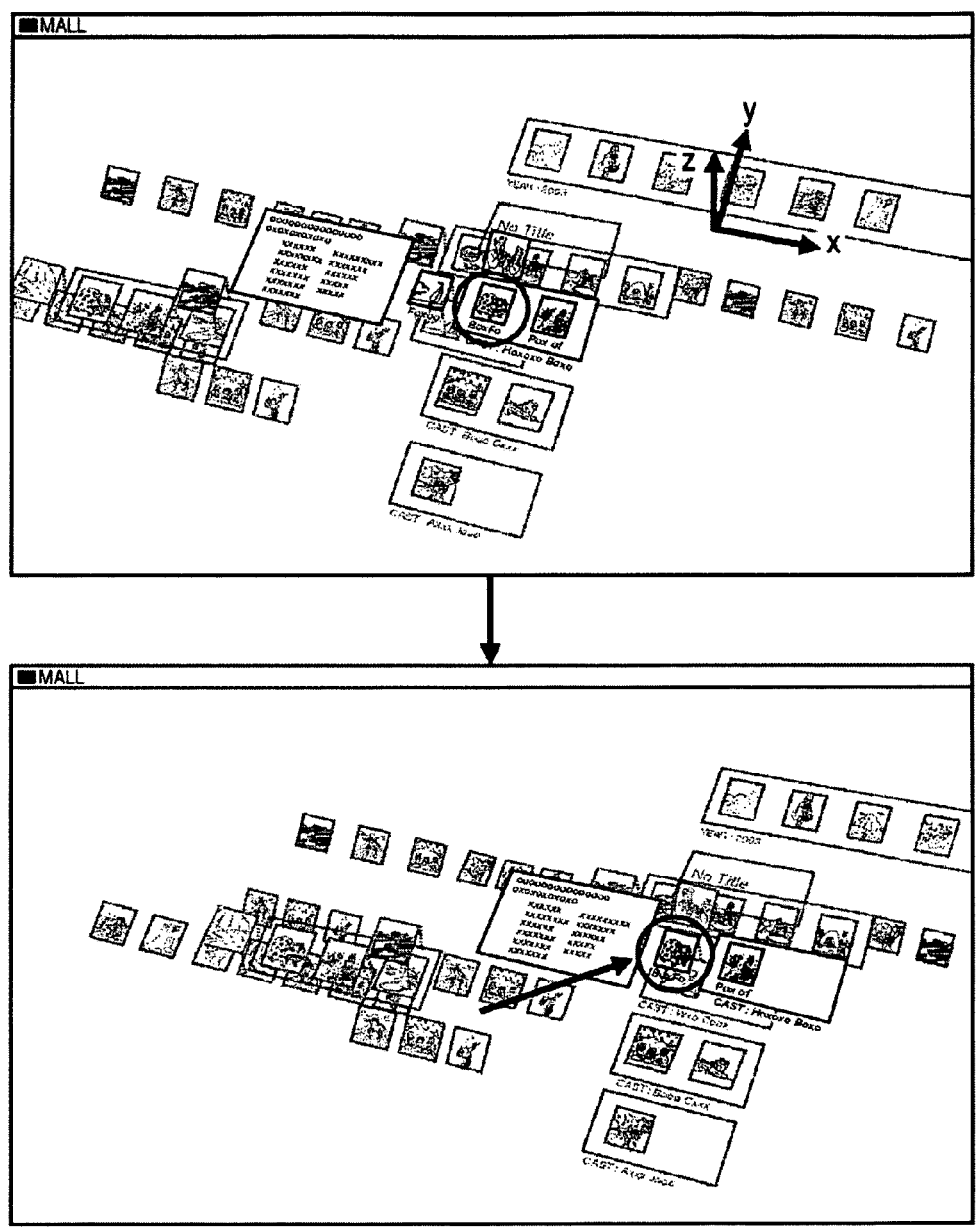
FIG. 22 illustrates a display example displayed on the display in the output unit.

One of the upward looking arrow key, the downward looking arrow key, the rightward looking arrow key and the leftward looking arrow key may be pressed with the P key of the keyboard in the input unit 16 remaining pressed in the overhead-view mode. In response, the viewpoint of the camera serving as a reference in the drawing of the three-dimensional model composed of the buttons and the thumbnail images is then shifted in one of the positive direction of the x axis, the negative direction of the x axis, the negative direction of the y axis and the positive direction of the y axis as shown in FIG. 22.

Figure 23:
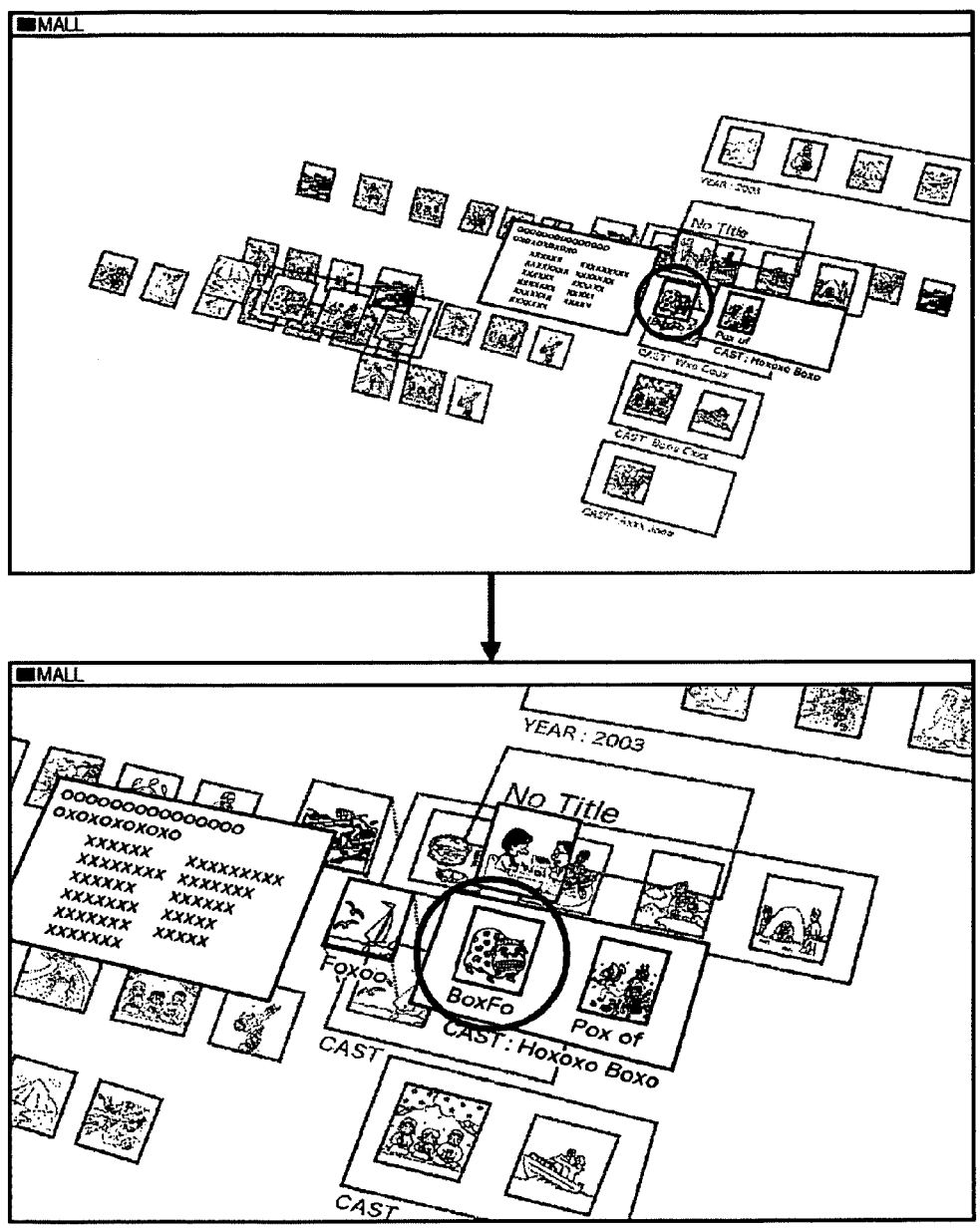
FIG. 23 illustrates a display example displayed on the display in the output unit.

If the P key of the keyboard in the input unit 16 is pressed in the overhead-view mode, the personal computer is transitioned to the related search mode as shown in FIG. 23. More specifically, the viewpoint of the camera returns to the original position from the retreat position.

In this way, the personal computer is transitioned to any of the top-page mode, the related search mode, the play mode, the summary mode and the overhead-view mode.

Figure 24:
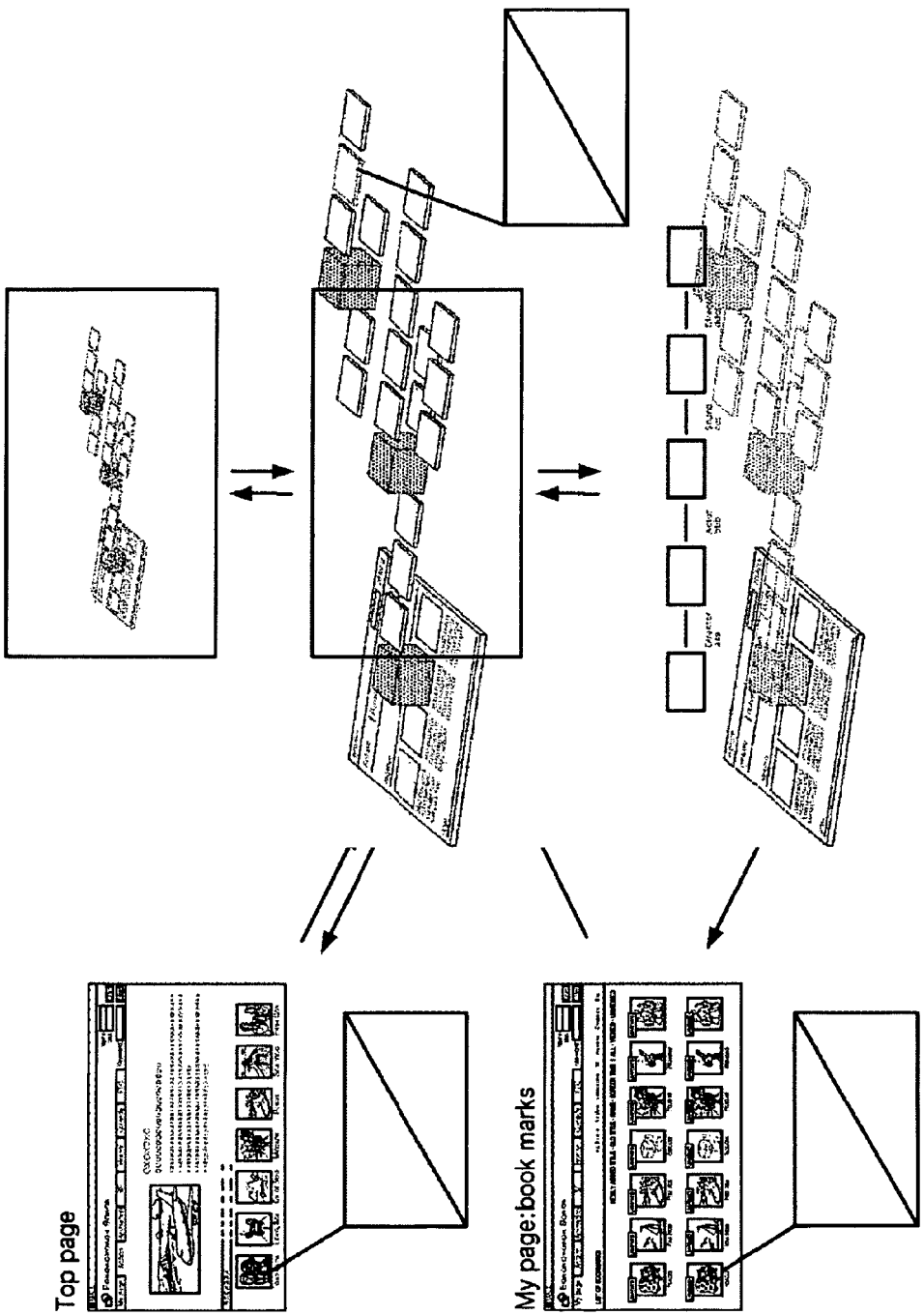
FIG. 24 illustrates a display mode of the personal computer.

If the enter key is pressed in the top-page mode with the thumbnail image focused, the personal computer is transitioned to the play mode as shown in FIG. 24. The content of the focused thumbnail image starts to be played.

If the left square bracket key is pressed with the thumbnail image focused in the top-page mode, the personal computer is transitioned to the related search mode. The content of the focused thumbnail image is selected as a starting content. The related contents related to the starting content are thus searched. The thumbnail images of the related contents are arranged in a layer different from the layer for displaying the images of the top-page mode.

If the left square bracket key is pressed with the thumbnail image of the related content focused in the related search mode, the related content of the focused thumbnail image is newly selected as a starting content. New related contents related to the new starting content are thus searched. The thumbnail image of the new related content is arranged in a layer different from the layer displaying the thumbnail image of the preceding related content.

If one of the upward looking arrow key and the downward looking arrow key is pressed in the related search mode, a new related content related to the starting content is searched. The thumbnail image of the newly hit related content is displayed on a per category basis in the layer for displaying the thumbnail image of the related content of the preceding category.

If the enter key is pressed in the related search mode, the personal computer is transitioned to the play mode. The content of the focused thumbnail image starts to be played.

If the B key is pressed in the related search mode, the personal computer is transitioned to the summary mode. The thumbnail images of the starting contents arranged in the selection order in a horizontal line, the categories as related items and the specific contents of the categories are displayed.

In response to the pressing of the left square bracket key in the summary mode, the content selected as a starting content is bookmarked, namely, registered in my page.

If the enter key is pressed with the thumbnail image of the bookmarked content focused in my page, the personal computer is transitioned to the play mode. The content of the focused thumbnail image starts to be played.

If the left square bracket key is pressed with the thumbnail image of the bookmarked content focused in my page, the personal computer is transitioned to the related search mode. The content of the focused thumbnail image is selected as a starting content and new related contents related to the starting content are then searched.

The display examples displayed on the display 31 discussed with reference to FIGS. 5 through 23 are described with reference flowcharts of FIGS. 25 through 33.

The display process of the mode determiner 52 is discussed below. The mode determiner 52 performs the display process when the top-page mode is set as a display mode.

Figure 25:
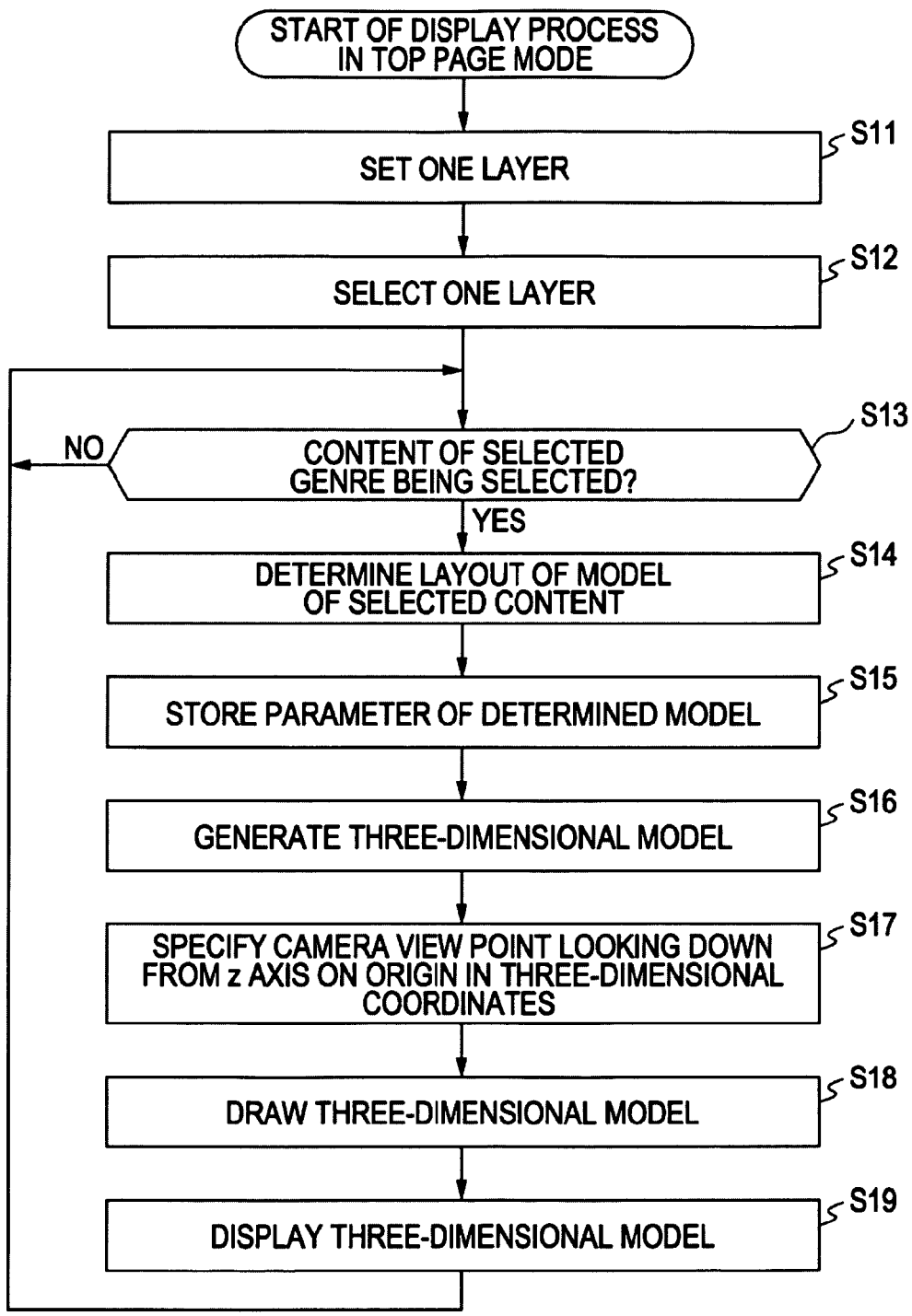
FIG. 25 is a flowchart illustrating a display process in a top-page mode.

FIG. 25 is the flowchart illustrating the display process of the top-page mode. In step S11, the layer layout determiner 102 in the model parameter determiner 53 sets one layer by setting 1 to a parameter determining the number of layers. In step S12, the layer layout determiner 102 in the model parameter determiner 53 references a model parameter stored on the model parameter storage 107 to select a layer to be drawn. The layer layout determiner 102 selects the layer by setting, to a parameter determining the layer to be drawn, a value identifying the lowest layer heretofore drawn. The lowest layer is a layer having the smallest coordinate value in the z axis.

The top page is displayed on the lowest layer in the related search mode. When the personal computer is transitioned from the related search mode to the top-page mode, the top page may be displayed by referencing the model of the once displayed top-page mode.

In step S12 in a first cycle from the start of the display process, the model parameter storage 107 stores no model parameter. The layer layout determiner 102 sets a predetermined value as a default value to the parameter determining the layer to be drawn. The predetermined value identifies a layer to be newly generated.

The genre-sorted content selector 56 selects the content of the genre selected based on data input from the input controller 51 in response to a user operation applied to the input unit 16. In step S13, the top-page model parameter determiner 104 in the model parameter determiner 53 determines, based on the selection results of the content, whether the content of the selected genre is selected. If it is determined in step S13 that the content of the selected genre is not selected, step S13 is repeated until the content of the selected genre is selected.

If it is determined in step S13 that the content of the selected genre is selected, processing proceeds to step S14. In step S14, the top-page model parameter determiner 104 in the model parameter determiner 53 determines the layout of the model of the content selected by the genre-sorted content selector 56. For example, in step S14, the top-page model parameter determiner 104 determines the layout of the model by setting, to the parameter describing the layout of the thumbnail image of the content selected by the genre-sorted content selector 56, a value identifying the thumbnail image of the selected content, and values indicating positions in the x, y and z axes.

In step S15, the model parameter storage 107 in the model parameter determiner 53 stores the determined parameter of the model subsequent the determination in step S14.

In step S16, the three-dimensional model generator 54 references the model template data 72, thereby generating a three-dimensional model described in VRML.

In step S17, the view-point specifier 71 in the mode determiner 52 specifies to the display controller 55 the viewpoint of the camera looking from the z axis on the origin in the three-dimensional coordinates of the x, y and z axes.

In step S18, the drawing unit 73 in the display controller 55 draws the three-dimensional model generated in step S16 from the viewpoint specified in step S17, thereby generating display data for displaying the three-dimensional model.

In step S19, the display controller 55 causes the display 31 to display the three-dimensional model in accordance with the display data generated in step S18. Processing returns to step S13.

A display process of the related search mode is described below. The mode determiner 52 performs the display process when the personal computer determines the related search mode as the display mode.

Figure 26:
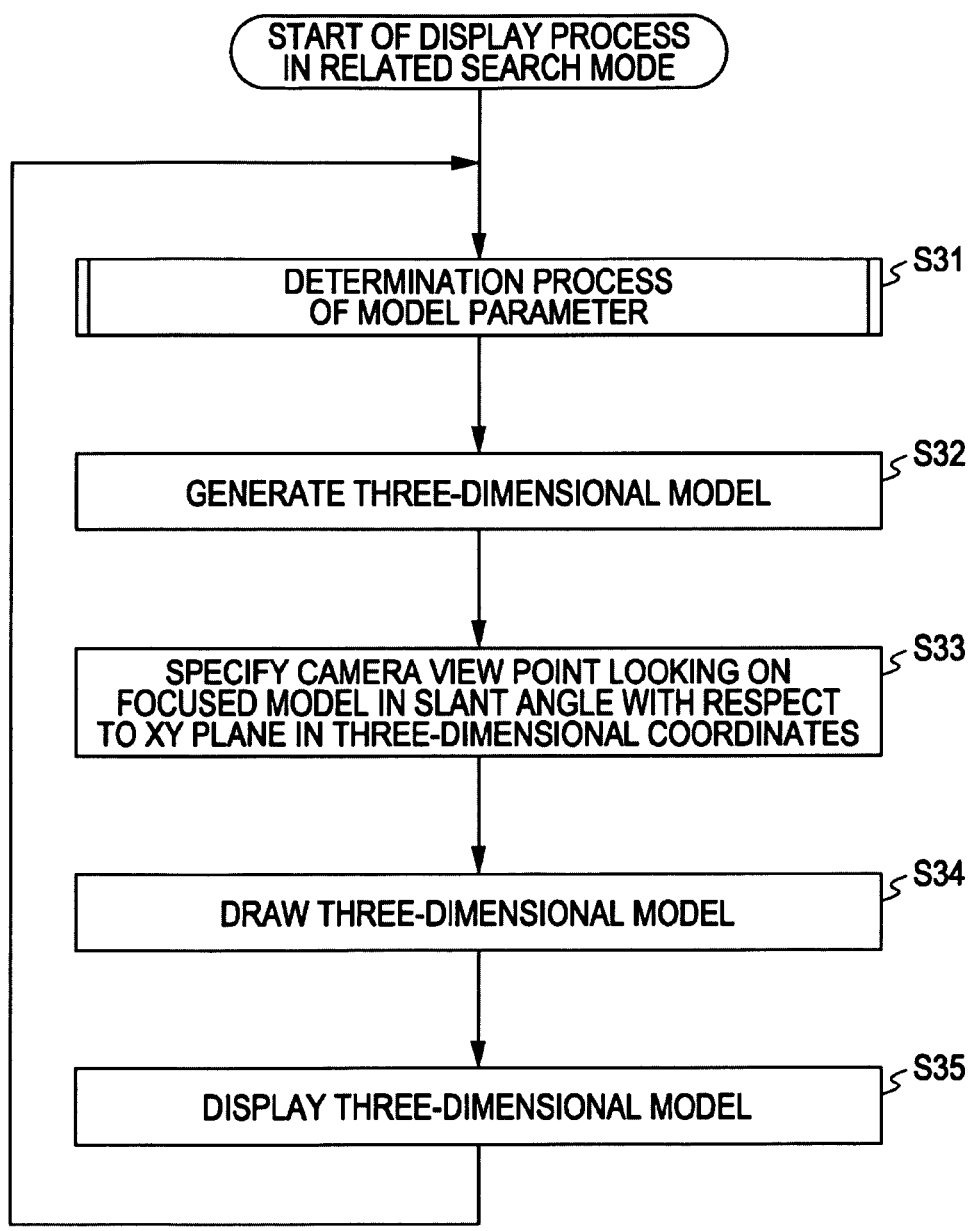
FIG. 26 is a flowchart illustrating a display process in a related search mode.

FIG. 26 is a flowchart illustrating the display process of the related search mode. In step S31, a model parameter is determined. The parameter determination process in step S31 will be described in detail later with reference to a flowchart of FIG. 27.

In step S32, the three-dimensional model generator 54 references the model template data 72 based on the determined parameter, and generates a three-dimensional model described in VRML, for example.

In step S33, the view-point specifier 71 in the mode determiner 52 specifies to the display controller 55 a viewpoint of the camera looking toward a focused model at a slant angle with respect to the XY plane determined by the x and y axes in the three coordinates of the x, y and z axes.

In step S34, the drawing unit 73 in the display controller 55 draws the three-dimensional model generated in step S32 from the viewpoint specified in step S33, thereby generating display data for displaying the three-dimensional model.

In step S35, the display controller 55 causes the display 31 to display the three-dimensional model based on the display data generated in step S34. Processing returns to step S31.

Figure 27:
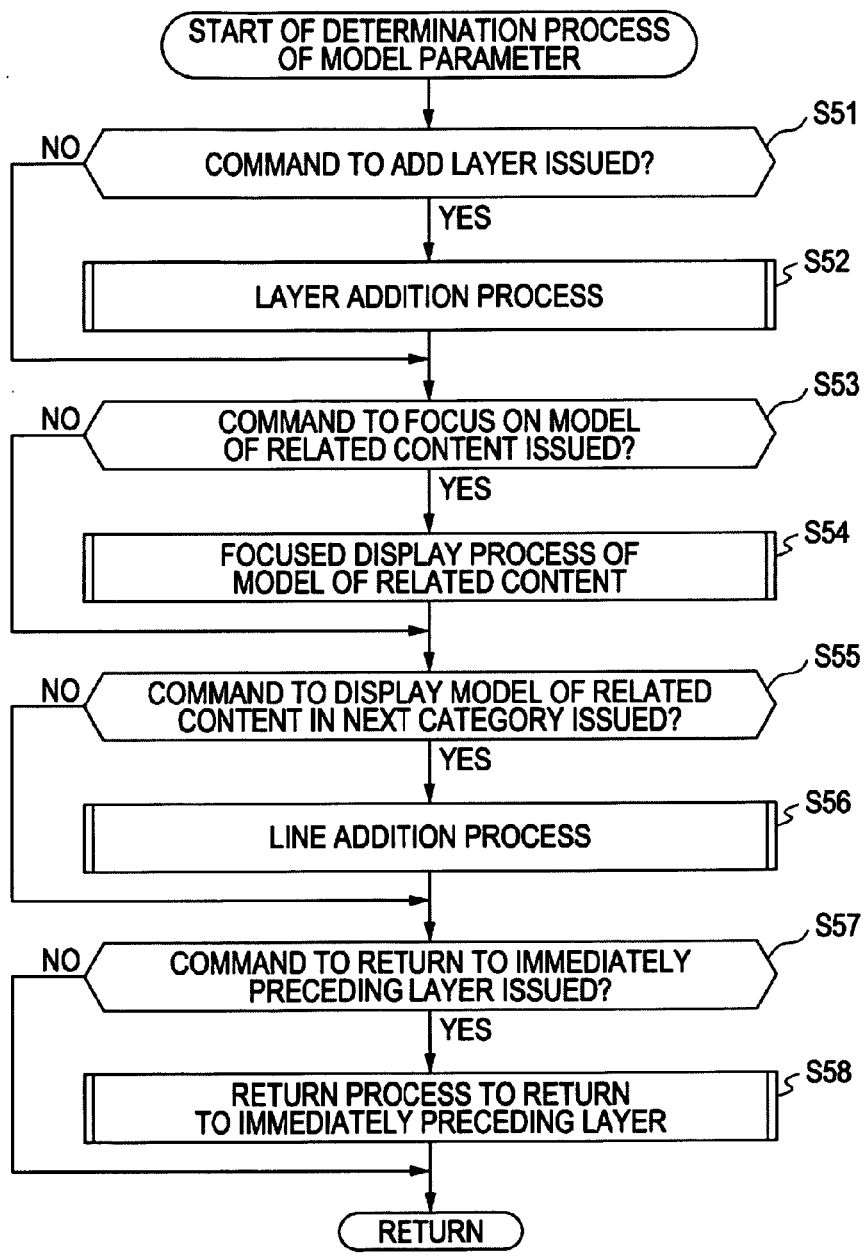
FIG. 27 is a flowchart illustrating a determination process of a parameter of a model.

The model parameter determination process corresponding to step S31 is described below with reference to the flowchart of FIG. 27. In step S51, the layer layout determiner 102 determines whether layer addition is requested, based on data input from the input controller 51 in response to a user operation to the input unit 16.

When the thumbnail images of the plurality of contents are displayed on the top-page mode screen as shown in the top portion of FIG. 9, the user may specify a single content for selection from among the plurality of contents using the input unit 16. In response, the input unit 16 inputs a command to select the content from among the plurality of contents in response to the user operation for the thumbnail image displayed on the layer. The input controller 51 supplies the model parameter determiner 53 with data representing the selected content. The layer layout determiner 102 in the model parameter determiner 53 determines whether a command to add a layer is issued, based on the data input from the input controller 51 in response to the user operation on the input unit 16. For example, if the data representing the selected content is input from the input controller 51, the layer layout determiner 102 determines that the command to add the layer has been issued.

If it is determined in step S51 that the command to add the layer has been issued, processing proceeds to step S52. In step S52, a layer addition process is performed.

Subsequent to step S52, processing proceeds to step S53.

If it is determined in step S51 that the layer addition command has not been issued, processing proceeds to step S53 with step S52 skipped.

In step S53, the focus position determiner 101 determines whether a command to focus on the model of the related content has been issued, based on data input from the input controller 51 in response to the user operation on the input unit 16. If it is determined in step S53 that a command to focus on the model of the related content has been issued, processing proceeds to step S54. A focused display process of the model of the related content is performed.

Processing proceeds to step S55 subsequent to step S54.

If it is determined in step S53 that no command to focus on the model of the related content has been issued, processing proceeds to step S55 with step S54 skipped.

In step S55, the related search model parameter determiner 105 determines whether a command to display the model of a related content of a next category has been issued, based on data input from the input controller 51 in response to the user operation on the input unit 16. If it is determined in step S55 that a command to display the model of a related content of a next category has been issued, processing proceeds to step S56. Step S56 is a line addition process of a line along which models of the next category is displayed.

Processing proceeds to step S57 subsequent step S56.

If it is determined in step S55 that a command to display the model of the related content of the next category has not been issued, processing proceeds to step S57 with step S56 skipped.

In step S57, the related search model parameter determiner 105 determines whether a command to return to an immediately preceding layer has been issued, based on data input from the input controller 51 in response to the user operation on the input unit 16. If it is determined in step S57 that a command to return to an immediately preceding layer has been issued, processing proceeds to step S58. The return process to return to the immediately preceding layer is performed, and the model parameter determination process ends.

If it is determined in step S57 that a command to return to an immediately preceding layer has not been issued, the model parameter determination process ends with step S58 skipped.

Figure 28:
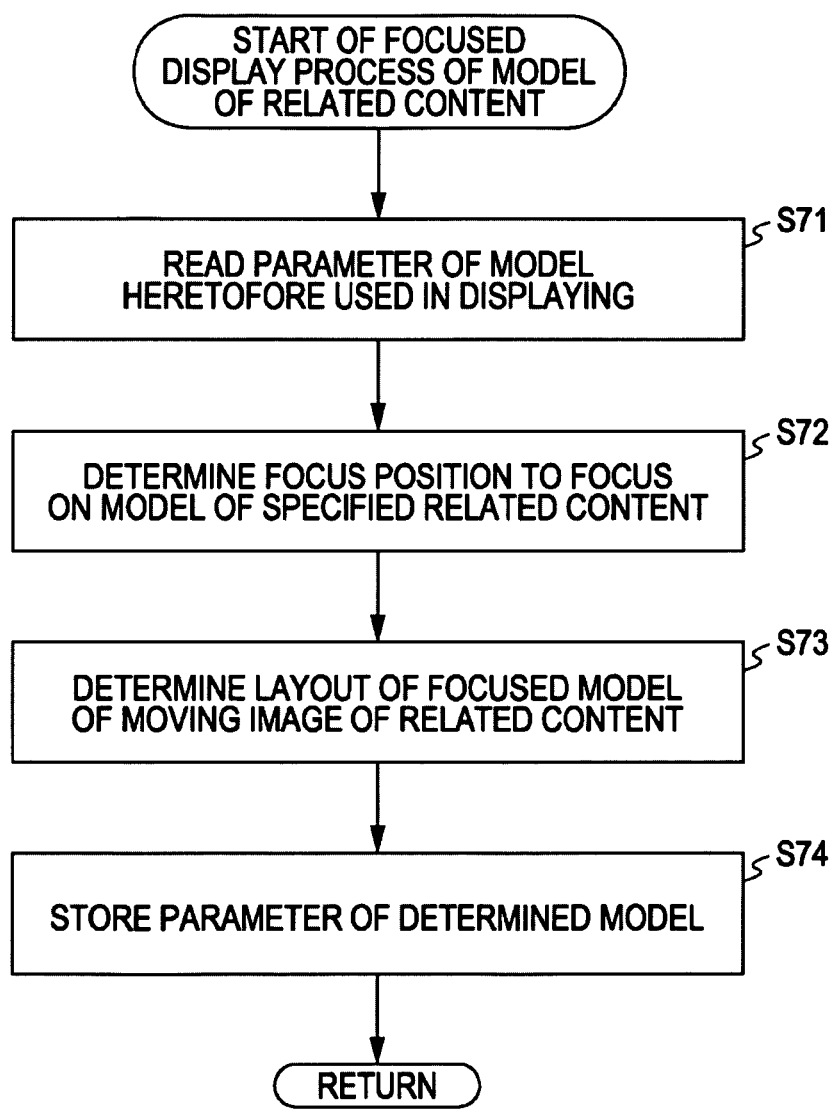
FIG. 28 is a flowchart illustrating a focused display process of a model of related content.

The focused display process of the model of the related content corresponding to step S56 is described below with reference to a flowchart of FIG. 28. In step S71, the focus position determiner 101 reads from the model parameter storage 107 the model parameter heretofore used in displaying.

In step S72, the focus position determiner 101 references the model parameter heretofore used in displaying read from the model parameter storage 107 and determines a focus position to focus on the model of the related content specified. More specifically, the focus position determiner 101 identifies the thumbnail image to be focused and then supplies the related search model parameter determiner 105 with data representing the identified thumbnail image.

In step S73, the moving image model layout determining unit 124 in the related search model parameter determiner 105 determines the layout of the model of a moving image for displaying the moving image of the related content having the model thereof focused. In step S74, for example, based on the positions of the focused model in the x axis and the y axis, the moving image model layout determining unit 124 determines the layout of the model of the moving image by adding a predetermined value to the position of the model in the y axis with the position of the model in the x axis unchanged.

In step S74, the model parameter storage 107 stores the parameters of the model determined in steps S72 and S73. The focused display process of the model of the related content is thus completed.

Figure 29:
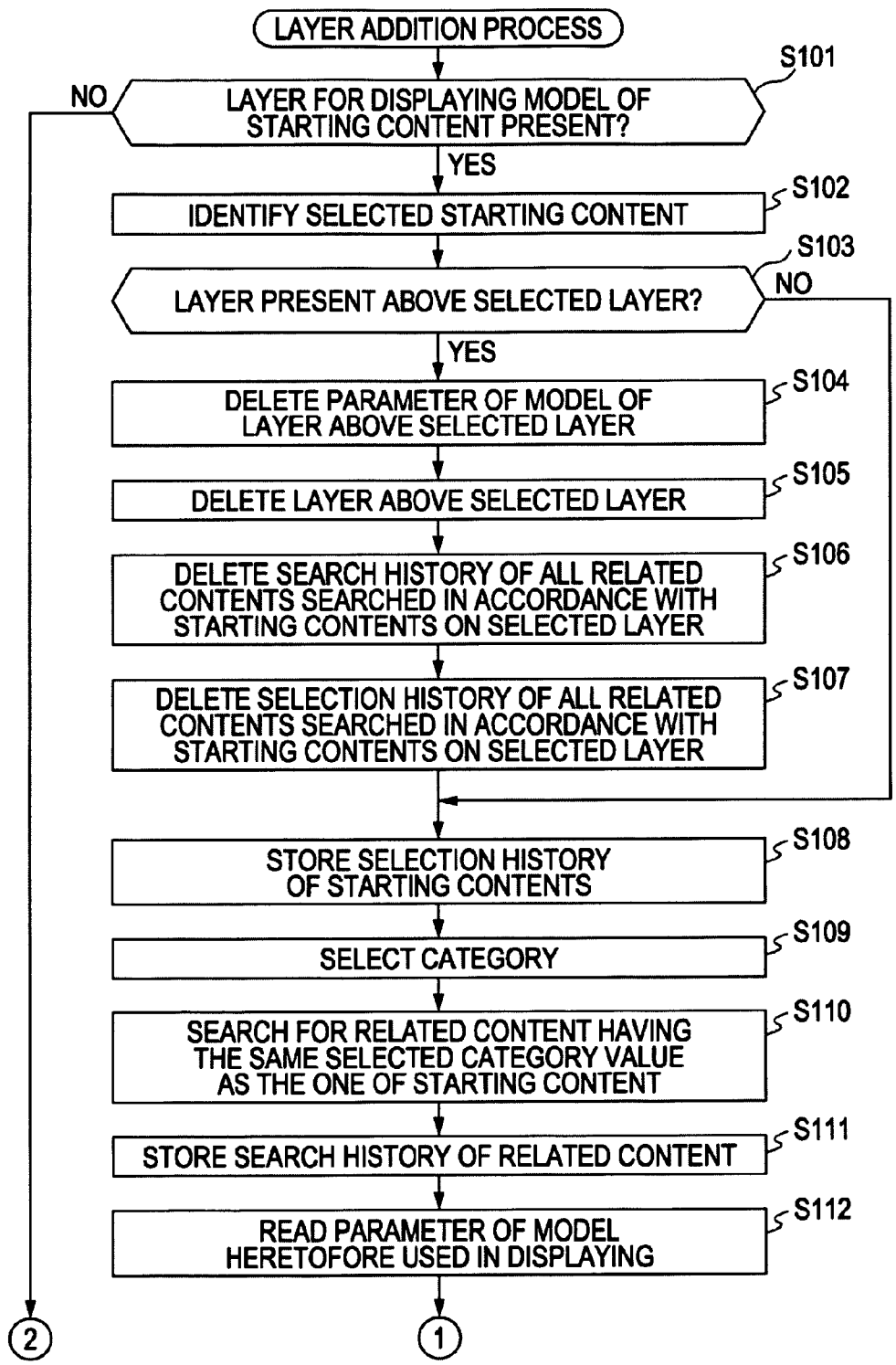
FIG. 29 is a flowchart illustrating a layer addition process.
Figure 30:
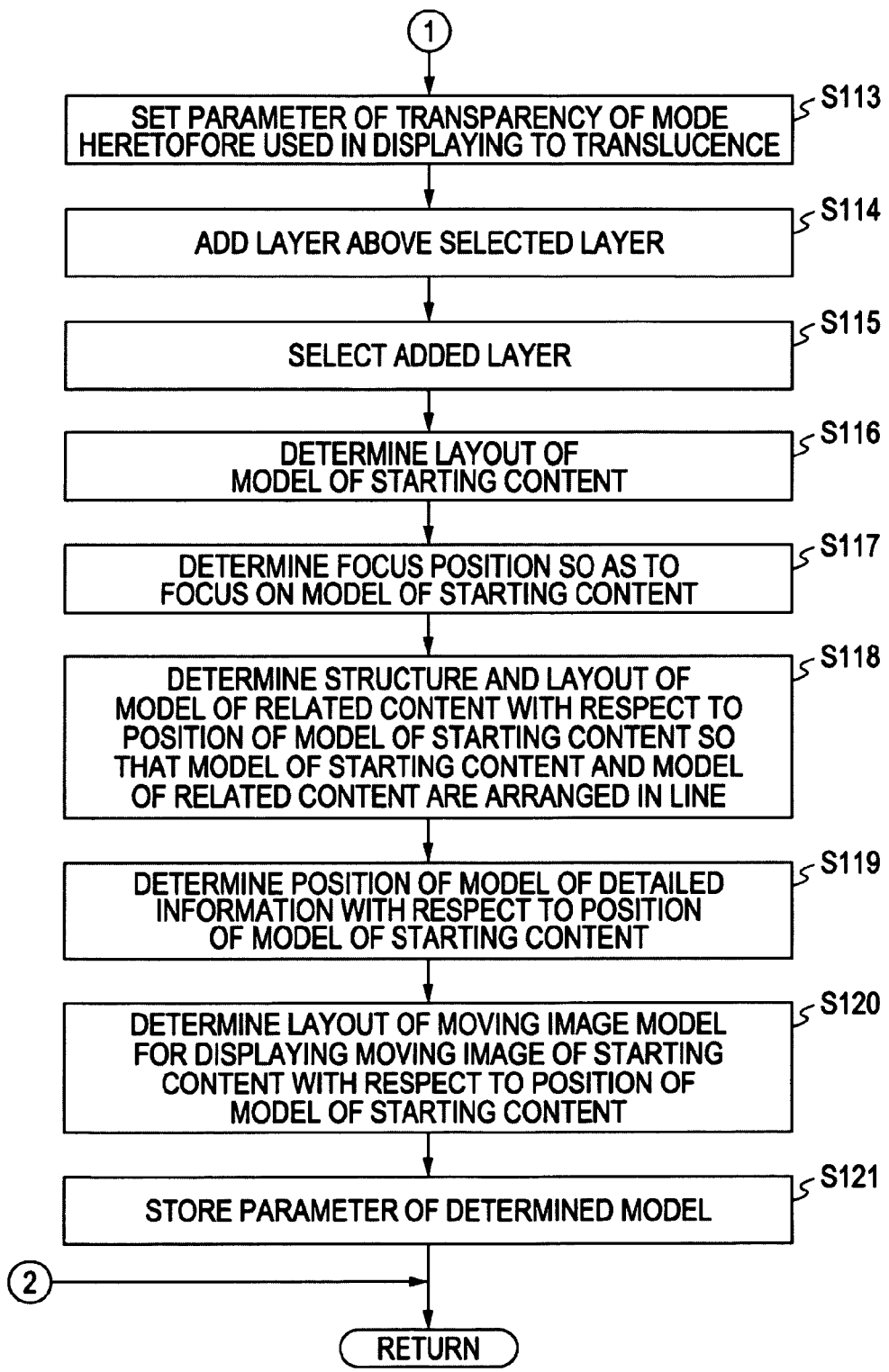
FIG. 30 is a continuation of the flowchart of FIG. 29.

The layer addition process corresponding to step S52 is described below with reference to flowcharts of FIGS. 29 through 30. In step S101, the layer layout determiner 102 references the model parameter heretofore used in displaying stored on the model parameter storage 107, thereby determining whether a layer for displaying the model of the starting content is present. If it is determined in step S101 that a layer for displaying the model of the starting content is present, processing proceeds to step S102. In step S102, the related search model parameter determiner 105 identifies the selected starting content based on data input from the input controller 51 in response to the user operation on the input unit 16.

In step S103, the layer layout determiner 102 references a parameter indicating a selected layer and a parameter describing the number of layers and determines whether a layer above the selected layer is present in the positive direction of the z axis. If it is determined in step S103 that a layer above the selected layer is present in the positive direction of the z axis, processing proceeds to step S104. In step S104, the layer layout determiner 102 deletes the model parameter of the layer above the selected layer, namely, the model parameter of the layer placed above the selected layer in the positive direction of the z axis.

In step S105, the layer layout determiner 102 deletes the layer above the selected layer, namely, the layer placed above the selected layer in the positive direction of the z axis. In step S105, for example, the layer layout determiner 102 can delete the layer by subtracting 1 from the value of the parameter describing the number of layers.

In step S106, the history storage 58 deletes from the related content search history storage unit 75 the search history of all related contents searched and hit in the search in accordance with the starting content on the selected layer.

In step S107, the history storage 58 deletes from the starting content selection history storage unit 76 the selection history of all related contents searched and hit in the search in accordance with the starting content on the selected layer.

Processing proceeds to step S108 subsequent to step S107.

If it is determined in step S103 that no layer is present above the selected layer in the positive direction of the z axis, processing proceeds to step S108 with steps S104 through S107 skipped.

In step S108, the history storage 58 causes the starting content selection history storage unit 76 to store the selection history of the starting content. For example, the selection history includes values identifying starting contents, and the order of selection of the starting contents, and a category according to which a preceding starting content is selected as a related content if the preceding starting content is present.

In step S109, the category selector 74 in the related content searcher 57 selects a category of the starting content from the items related to the starting content, such as performer, director, release year, etc. For example, in step S109, the category selector 74 reads the metadata of the starting content from the metadata database 61 and selects one attribute as the category of the starting content from among attributes of the metadata of the starting content including performer, director, and release year.

In step S110, the related content searcher 57 searches for a related content having the same category value as the category value of the selected category of the starting content. In step S110, for example, the related content searcher 57 reads the metadata of the content from the metadata database 61 and searches for the related content having the metadata of the attribute having the same attribute value as the attribute value (value of the metadata) of the attribute of the metadata selected as the category of the starting content in step S109.

In step S111, the history storage 58 stores the search history of the related content on the related content search history storage unit 75. For example, in step S111, the history storage 58 stores on the related content search history storage unit 75 as the search history a value identifying the hit related content and a value identifying the starting content.

In step S112, the related search model parameter determiner 105 in the model parameter determiner 53 reads from the model parameter storage 107 the model parameter heretofore used in displaying.

In step S113, the transparency determiner 103 in the model parameter determiner 53 sets the parameter of the degree of transparency of the model heretofore used in displaying to translucence.

In step S114, the layer layout determiner 102 in the model parameter determiner 53 adds a layer above the selected layer in the positive direction of the z axis. For example, in step S114, the layer layout determiner 102 can add the layer by adding 1 to the value of the parameter describing the number of layers.

In step S115, the layer layout determiner 102 in the model parameter determiner 53 selects the added layer. For example, in step S115, the layer layout determiner 102 can select the added layer by setting, as the parameter indicating the selected layer, a value indicating the layer added in step S114.

In step S116, the starting model layout determining unit 121 in the related search model parameter determiner 105 determines the layout of the model of the starting content. For example, in step S116, the starting model layout determining unit 121 references the positions of the thumbnail image of the starting content, arranged in the layer heretofore selected, in the x, y and z axes. The starting model layout determining unit 121 thus sets the x coordinate position and the y coordinate position of the thumbnail image as the model of the starting content in the added layer to be same as the x coordinate position and the y coordinate position in the layer heretofore selected. The starting model layout determining unit 121 sets the z coordinate position of the thumbnail image as the model of the starting content in the added layer to be spaced from the z coordinate position in the layer heretofore selected by a layer distance. The starting model layout determining unit 121 thus determines the layout of the thumbnail image as the model of the starting content in the added layer.

The z coordinate position of each layer is described by the respective parameter or the distance between layers in the z axis is predetermined.

In step S117, the focus position determiner 101 determines the position of focus in order to focus on the model of the starting content.

In step S118, the related model structure and layout determining unit 122 in the related search model parameter determiner 105 determines the structure and the layout of the model of the related contents with reference to the position of the model of the starting content so that the models of the starting content and the models of the related contents are arranged in a line. For example, in step S118, the related model structure and layout determining unit 122 determines the number and order of thumbnail images of the related contents and the position of each thumbnail image with reference to the position of the model of the starting content so that the models of the starting content and the models of the related contents are arranged in a line.

In step S119, the detailed information model layout determining unit 123 in the related search model parameter determiner 105 determines the layout of the model of the detailed information of the starting content based on the position of the model of the starting content. For example, in step S119, the detailed information model layout determining unit 123 determines the x, y and z coordinate positions of the model of the text as the detailed information of the starting content labeled the letter B in FIG. 9 based on the x, y and z coordinate positions of the thumbnail image of the starting content.

In step S120, the moving image model layout determining unit 124 in the related search model parameter determiner 105 determines the layout of the model of the moving image for displaying the moving image of the starting content based on the position of the model of the starting content. For example, in step S120, the moving image model layout determining unit 124 determines the x, y and z coordinate positions of the model of the moving image of the starting content labeled the letter A in FIG. 9 with respect to the x, y and z coordinate positions of the thumbnail image of the starting content.

In step S121, the model parameter storage 107 stores the parameters of the model determined heretofore. The layer addition process is thus completed.

If it is determined in step S101 that no layer for displaying the model of the starting content is present, the layer addition process ends with steps S102 through S121 skipped.

Figure 31:
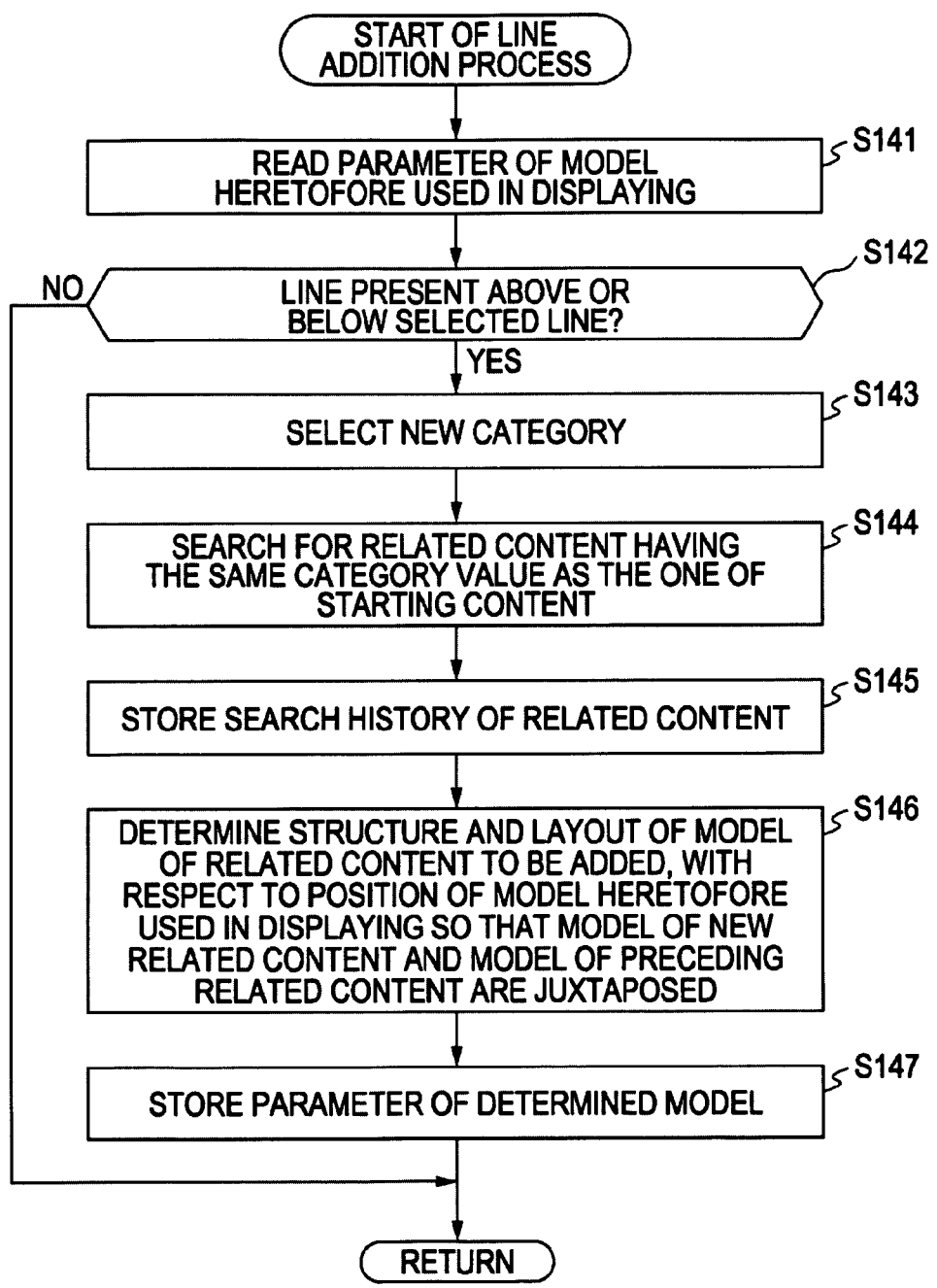
FIG. 31 is a flowchart illustrating a line addition process.

The line addition process corresponding to step S56 is described below with reference to a flowchart of FIG. 31. In step S141, the related search model parameter determiner 105 in the model parameter determiner 53 reads from the model parameter storage 107 the parameter of the model heretofore used in displaying.

In step S142, the related search model parameter determiner 105 determines whether a line is present above or below the selected line in the positive direction or the negative direction of the y axis. If it is determined in step S142 that a line is present above or below the selected line, processing proceeds to step S143. In step S143, the category selector 74 in the related content searcher 57 selects a new category. For example, in step S143, the category selector 74 reads the metadata of the starting content from the metadata database 61 and newly selects one attribute from the attributes not yet selected as a category, namely, the attributes of the metadata of the starting content including performer, director, and release year.

In step S144, the related content searcher 57 searches for a related content having the same category value as the one of the selected category of the starting content. For example, in step S144, the related content searcher 57 reads from the metadata database 61 the metadata of the content and searches for a related content having the metadata as the attribute having the same attribute value as the one of the attribute of the metadata selected as a category of the starting content in step S143.

In step S145, the history storage 58 stores the search history of the related content on the related content search history storage unit 75 in the same ways as in step S111.

In step S146, the related model structure and layout determining unit 122 of the related search model parameter determiner 105 determines the structure and layout of the model of the related content to be added, based on the position of the model heretofore used in displaying so that the models of the new related contents and the models of the previous related contents are juxtaposed.

More specifically, in step S146, the related model structure and layout determining unit 122 determines the position of each thumbnail image of each related content to be added, based on the position of the model heretofore used in displaying so that a line of the models of the new related contents and a line of the models of the previous related contents are arranged in parallel with each other.

In step S147, the model parameter storage 107 stores the model parameter determined in step S146. The line addition process is thus completed.

Figure 32:
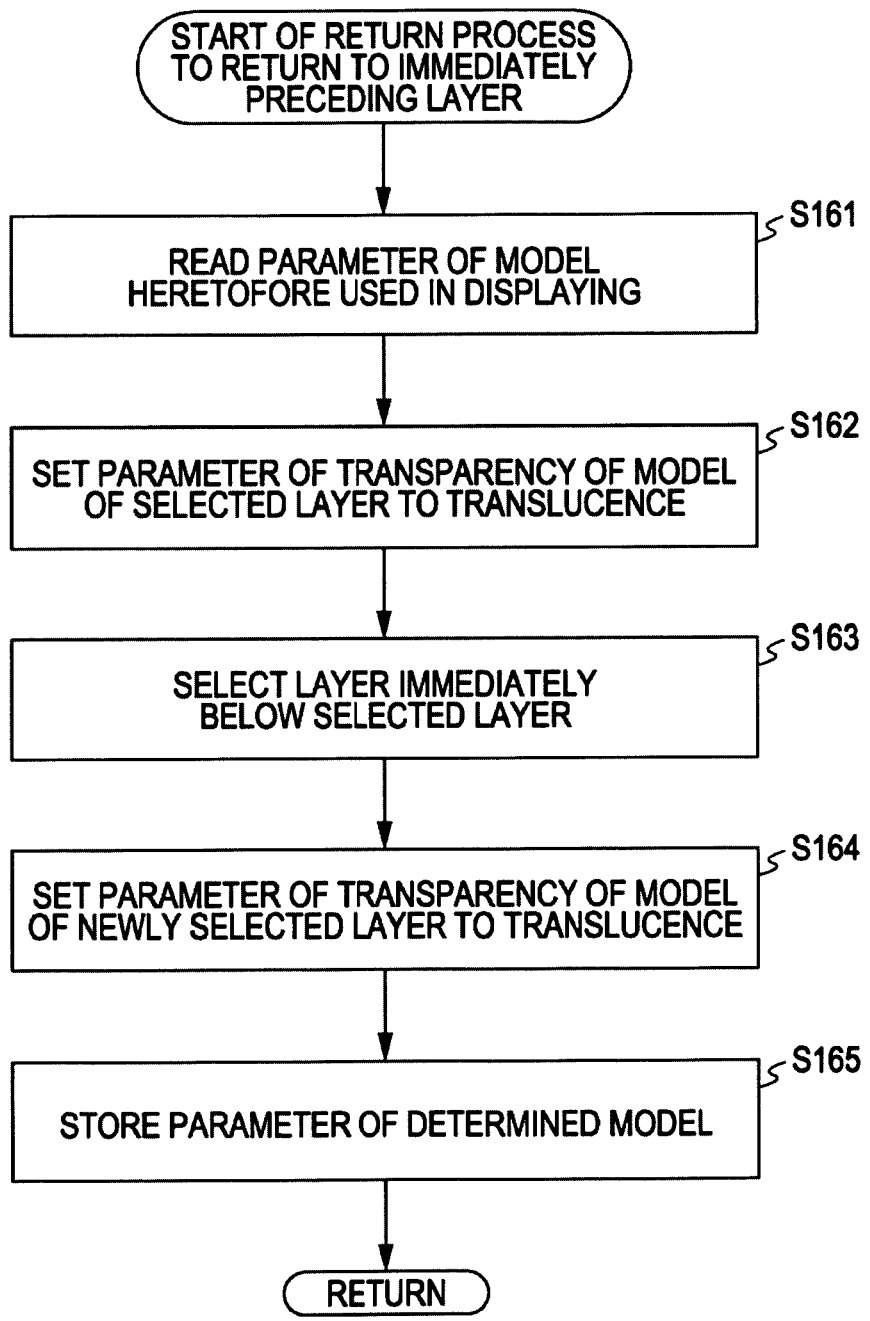
FIG. 32 is a flowchart illustrating a return process to return to the immediately preceding line.

FIG. 32 is a flowchart illustrating a return process to return to the immediately preceding layer performed in step S58. In step S161, the related search model parameter determiner 105 in the model parameter determiner 53 reads from the model parameter storage 107 the model parameter heretofore used in displaying.

In step S162, the transparency determiner 103 in the model parameter determiner 53 sets the parameter of the degree of transparency of the model in the selected layer to translucence.

In step S163, the layer layout determiner 102 in the model parameter determiner 53 newly selects a layer immediately below the selected layer in the negative direction of the z axis. For example, in step S163, the layer layout determiner 102 selects the layer immediately below the selected layer by setting to the parameter indicating the selected layer a value indicating the layer immediately below the selected layer.

In step S164, the transparency determiner 103 in the model parameter determiner 53 sets the parameter of the degree of transparency of the model in the newly selected layer to translucence.

In step S165, the model parameter storage 107 stores the parameters of the models determined in steps S162 through S164. The return process to return to the immediately preceding layer is thus completed.

A display process of the summary mode is described below with reference to a flowchart of FIG. 33. In step S181, the layer layout determiner 102 reads from the model parameter storage 107 the model parameter heretofore used in displaying.

In step S182, the layer layout determiner 102 adds a layer perpendicular to the line of sight of the viewpoint of the camera, above the selected layer in the positive direction of the z axis. For example, in step S182, the layer layout determiner 102 adds the layer perpendicular to the line of sight of the viewpoint of the camera by adding 1 to the value of the parameter describing the number of layers and setting, to the parameter describing the layout of the layer with respect to the x, y and z axes, a value presenting a position perpendicular to the line of sight of the viewpoint of the camera.

In step S183, the layer layout determiner 102 selects the layer added in step S182. For example, in step S183, the layer layout determiner 102 selects the added layer by setting to the parameter indicating the selected layer a value indicating the layer added in step S182.

In step S184, the summary model parameter determiner 106 reads the selection history of the starting content from the starting content selection history storage unit 76 in the history storage 58. In step S185, the summary model parameter determiner 106 arranges the models of the starting content, namely, the thumbnail images of the starting content in the order of selection in a horizontal line on the screen of the display 31.

In step S186, the summary model parameter determiner 106 arranges a model indicating a category between the models of the starting contents, namely, between the thumbnail images of the starting contents.

In step S187, the three-dimensional model generator 54 references the model template data 72 in accordance with the determined parameter, and generates a three-dimensional model described in VRML.

In step S188, the view-point specifier 71 in the mode determiner 52 specifies to the display controller 55 the viewpoint of the camera having the line of sight perpendicular to the layer added in step S182 and looking toward a focused model at a slant angle with respect to the XY plane determined by the x and y axes in the three coordinates of the x, y and z axes.

In step S189, the drawing unit 73 draws the three-dimensional model generated in step S187 from the viewpoint specified in step S188, thereby generating display data for displaying the three-dimensional model.

In step S190, the display controller 55 causes the display 31 to display the three-dimensional model based on the display data generated in step S189. Processing returns to step S187.

Since the model of the starting content and the model of the related content are displayed in different layers, the user can distinctly recognize the relationship between the starting content and the related content.

FIGS. 34 through 50 illustrate display examples displayed on the display 31 in the output unit 17 in response to the user operation applied to the input unit 16 in each of the top-page mode, the related search mode, the play mode, the summary mode and the overhead-view mode. The input unit 16 as a touchpanel is overlaid on the display 31. The personal computer here is a mobile type computer.

The contents handled here are music.

FIGS. 34 through 37 illustrate transitioning from the top-page mode screen and the top-page mode to another display mode.

When the display process is started, the screen of the top-page mode is displayed on the display 31 in the output unit 17 as shown in FIG. 34. Arranged on the top portion of the top-page mode screen are buttons for selecting my page, J-pops, rock, pops, jazz, dance, R&B, soundtrack and other genre. One of the buttons for selecting genre is focused or selected.

The thumbnail images of the content belonging to the genre of the button selected or selected, from among the genre buttons, are arranged in a horizontal line on the bottom portion of the top-page mode screen. The thumbnail images include an image of a jacket of a phonograph record or an image of liner notes, for example.

When the display process is started, one button is selected in default setting. For example, the genre button for J-pops is selected as shown in FIG. 34.

When the display process is started, the leftmost thumbnail image on the screen is focused from among the thumbnail images of the content belonging to the genre of the default selected button. For example, as shown in FIG. 34, the leftmost thumbnail image on the screen is focused in default setting from among the thumbnail images of the content belonging J-pops genre.

More specifically, when the display process is started, focusing of the button for selecting genre becomes invalid, and focusing of the thumbnail image becomes valid.

If the user lightly touches a button area for selecting a desired genre of operation areas of the input unit 16 as a touchpanel arranged on the display 31, namely, taps the button for selecting a desired genre, the tapped button is focused. Focusing thus shifts to the tapped button.

The thumbnail images of the content belonging to the genre of the tapped button are arranged in a horizontal line on the bottom portion of the top-page mode screen.

If any genre button is tapped, focusing of the tapped button becomes valid while focusing of the thumbnail image becomes invalid.

Figure 35:
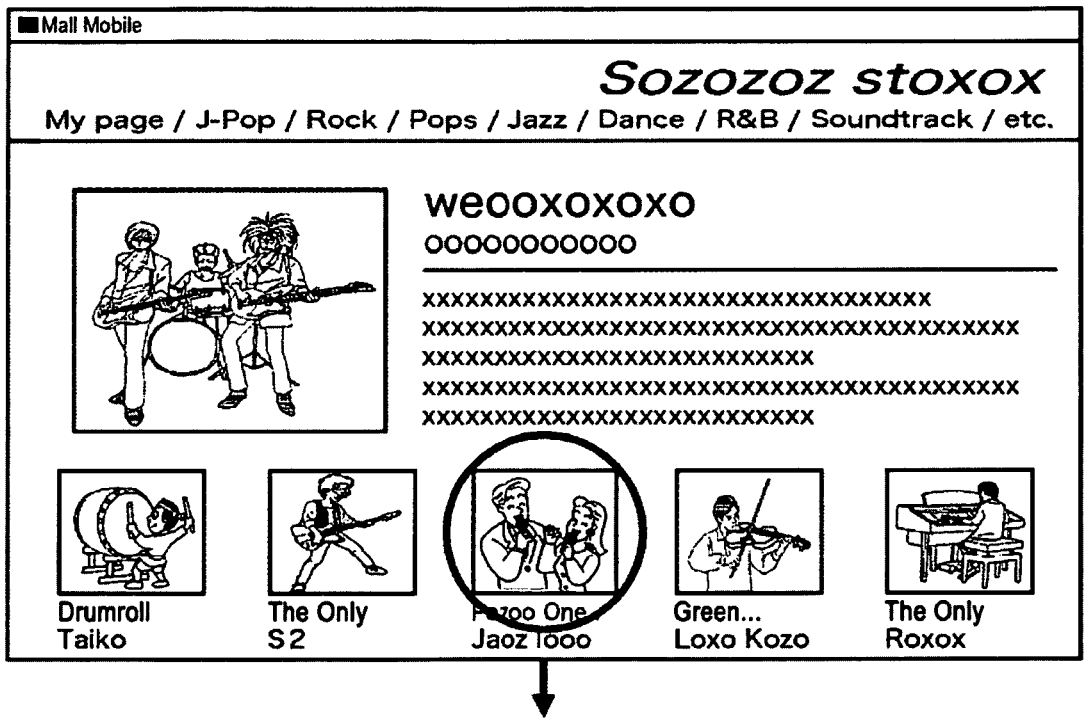
FIG. 35 illustrates a display example displayed on the display in the output unit.

If the thumbnail image of the content is tapped as shown in FIG. 35, the thumbnail image tapped is focused on the top-page mode screen. In other words, focusing shifts to the tapped thumbnail image.

More specifically, if the thumbnail image of the content is tapped, focusing of the genre button becomes invalid while focusing of the thumbnail image becomes valid.

If the user writes the letter V on the area of the thumbnail image of a desired content of the operation areas of the input unit 16 as a touchpanel arranged on the display 31 as shown in FIG. 36, that thumbnail image is selected. As a result, the content of the thumbnail image is selected. The personal computer is transitioned to the play mode, thereby starting playing the selected content.

If the content is music in the play mode as shown in the bottom portion of FIG. 36, a comment on the music content is displayed in image and text instead of the focused thumbnail image, and the music content is thus output from the loudspeaker 32.

Figure 37:
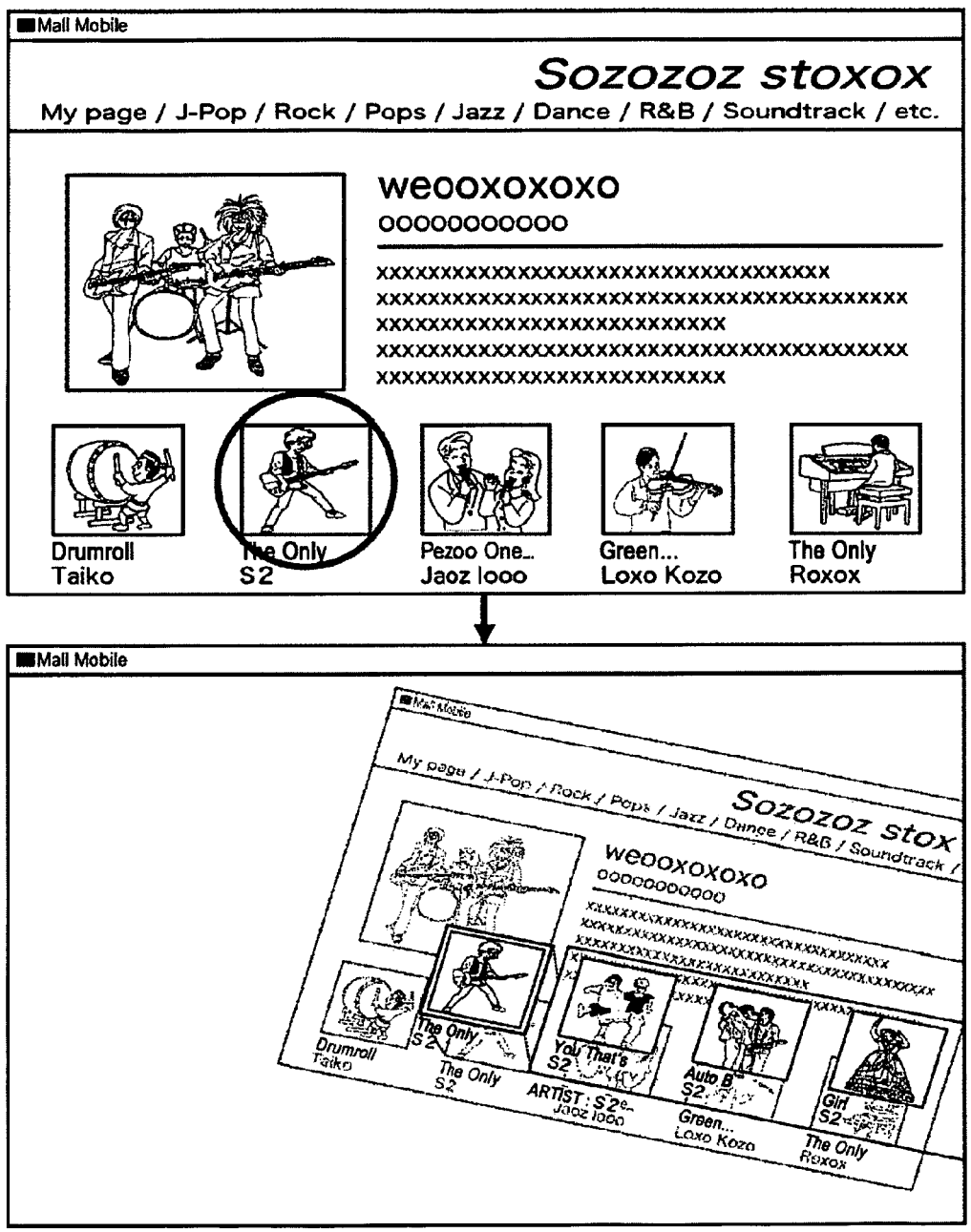
FIG. 37 illustrates a display example displayed on the display in the output unit.

If the user draws a clockwise turning circle surrounding an area of the thumbnail image of a desired content of the operation areas of the input unit 16 as a touchpanel arranged on the display 31 as shown in FIG. 37, the content of the thumbnail image surrounded by the clockwise turning circle is selected as a starting content. The personal computer is transitioned to the related search mode.

In the same manner as described with reference to FIGS. 9 through 17, the layer for displaying the thumbnail image of the related content related to the starting content is displayed in the related search mode in an overlay fashion above the layer for displaying the top-page mode screen as shown in the bottom portion of FIG. 37.

The layer for displaying the thumbnail image of the related content related to the starting content and the layer for displaying the top-page mode screen are arranged with a predetermined distance permitted therebetween.

The thumbnail image is surrounded by the clockwise turning circle and the display mode of the personal computer is transitioned to the related search mode. The thumbnail image of the starting content arranged in the layer for displaying the thumbnail image of the related content is focused.

The focused thumbnail image is displayed in the center of the screen of the display 31.

The line of sight of the camera is at a slant angle with respect to the layer in the related search mode as shown in FIG. 37.

If one of the thumbnail image of the starting content and the thumbnail image of the related content is tapped in the related search mode, the tapped thumbnail image is focused as shown in FIG. 38. More specifically, focusing shifts to the tapped thumbnail image.

When focusing shifts to the tapped thumbnail image, the focused thumbnail image is displayed in the center of the screen of the display 31.

Figure 39:
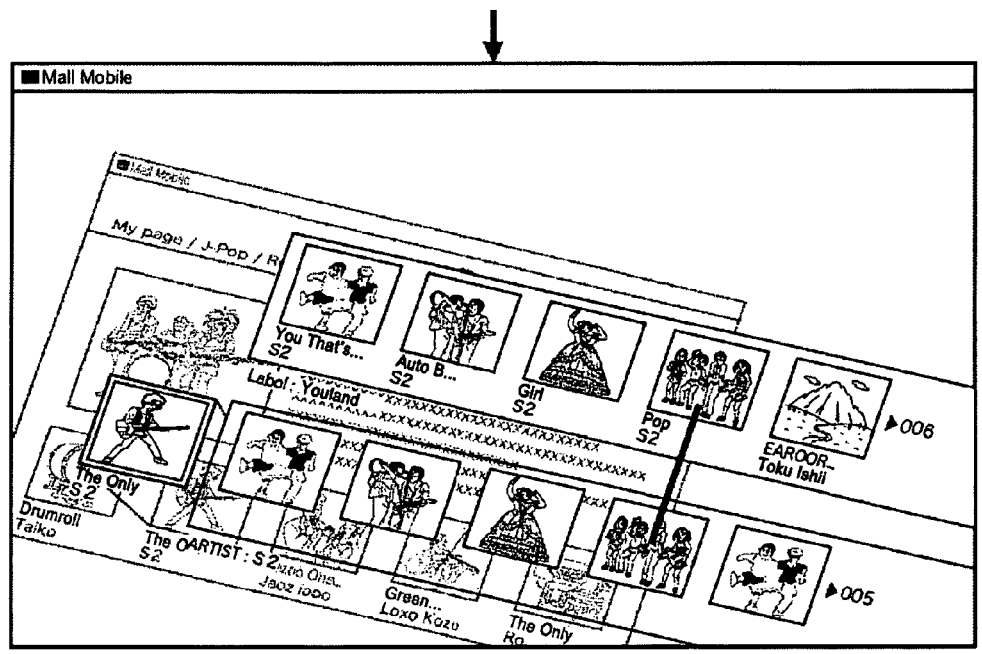
FIG. 39 illustrates a display example displayed on the display in the output unit.

The user continuously may slide the user's finger in touch with the screen in one of an upward direction and a downward direction starting with a point within the area of one of the thumbnail image of the starting content and the thumbnail image of the related content of the operation areas of the input unit 16 as a touchpanel arranged on the display 31. In other words, if the user drags across one of the thumbnail image of the starting content and the thumbnail image of the related content in one of an upward direction and a downward direction, thumbnail images of one or a plurality of related contents respectively related to the starting content in a new category are arranged in a line as shown in FIG. 39. The thumbnail images of the related contents in the new category are displayed in parallel with the thumbnail images of one or a plurality of related contents related to the starting content in the predetermined category.

The categories in the music content include genre, first release location, songwriter, composer, producer, label, co-performer, recording studio, etc.

If the user writes the letter V on the area of the thumbnail image of a desired content of the operation areas of the input unit 16 as a touchpanel arranged on the display 31 as shown in FIG. 40, that thumbnail image is selected. As a result, the content of the thumbnail image is selected. The personal computer is transitioned to the play mode, thereby starting playing the selected content.

Figure 41:
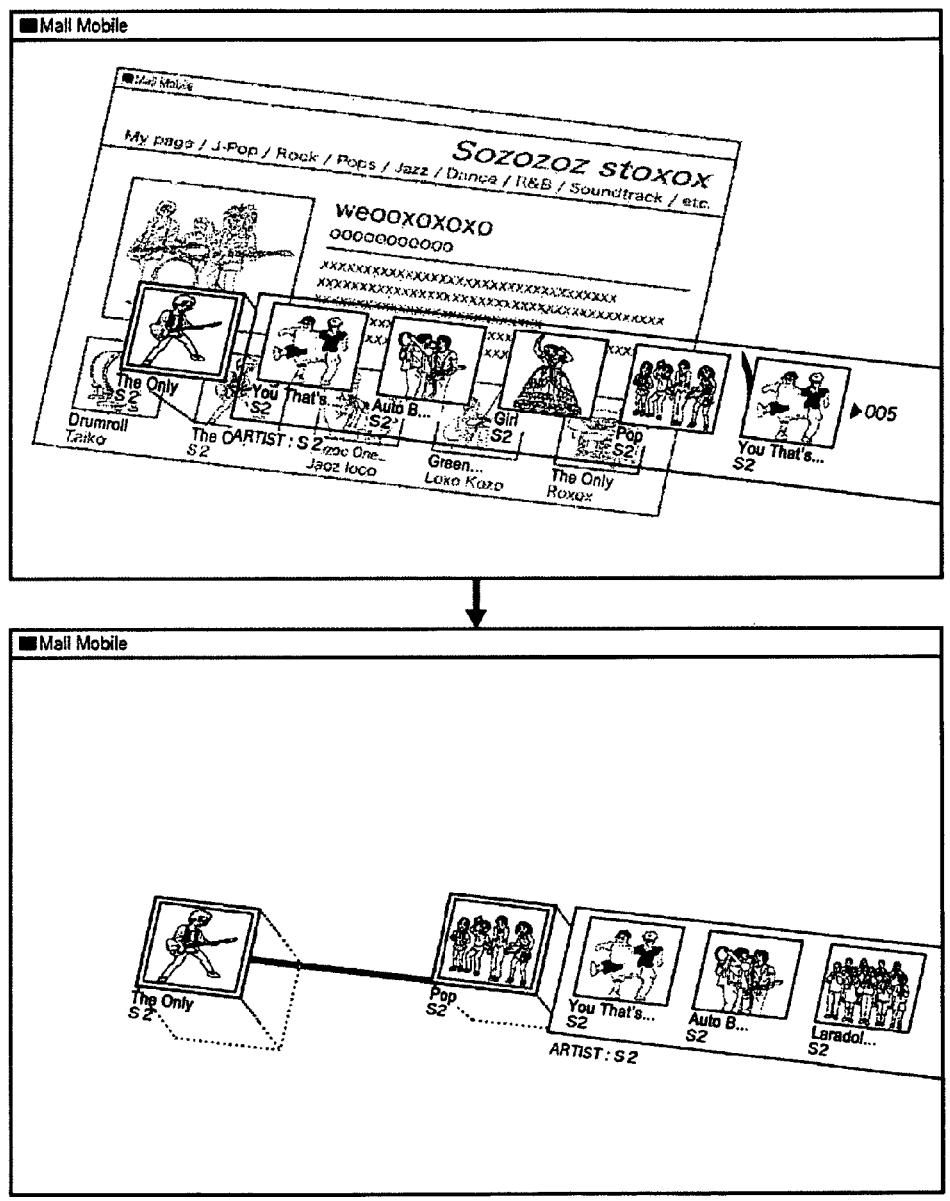
FIG. 41 illustrates a display example displayed on the display in the output unit.

If the user draws in the related search mode a clockwise turning circle surrounding an area of any thumbnail image of a related content, except an area of the thumbnail image of the starting content, on the operation areas of the input unit 16 as a touchpanel arranged on the display 31 as shown in FIG. 41, the content of the thumbnail image surrounded by the clockwise turning circle is selected as a new starting content. The layer for displaying the thumbnail image of the related content related to the newly selected starting content is added above the layer for displaying the thumbnail image of the previous related content in an overlay fashion.

One of the thumbnail images on the layer for displaying the thumbnail image of the related content related to the newly selected starting content is focused.

As shown in the bottom portion of FIG. 41, the image on the layer for displaying the thumbnail image of the preceding related content is deleted. A solid line is drawn connecting the thumbnail image of the newly selected starting content to the thumbnail image of the immediately preceding starting content.

The user can easily learn the immediately preceding the starting content and the newly selected starting content.

Figure 42:
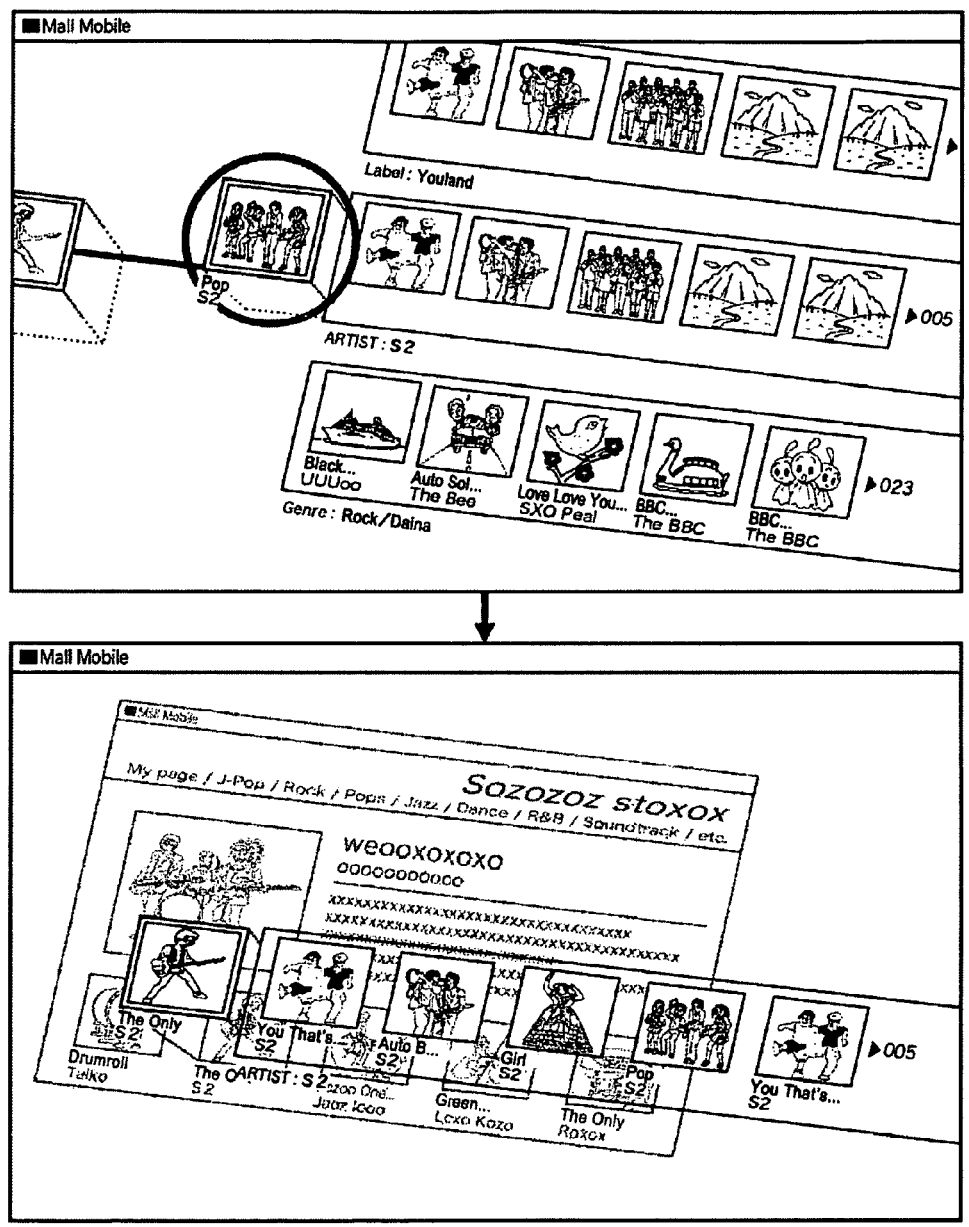
FIG. 42 illustrates a display example displayed on the display in the output unit.

The layer for displaying the thumbnail image of the related content related to the newly selected starting content is now added as shown in FIG. 42. If the user now draws a counterclockwise turning circle surrounding an area of any thumbnail image of the newly selected starting content on the operation areas of the input unit 16 as a touchpanel arranged on the display 31, focusing shifts to the layer for displaying the thumbnail image of the immediately preceding starting content and the thumbnail image of the related content related to the immediately preceding starting content. The image on the layer for displaying the thumbnail image of the related content related to the newly selected starting content is deleted.

Figure 43:
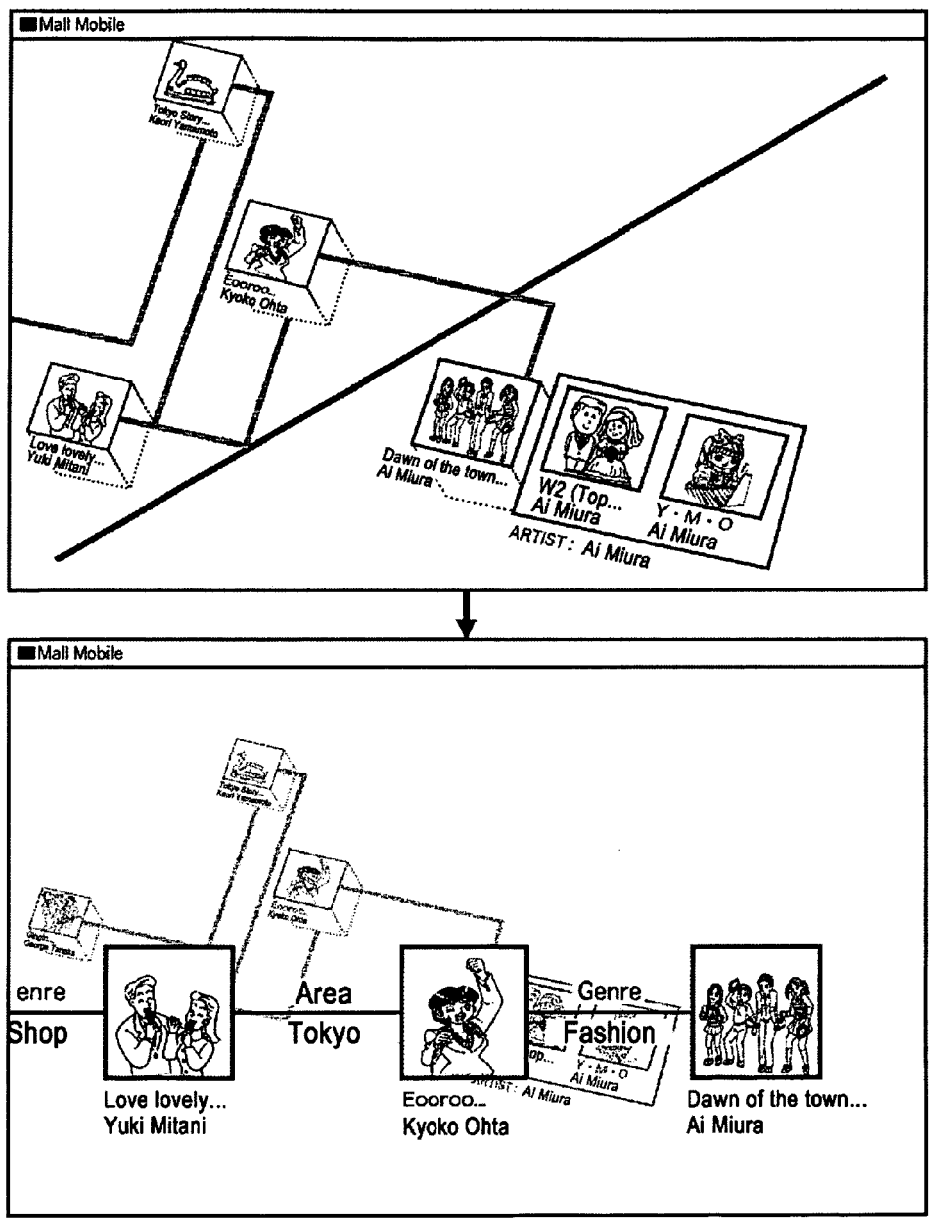
FIG. 43 illustrates a display example displayed on the display in the output unit.

If the user draws in the related search mode a line extending left downward on the operation areas of the input unit 16 as a touchpanel arranged on the display 31 starting at a point on the top right corner of the display 31 as shown in FIG. 43, the personal computer is transitioned to the summary mode.

In the summary mode, the thumbnail images of the starting content are displayed in a horizontal line on the screen of the display 31 in the selection order from left to right as shown in the bottom portion of FIG. 43.

In the summary mode, the leftmost thumbnail image on the screen is a thumbnail image of the first selected starting content, and the second thumbnail image from the left is a thumbnail image of a starting content selected from the related contents related to the first selected starting content, namely, a thumbnail image of a second selected starting content. The third thumbnail image from the left on the screen is a thumbnail image of a starting content selected from the related contents related to the second selected starting content, namely, a thumbnail image of a third selected starting content.

If a left one of two thumbnail images juxtaposed is selected as a starting content, a right one of the two thumbnail images is a thumbnail image of a starting content selected from related contents related to the starting content of the left side thumbnail image in the summary mode.

In the summary mode, the thumbnail images consecutively horizontally arranged are connected by horizontal lines.

In the summary mode, a category as a related item and a specific content of the category are described between the thumbnail image of the content selected as a starting content and the thumbnail image of the starting content selected from the related contents related to the first starting content.

If the P key of the keyboard in the input unit 16 is pressed in the summary mode, the personal computer is shifted to the overhead-view mode.

In the overhead-view mode of FIG. 44, the viewpoint of the camera is withdrawn in a direction away form the model such as the button and the thumbnail image. More specifically, the camera is retreated. Also, the position of the viewpoint of the camera is shifted in accordance with a direction of drag.

Figure 45:
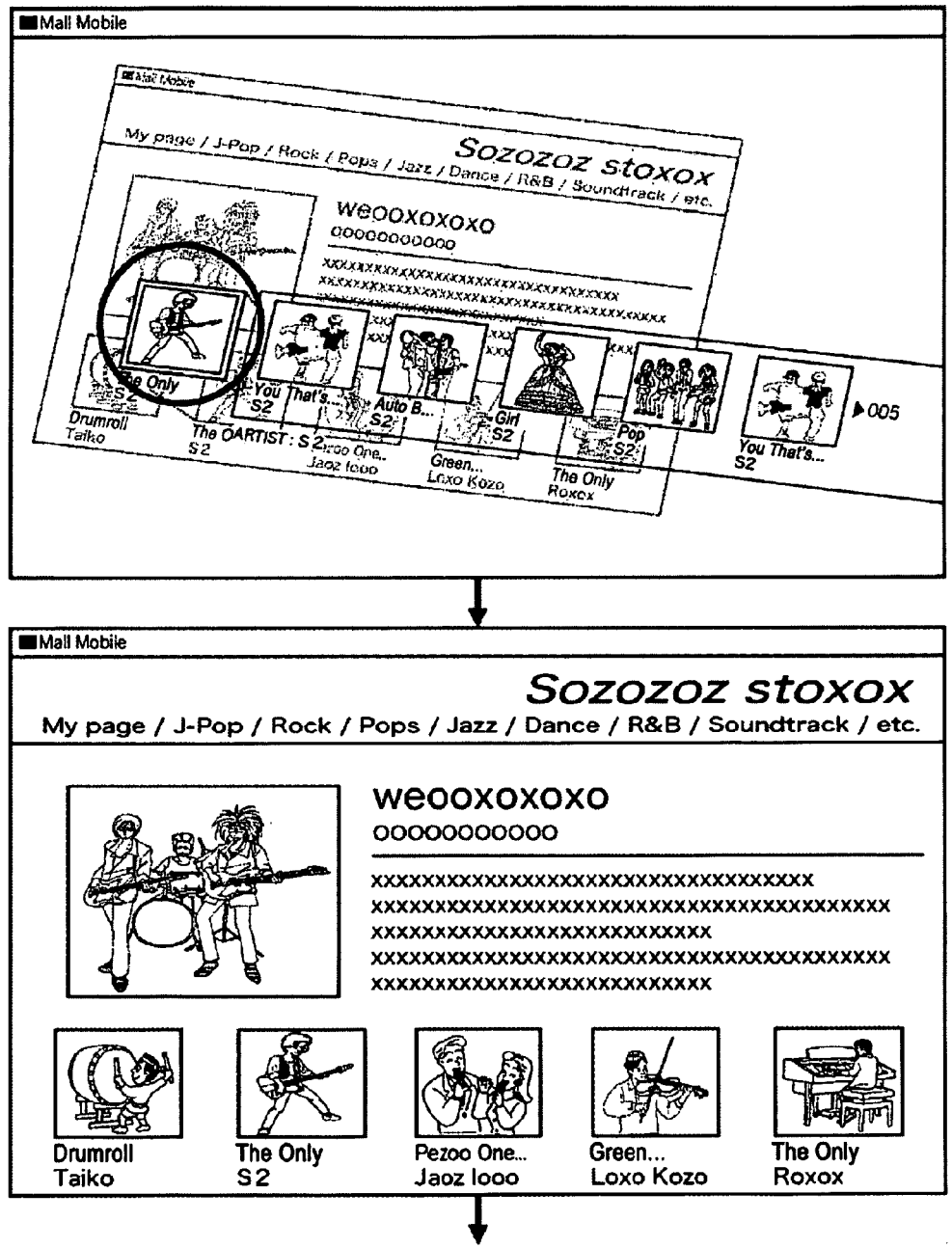
FIG. 45 illustrates a display example displayed on the display in the output unit.

If the user draws in the related search mode a counterclockwise turning circle surrounding an area of the thumbnail image of the first selected starting content, on the operation areas of the input unit 16 as a touchpanel arranged on the display 31 as shown in FIG. 45, the personal computer is transitioned to the top-page mode.

With reference to FIG. 45, the top page is fully displayed on the entire screen of the display 31 in the top-page mode with the four sides of the top page in alignment with the four sides of the screen of the display 31.

Focusing shifts to the thumbnail image of the content selected as the starting content in the top-page mode prior to transitioning to the related search mode.

Figure 46:
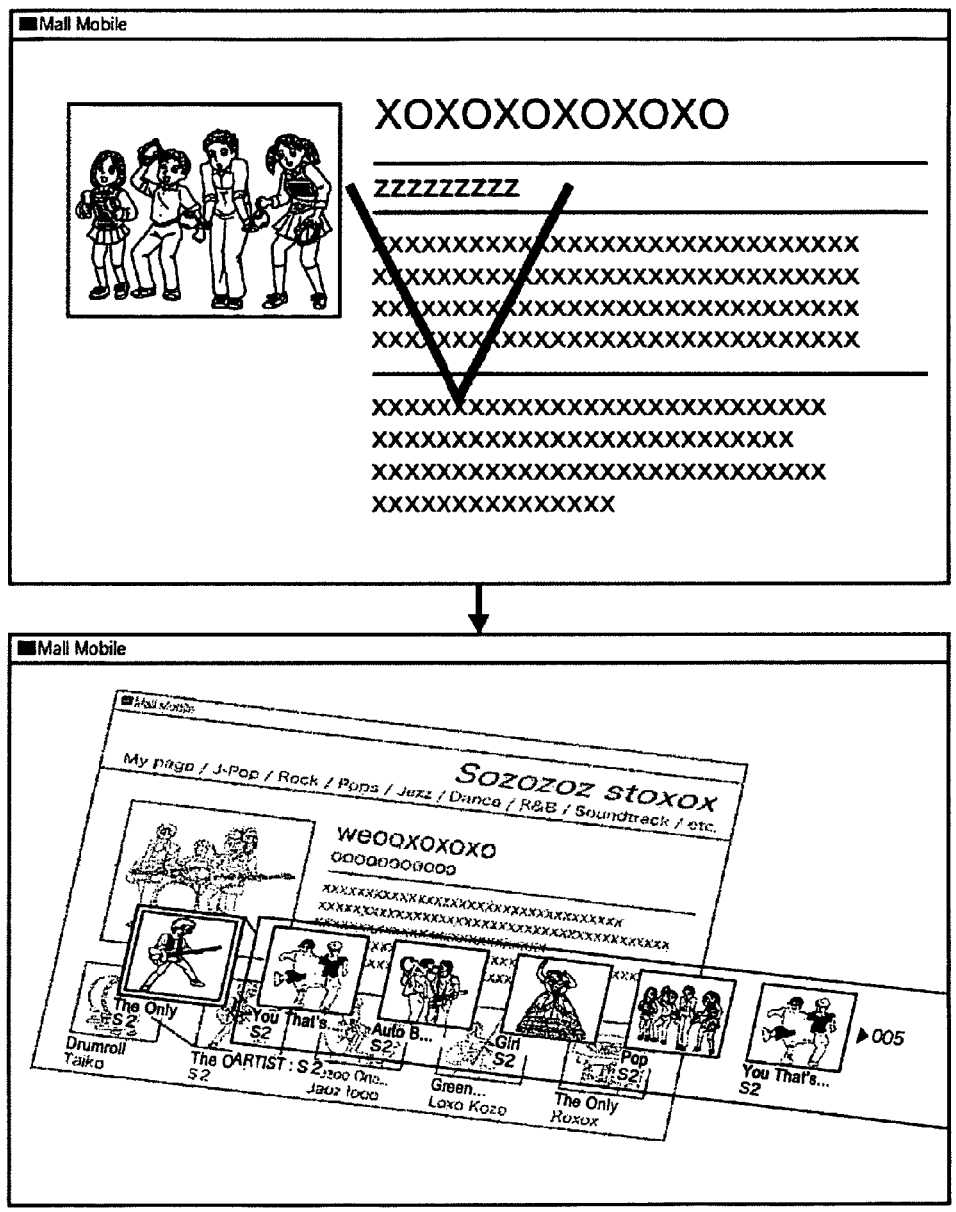
FIG. 46 illustrates a display example displayed on the display in the output unit.

If the user writes in the play mode the letter V on the operation areas of the input unit 16 as a touchpanel arranged on the display 31 as shown in FIG. 46, the personal computer quits playing the content. The personal computer is transitioned to one of the top-page mode and the related search mode. If the display mode prior to the play mode is the top-page mode, the personal computer is transitioned to the top-page mode subsequent to quitting playing the content. If the display mode prior to the play mode is the related search mode, the personal computer is transitioned to the related search mode subsequent to quitting playing the content.

If the user taps the thumbnail image in the summary mode, the tapped thumbnail image is focused as shown in FIG. 47. The focused thumbnail image is displayed in the center of the screen of the display 31.

Figure 48:
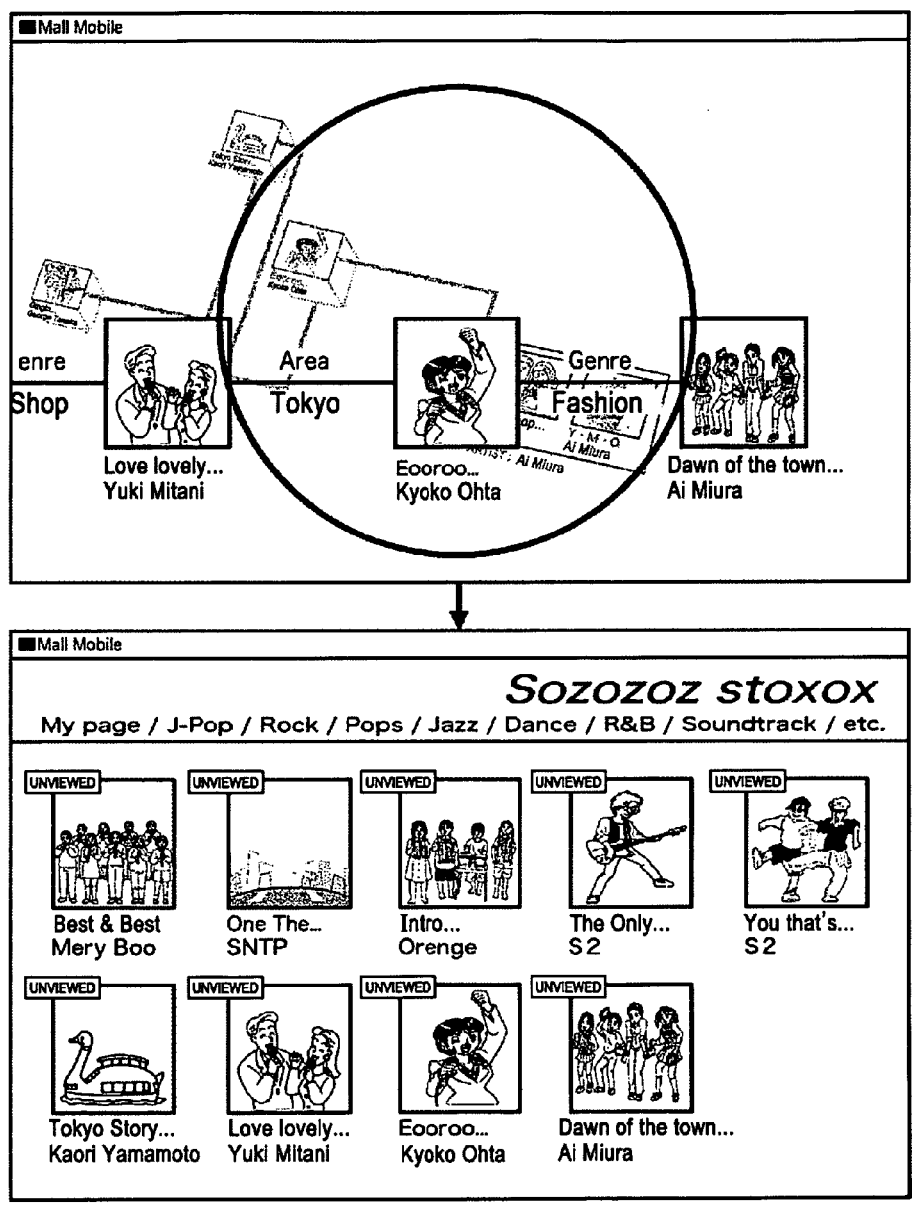
FIG. 48 illustrates a display example displayed on the display in the output unit.

If the user draws in the summary mode a clockwise turning circle on the operation areas of the input unit 16 as a touchpanel arranged on the display 31 as shown in FIG. 48, a content selected as a starting content is registered as a bookmark. The personal computer is transitioned to the top-page mode. Upon transitioning from the summary mode to the top-page mode, the personal computer deletes the search track sequence of the related contents searched heretofore in the related search mode.

If the user draws in the summary mode a straight line extending from a top right point to a bottom left point on the screen of the display 31 or a counterclockwise turning circle on the operation areas of the input unit 16 as a touchpanel arranged on the display 31 as shown in FIG. 49, the personal computer is transitioned to the related search mode. Upon transitioning to the related search mode, the personal computer deletes from the screen the thumbnail images of the starting contents arranged from left to right in the selection order of the starting contents, and the categories as the related items and specific contents of the categories.

Figure 50:
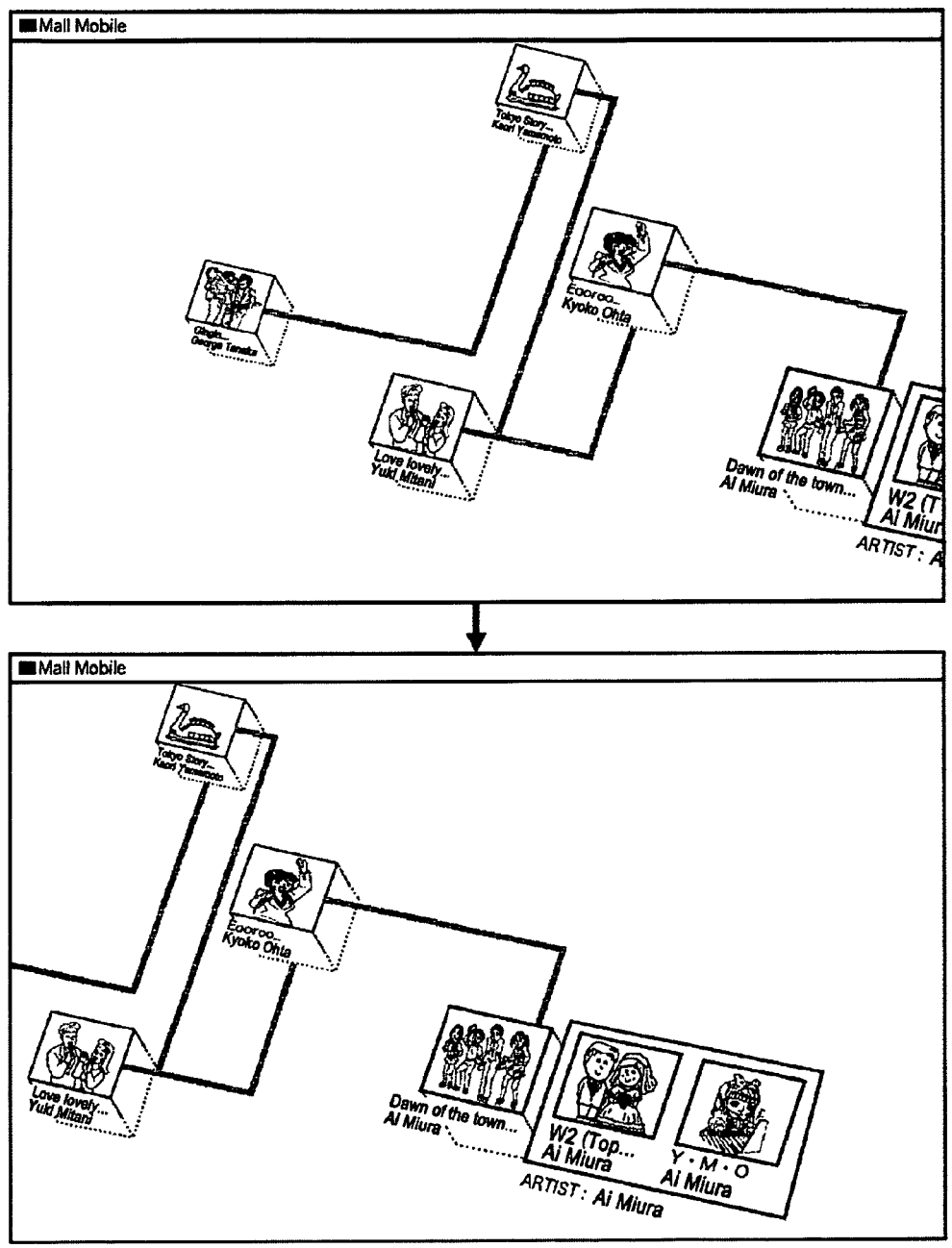
FIG. 50 illustrates a display example displayed on the display in the output unit.

If the user takes his or her finger off the P key of the keyboard in the input unit 16 in the overhead-view mode, the personal computer is transitioned to the related search mode as shown in FIG. 50. The viewpoint of the camera returns to the original position thereof, and the focused thumbnail image is displayed in the center of the screen of the display 31.

The tap and drag operations allows the user to shift mode easily and to select the starting content.

The metadata of the content may be retrieved from another apparatus via network and the communication unit 19.

The search process of the related content is specifically described below.

Figure 51:
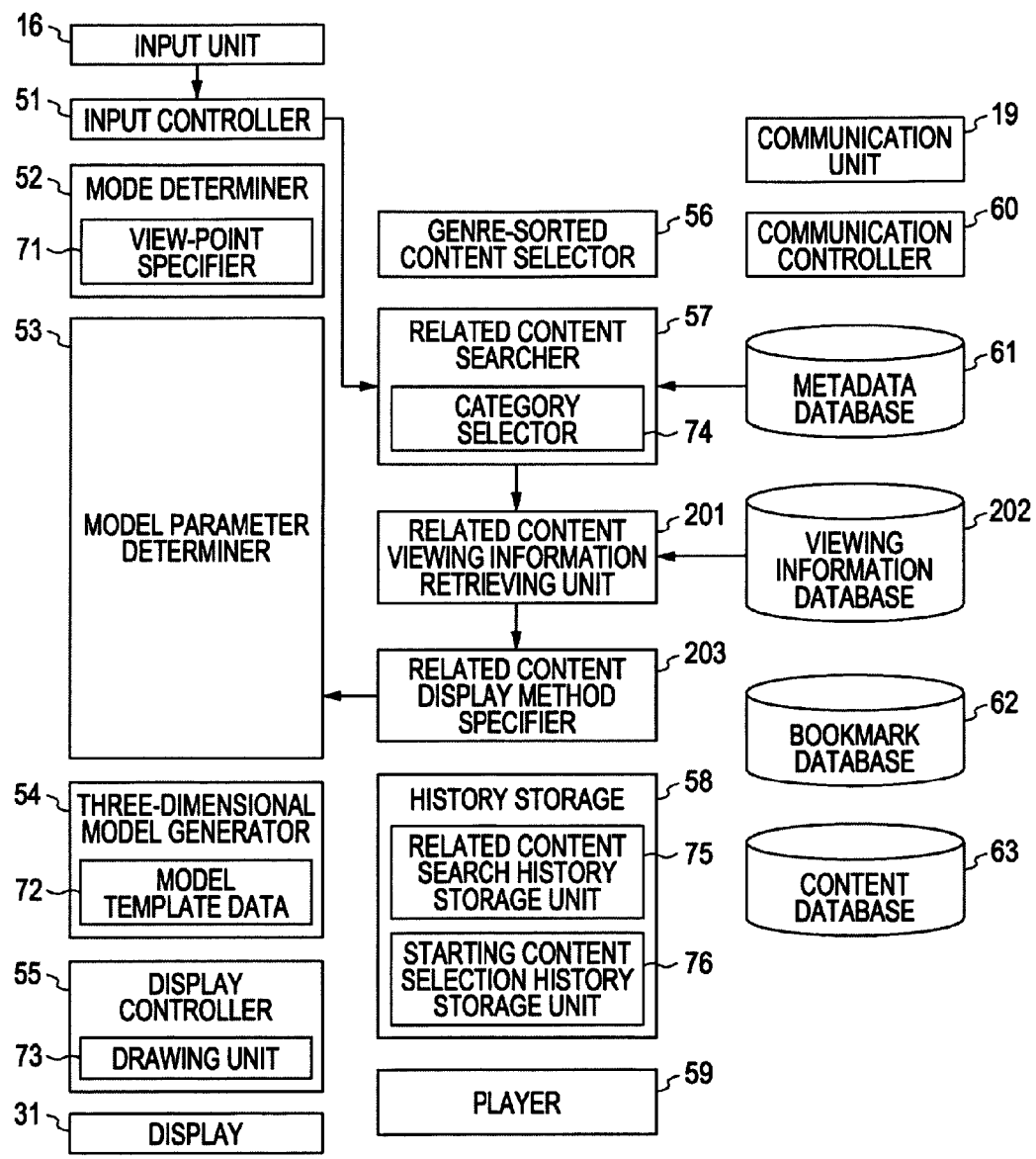
FIG. 51 is a functional block diagram illustrating another personal computer executing a program.

FIG. 51 is a functional block diagram illustrating another personal computer for executing the program. The elements of FIG. 51 are implemented when the personal computer executes the program. The personal computer includes the input controller 51 controlling the input unit 16, the mode determiner 52, the model parameter determiner 53, the three-dimensional model generator 54, the display controller 55 controlling the display 31, the genre-sorted content selector 56, the related content searcher 57, the history storage 58, the player 59, the communication controller 60 controlling the communication unit 19, the metadata database 61, the bookmark database 62, and the content database 63. The personal computer further includes a related content viewing information retrieving unit 201, a viewing information database 202 and a related content display method specifier 203.

In FIG. 51, elements identical to those illustrated in FIG. 2 are designated with the same reference numerals and the discussion thereof is omitted here.

The related content searcher 57 retrieves from the metadata database 61 the metadata attached to the selected starting content in response to data input from the input controller 51 in response to a user operation applied to the input unit 16. The related content searcher 57 further retrieves from the metadata database 61 the metadata having the same category value as the metadata of the starting content but attached to a content different from the starting content in order to search for the related content. As a result, the related content searcher 57 retrieves identification information identifying the related content. The identification information identifying the related content is one of a content name and an ID number.

The related content searcher 57 supplies the related content viewing information retrieving unit 201 with the identification information identifying the related content.

The related content viewing information retrieving unit 201 retrieves from the viewing information database 202 viewing information related to a related content group of related contents searched and hit by the related content searcher 57. The viewing information database 202 stores the viewing information as to how much the user has viewed what content, and what content is held by the user.

The related content viewing information retrieving unit 201 retrieves from the viewing information database 202 the viewing information related to each related content identified by the identification information.

The related content viewing information retrieving unit 201 supplies the viewing information regarding the related content to the related content display method specifier 203. The viewing information supplied to the related content display method specifier 203 indicates how much the user has viewed each content and what content is held by the user (i.e., what content is stored on the content database 63).

The related content display method specifier 203 determines a display method of each model of the related content falling within the related content group in accordance with the viewing information regarding the related content group supplied from the related content viewing information retrieving unit 201. The related content display method specifier 203 supplies the model parameter determiner 53 with information indicating the display method of each model of the related content.

Figure 52A:
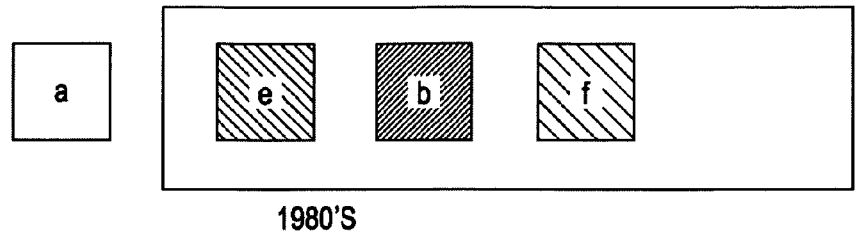
FIGS. 52A-52D illustrates display examples displayed on a display in an output unit.

As shown in FIG. 52A, the related content display method specifier 203 determines the display method of the model of the related content so that the thumbnail image of the related content held by the user is displayed in light color and so that the thumbnail image of the related content not held by the user is displayed in deep color. Alternatively, the related content display method specifier 203 determines the display method of the model of the related content so that the thumbnail image of the related content viewed by the user is displayed in light color and so that the thumbnail image of the related content unviewed by the user is displayed in deep color.

More specifically, the related content display method specifier 203 determines the display method of the model of the related content so that the thumbnail image of the related content held by the user is displayed in light color as labeled the letter "b" in FIG. 52A and so that the thumbnail image of the related content not held by the user is displayed in deep color as labeled the letter "e" or "f" in FIG. 52A.

Figure 52B:
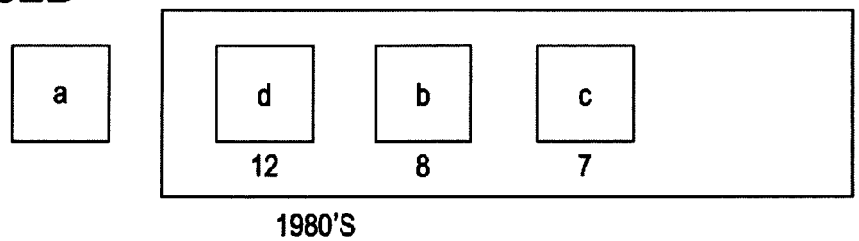

For example, as shown in FIG. 52B, the related content display method specifier 203 determines the display method of the model of the related content so that the thumbnail image of the related content frequently viewed by the user is displayed closer to the thumbnail image of the starting content and so that the thumbnail image of the related content less frequently viewed by the user is displayed farther from the thumbnail image of the starting content.

More specifically, the related content display method specifier 203 determines the display method of the model of the related content so that the thumbnail image labeled the letter "b" in FIG. 52B of the related content viewed by twelve times by the user is displayed closer to the thumbnail image labeled the letter "a! in FIG. 52B of the starting content and so that the thumbnail image labeled the letter "c" in FIG. 52B of the related content viewed by seven times by the user is displayed farther from the thumbnail image labeled the letter "a" in FIG. 52B of the starting content.

Figure 52C:
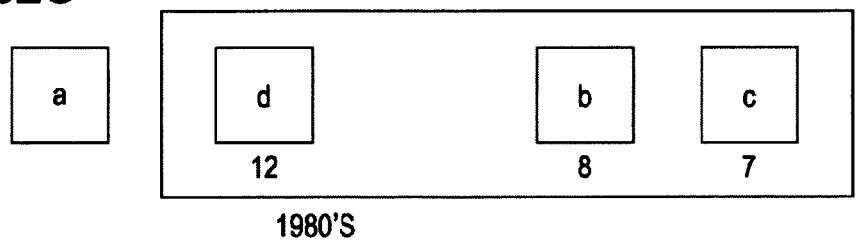

For example, the related content display method specifier 203 determines the display method of the model of the related content as shown in FIG. 52C so that the spacing between the thumbnail image of the starting content and the thumbnail image of the related content is dependent on the frequency of viewing of the related content. The related content display method specifier 203 may determine the display method of the model of the related content so that the spacing between the thumbnail image of the starting content and the thumbnail image of the related content is dependent on the reciprocal number of the frequency of viewing of the related content.

More specifically, the related content display method specifier 203 determines the display method of the model of the related content so that the spacing between the thumbnail image of the starting content and the thumbnail image of the related content is dependent on the reciprocal number of the frequency of viewing of the related content, for example, twelve times, eight times or seven times.

Figure 52D:
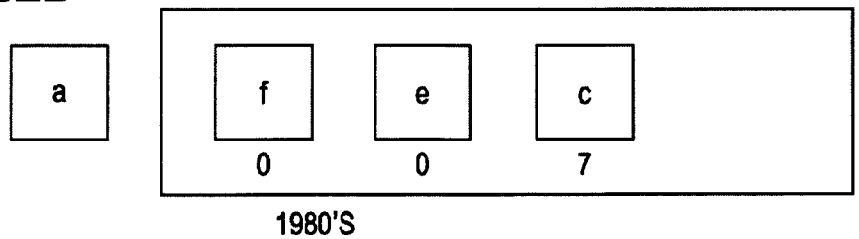

For example, the related content display method specifier 203 determines the display method of the model of the related content as shown in FIG. 52D so that the thumbnail image of the starting content less frequently viewed by the user is displayed closer to the thumbnail image of the starting content and so that the thumbnail image of the starting content more frequently viewed by the user is displayed farther from the thumbnail image of the starting content.

Figure 53:
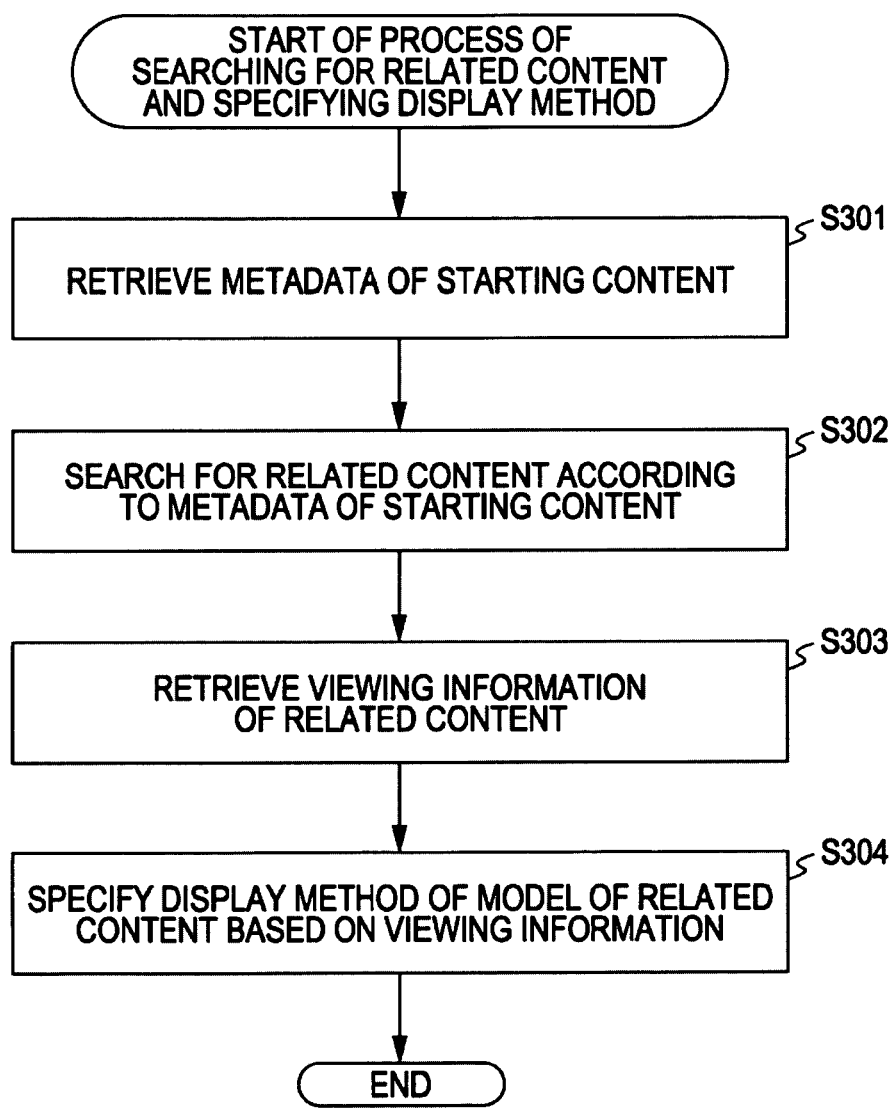
FIG. 53 is a flowchart illustrating a process for searching a related content and specifying a display method.

FIG. 53 is a flowchart illustrating a process of searching for the related content and specifying the display method. In step S301, the related content searcher 57 retrieves the metadata of the starting content from the metadata database 61.

In step S302, the related content searcher 57 searches for the related content in accordance with the metadata of the starting content. For example, in step S302, the related content searcher 57 retrieves from the metadata database 61 the metadata having the same metadata value in the same category as the metadata of the starting content but attached to a content different from the starting content. The related content searcher 57 searches for the related content by retrieving the identification information identifying the related content having the metadata having the same value as the starting content.

In step S303, the related content viewing information retrieving unit 201 retrieves from the viewing information database 202 the viewing information of the related content searched and hit in step S302. For example, in step S303, the related content viewing information retrieving unit 201 requests the identification information identifying the related content as a key from the viewing information database 202 and retrieves the viewing information of the related content identified by the identification information read from the viewing information database 202.

In step S304, the related content display method specifier 203 specifies the display method of the model of the related content to the model parameter determiner 53 based on the viewing information retrieved in step S303. The process of searching for the related content and specifying the display method is thus completed.

The display method of the model such as the thumbnail image is modified depending on the content viewing status of the user. The user can easily find a new and unviewed content or easily access a familiarized content.

The search process of the related content using similarity is described below.

Figure 54:
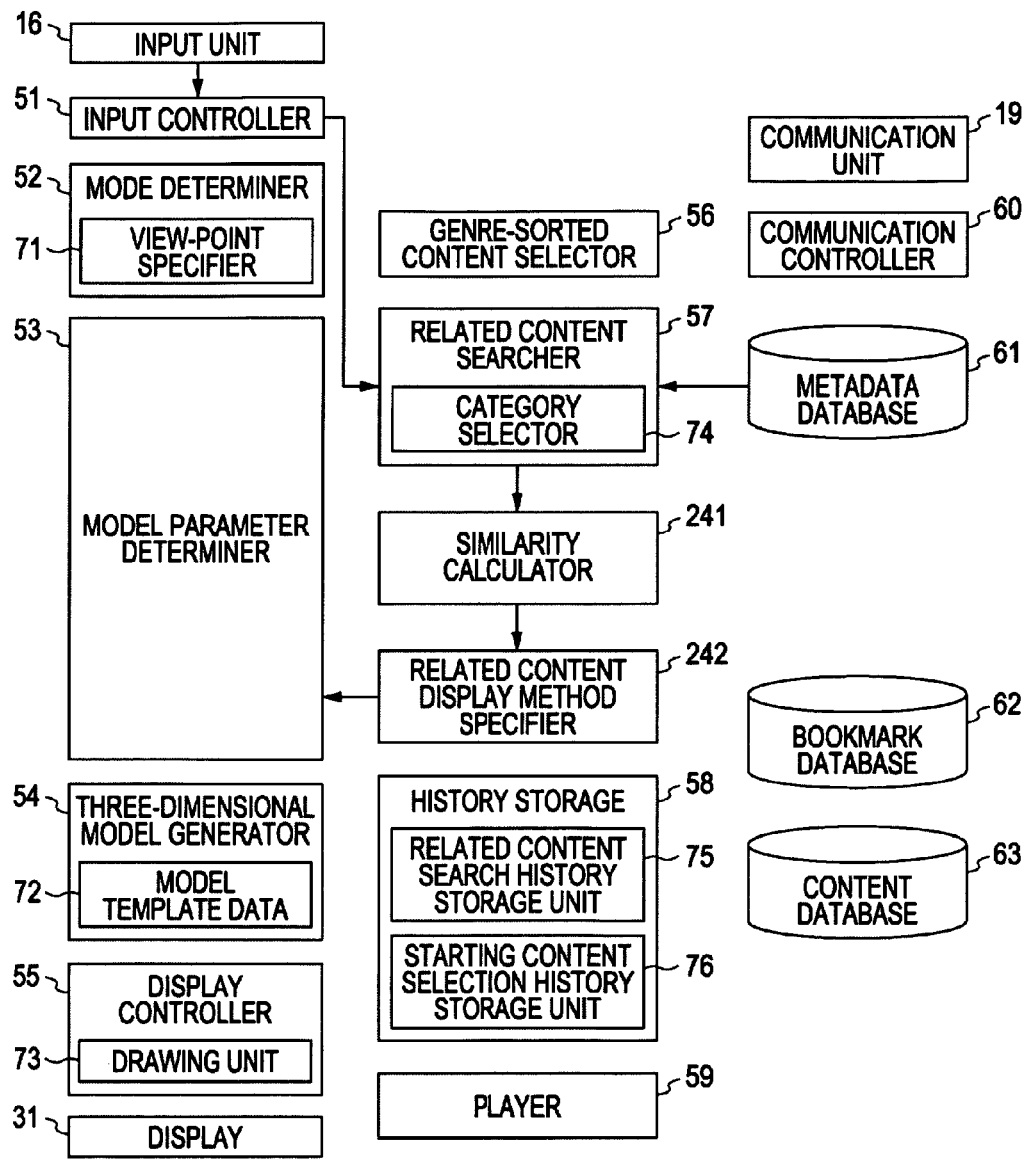
FIG. 54 is a functional block diagram illustrating another personal computer executing a program.

FIG. 54 is a functional block diagram illustrating another personal computer performing a program. The elements of FIG. 54 are implemented when the personal computer executes the program. The personal computer includes the input controller 51 controlling the input unit 16, the mode determiner 52, the model parameter determiner 53, the three-dimensional model generator 54, the display controller 55 controlling the display 31, the genre-sorted content selector 56, the related content searcher 57, the history storage 58, the player 59, the communication controller 60 controlling the communication unit 19, the metadata database 61, the bookmark database 62, and the content database 63. The personal computer also includes a similarity calculator 241 and a related content display method specifier 242.

In FIG. 54, elements identical to those illustrated in FIG. 2 are designated with the same reference numerals and the discussion thereof is omitted here.

The similarity calculator 241 calculates similarity between a starting content and a related content, thereby determining an arrangement order of the models of the related contents. The similarity may be cosine distance, Euclidean distance or the like. The similarity calculator 241 supplies the related content display method specifier 242 with the calculated similarity and information indicating the arrangement order of the related contents.

For example, the similarity calculator 241 calculates the similarity of FIG. 56 based on metadata of FIG. 55.

As shown in FIG. 55, content 1 is a starting content, and contents 2 through 5 are related contents. As for the content 1, the metadata 1 has a value of 7, the metadata 2 has a value of 3, the metadata 3 has a value of 0, the metadata 4 has a value of 9 and the metadata 5 has a value of 5.

The values of the metadata 1 of the contents 2 through 5 as the related contents are 5, 4, 6 and 5, the values of the metadata 2 of the contents 2 through 5 are 2, 4, 4 and 0, the values of the metadata 3 of the contents 2 through 5 are 4, 5, 7 and 8, the values of the metadata 4 of the contents 2 through 5 are 9, 2, 5 and 6, and the values of the metadata 5 of the contents 2 through 5 are 7, 4, 3 and 8, respectively.

The similarity calculator 241 calculates similarity, namely, the reciprocal number of the Euclidean distance of the contents 2 through 5 based on the metadata of FIG. 55. For example, as illustrated in FIG. 56, the similarity calculator 241 calculates the Euclidean distance of the content 2 and obtains 5.000 here, calculates the Euclidean distance of the content 3 and obtains 9.220 here, calculates the Euclidean distance of the content 4 and obtains 8.426 here and calculates the Euclidean distance of the content 5 and obtains 9.747 here. The similarity calculator 241 calculates the reciprocal number of the Euclidean distance and handles the results as the similarity.

The similarity calculator 241 determines the arrangement order of the models of the related contents in the order of large to small similarity, namely, in the order from short to long Euclidean distance from the content 1, thus arranges the content 2, the content 4, the content 3 and the content 5 in that order.

The related content display method specifier 242 determines the display method of each model of the related content in accordance with information indicating the similarity and the arrangement order of the related contents supplied from the similarity calculator 241. The related content display method specifier 242 supplies the model parameter determiner 53 with the information indicating the display method of each model of the related content.

For example, the related content display method specifier 242 determines the display method of the model of the related content so that the thumbnail image of the related content (different from the starting content) having a low similarity is displayed in light color and so that the thumbnail image of the related content (more similar to the starting content) having a high similarity is displayed in deep color.

For example, the related content display method specifier 242 determines the display method of the model of the related content so that the thumbnail image of the related content (more similar to the starting content) having a high similarity is displayed closer to the thumbnail image of the starting content and so that the thumbnail image of the related content (more different from the starting content) having a low similarity is displayed farther from the thumbnail image of the starting content.

Depending on similarity, the related content display method specifier 242 may change both the color density of the thumbnail image and the distance between the thumbnail image of the starting content and the thumbnail image of the related content.

Figure 57:
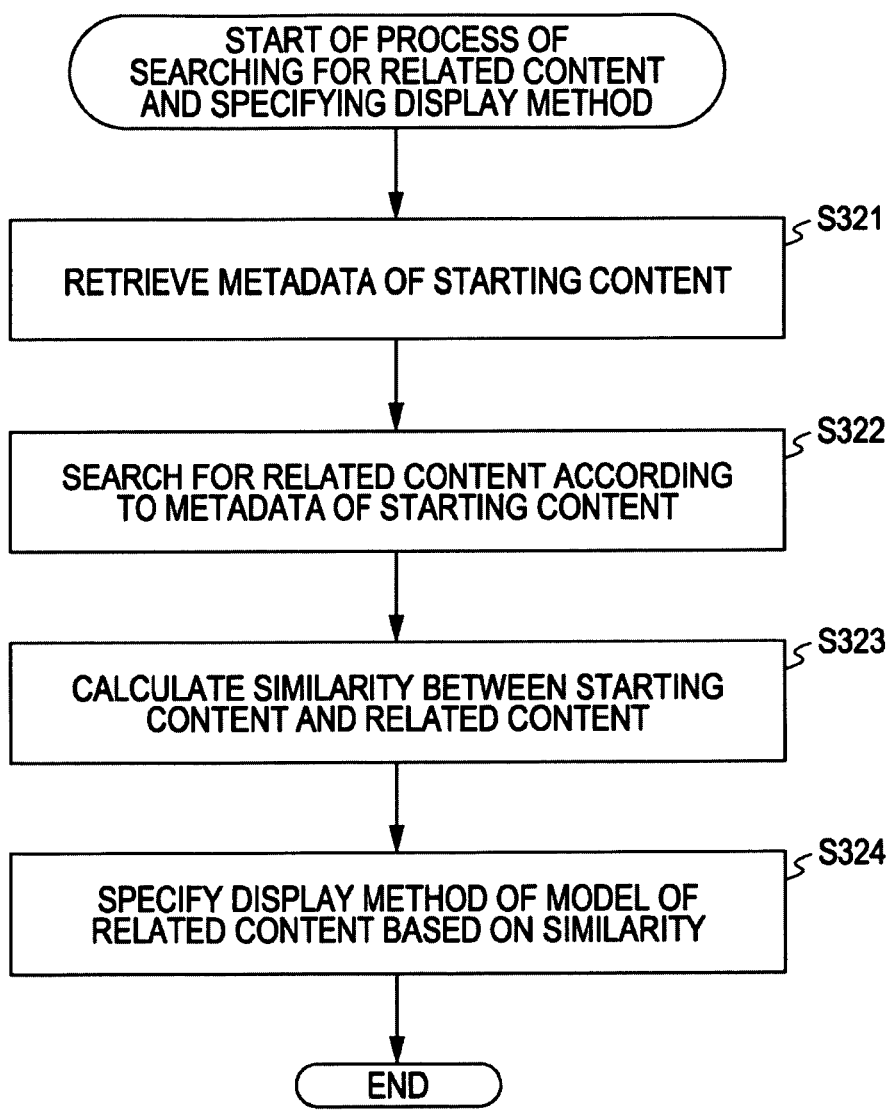
FIG. 57 is a flowchart illustrating a process for searching a related content and specifying a display method.

FIG. 57 is a flowchart illustrating another process for searching for the related content and specifying the display method. In step S321, the related content searcher 57 retrieves the metadata of a starting content from the metadata database 61.

In step S322, the related content searcher 57 searches for the related content in the same way as in step S302 based on the metadata of the starting content.

In step S323, the similarity calculator 241 calculates the similarity between the metadata of the starting content and the metadata of the related content based on the metadata of the starting content and the metadata of the related content. For example, in step S323, the similarity calculator 241 calculates the similarity between the starting content and the related content. The similarity is one of the cosine distance, the Euclidean distance and the reciprocal number of the Euclidean distance.

In step S324, the related content display method specifier 203 specifies the display method of the model of the related content to the model parameter determiner 53 based on the similarity calculated in step S323. The process of searching for the related content and specifying the display method is thus completed.

Since the models of the related contents, such as the thumbnail images, are displayed in the order of similarity between the related content and the starting content, the user can easily find a content similar to a current content of interest.

The search process of the related content in accordance with user preference is described below. The search process is based on content based filtering (CBF) technique.

Figure 58:
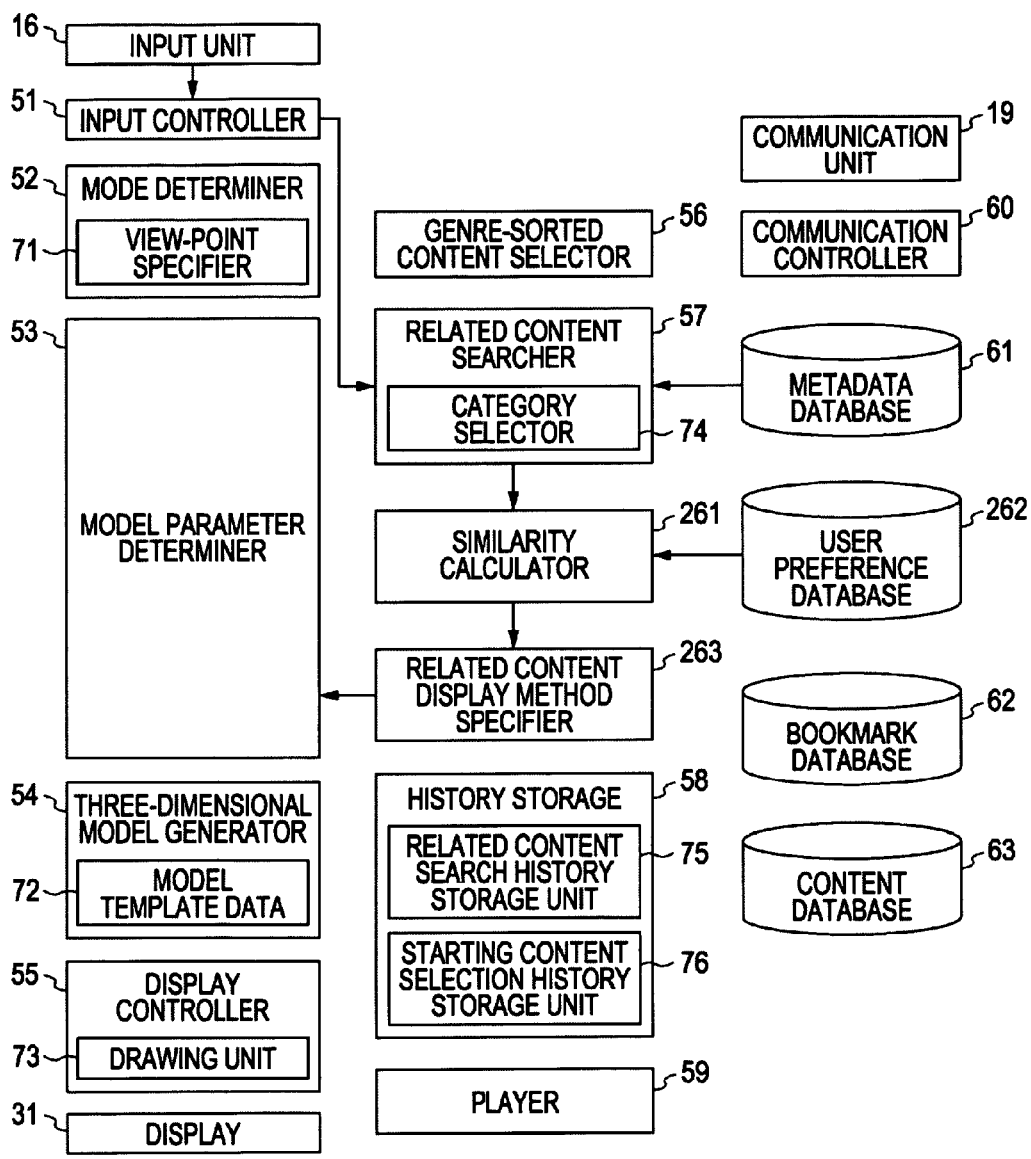
FIG. 58 is a functional block diagram illustrating yet another personal computer executing a program.

FIG. 58 is a functional block diagram illustrating yet another personal computer performing a program. The elements of FIG. 58 are implemented when the personal computer executes the program. The personal computer includes the input controller 51 controlling the input unit 16, the mode determiner 52, the model parameter determiner 53, the three-dimensional model generator 54, the display controller 55 controlling the display 31, the genre-sorted content selector 56, the related content searcher 57, the history storage 58, the player 59, the communication controller 60 controlling the communication unit 19, the metadata database 61, the bookmark database 62, and the content database 63. The personal computer further includes a similarity calculator 261, a user preference database 262 and a related content display method specifier 263.

In FIG. 58, elements identical to those illustrated in FIG. 2 are designated with the same reference numerals and the discussion thereof is omitted here.

The similarity calculator 261 matches the related content group searched and hit by the related content searcher 57 with preference information of the user based on the preference information of the user stored on the user preference database 262. The term "matches" means to determine similarity represented by cosine similarity or the Euclidean distance between the preference information described in vector and the metadata of the content described in vector.

The preference information of the user is a total sum of vectors of the metadata of contents evaluated as being favorite by the user.

In other words, the similarity calculator 261 calculates the similarity between the related content group and the preference information of the user. The user preference database 262 stores the preference information of the user.

For example, the similarity calculator 261 retrieves the preference information of the user from the user preference database 262 and acquires the metadata of the related content from the related content searcher 57. The similarity calculator 261 calculates the similarity between the preference information and the related content based on the preference information of the user and the metadata of the related content.

For example, the similarity calculator 261 calculates the cosine similarity between the preference information and the related content in accordance with the following equation (1):

$$\text{Cosine similarity} = \frac{\vec{x} \cdot \vec{y}}{|\vec{x}| \cdot |\vec{y}|} = \frac{\sum_i x_i y_i}{\sqrt{\sum_i x_i^2} \sqrt{\sum_i y_i^2}} \quad (1)$$

The letter x having a rightward looking arrow thereabove is a vector x representing the preference information of the user, and the letter y having a rightward looking arrow thereabove is a vector y representing the metadata of the related content as represented in the following equation (2):

$$\vec{x} = (x_1, x_2, \ldots x_m), \vec{Y} = (y_1, y_2, \ldots y_m) \quad (2)$$

where $x_1$ through $x_m$ represent m elements of the preference information of the user and $y_1$ through $y_n$ represent m pieces of metadata of the related content, and m represents a data number of metadata attached to the content.

FIG. 59 illustrates a preference vector x, i.e., the preference information of the user in vector representation. In the vector x as the preference vector in FIG. 59, metadata 1 corresponding to $x_1$ has a value of 5, metadata 2 corresponding to $x_2$ has a value of 0, metadata 3 corresponding to $x_3$ has a value of 3, metadata 4 corresponding to $x_4$ has a value of 3 and metadata 5 corresponding to $x_5$ has a value of 8.

With reference to FIG. 55, the values of the metadata 1 of the contents 2 through 5 as the related contents are 5, 4, 6 and 5, the values of the metadata 2 of the contents 2 through 5 are 2, 4, 4 and 0, the values of the metadata 3 of the contents 2 through 5 are 4, 5, 7 and 8, the values of the metadata 4 of the contents 2 through 5 are 9, 2, 5 and 6, and the values of the metadata 5 of the contents 2 through 5 are 7, 4, 3 and 8, respectively. In accordance with equation (1), the similarity calculator 261 calculates the cosine similarity as shown in FIG. 60. More specifically, the similarity calculator 261 results in a cosine similarity of 0.877 for the content 2, a cosine similarity of 0.804 for the content 3, a cosine similarity of 0.749 for the content 4 and a cosine similarity of 0.921 for the content 5.

The arrangement order of the related contents are determined in the large to small cosine similarity order, i.e., the content 5, the content 2, the content 3 and the content 4 are arranged in that order. The similarity calculator 261 supplies the related content display method specifier 263 with the information indicating the arrangement order of the related contents.

The related content display method specifier 263 determines the display method of each model of the related content in accordance with the similarity and the information indicating the arrangement order of the related contents supplied from the similarity calculator 261. The related content display method specifier 263 supplies the model parameter determiner 53 with the information indicating the display method of each model of the related content.

Figure 61:
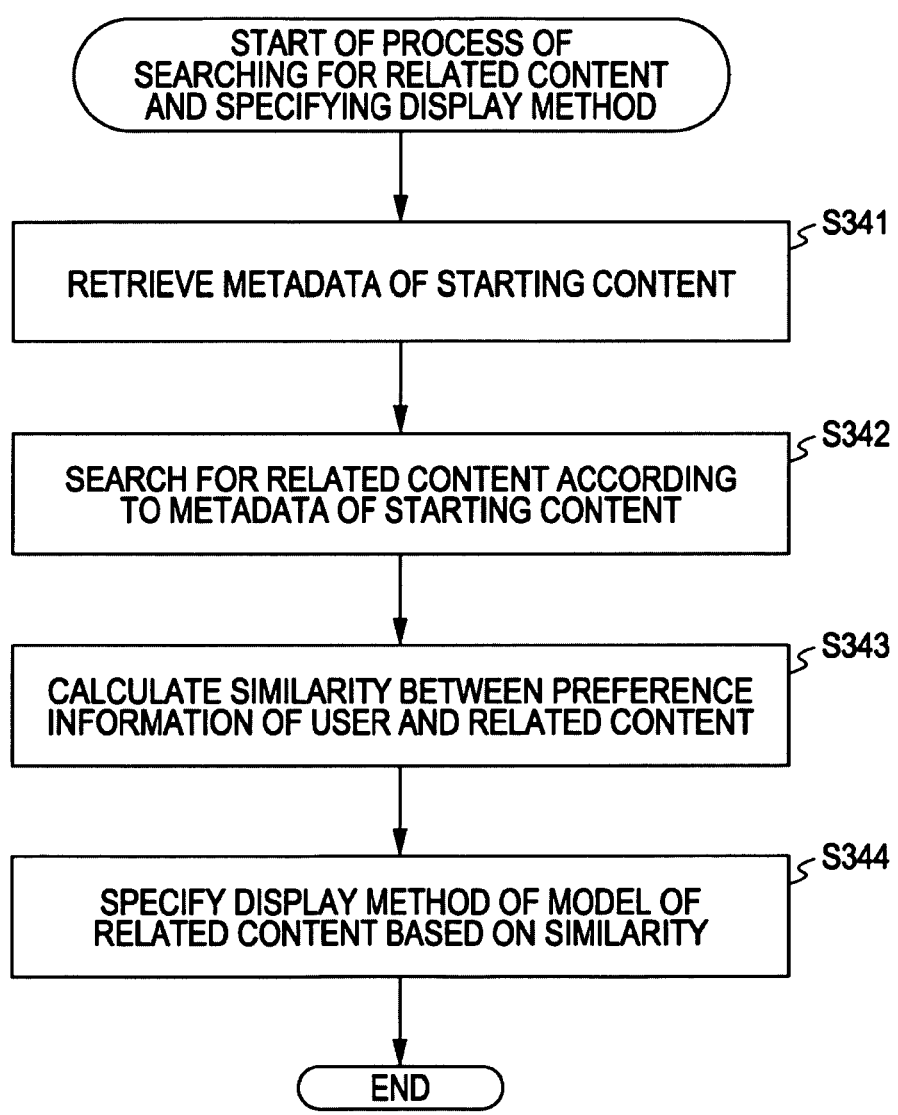
FIG. 61 is a flowchart illustrating a process for searching a related content and specifying a display method.

FIG. 61 is a flowchart illustrating another process of searching for the related content and specifying the display method. In step S341, the related content searcher 57 retrieves the metadata of the starting content from the metadata database 61.

In step S342, the related content searcher 57 searches for the related content based on the metadata of the starting content in the same way as in step S302.

In step S343, the similarity calculator 261 retrieves from the user preference database 262 the preference information of the user and calculates the similarity between the preference information of the user and the related content based on the preference information of the user and the metadata of the related content. For example, in step S343, the similarity calculator 261 calculates the cosine similarity as the similarity between the preference information of the user and the related content.

In step S344, the related content display method specifier 263 specifies the display method of the model of the related content to the model parameter determiner 53 based on the similarity calculated in step S343. The process of searching for the related content and specifying the detailed information is thus completed.

By arranging the model of the content matching the preference information of the user with higher priority, the content group is viewed in a list from a particular standpoint (metadata). The user can easily select a preferred content.

A model of a related content recommended by another user can be displayed.

Figure 62:
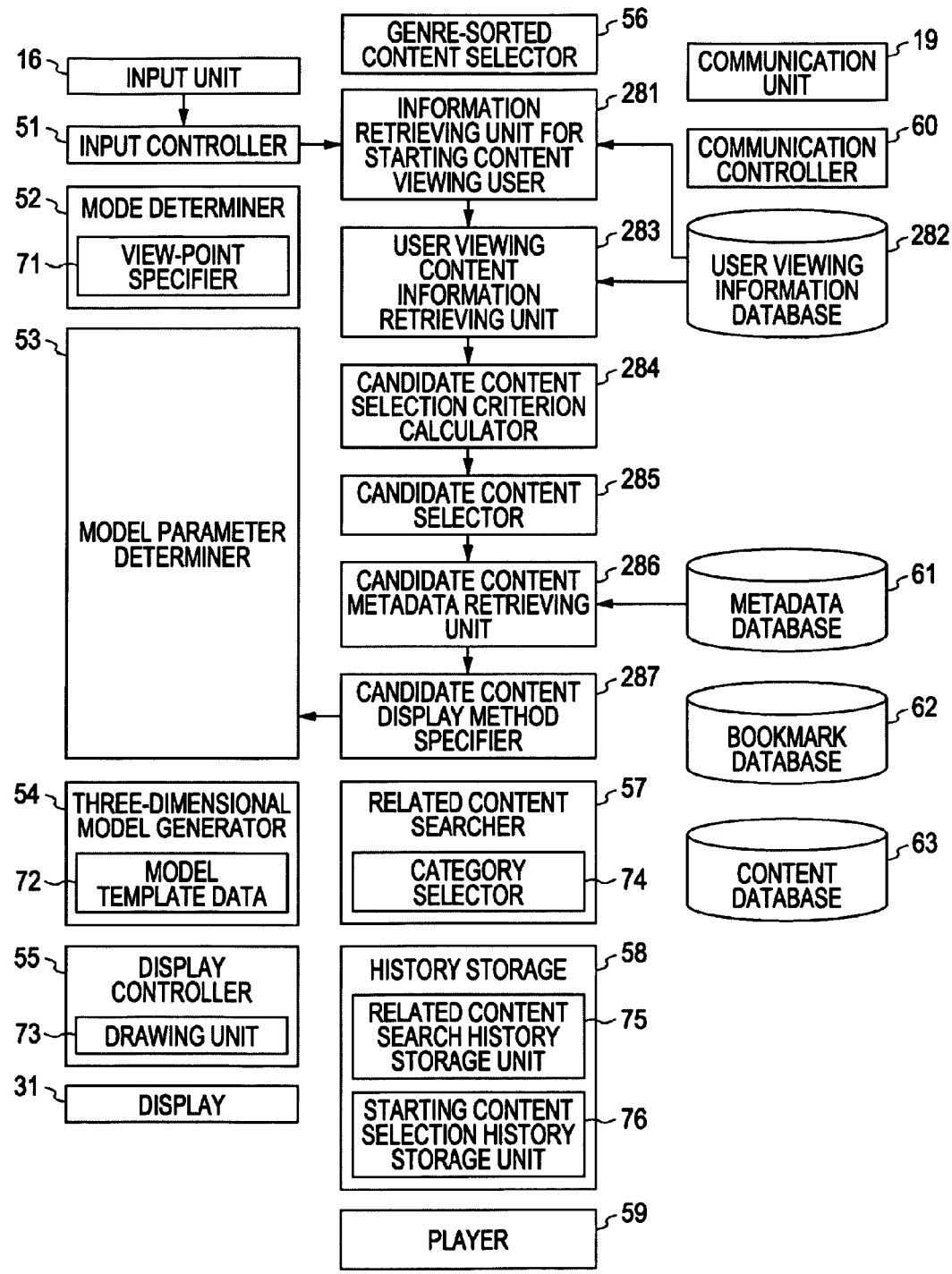
FIG. 62 is a functional block diagram illustrating still another personal computer executing a program.

FIG. 62 is a functional block diagram illustrating yet another personal computer performing a program. The elements of FIG. 62 are implemented when the personal computer executes the program. The personal computer includes the input controller 51 controlling the input unit 16, the mode determiner 52, the model parameter determiner 53, the three-dimensional model generator 54, the display controller 55 controlling the display 31, the genre-sorted content selector 56, the related content searcher 57, the history storage 58, the player 59, the communication controller 60 controlling the communication unit 19, the metadata database 61, the bookmark database 62, and the content database 63. The personal computer further includes an information retrieving unit 281 for related source content viewing user, a user viewing information database 282, a user viewing content information retrieving unit 283, a candidate content selection criterion calculator 284, a candidate content selector 285, a candidate content metadata retrieving unit 286 and a candidate content display method specifier 287.

In FIG. 62, elements identical to those illustrated in FIG. 2 are designated with the same reference numerals and the discussion thereof is omitted here.

The related source content viewing user information retrieving unit 281 retrieves information indicating a viewing history of contents by the user and evaluation of the contents by the user from the user viewing information database 282.

The user viewing information database 282 stores the viewing history of the contents by the user and the evaluation of the contents by the user. When the viewing history and evaluation of the user are requested with the user being specified, the user viewing information database 282 reads and then outputs the viewing history and evaluation of that user. When the viewing history and evaluation of the user are requested with a content being specified, the user viewing information database 282 reads and then outputs the viewing history of the specified content by each user and the evaluation of the specified content by each user.

For example, the related source content viewing user information retrieving unit 281 retrieves from the user viewing information database 282 the viewing history and evaluation of the starting content by the user having viewed the starting content. That starting content is indicated by data input from the input controller 51 in response to the user operation on the input unit 16. The related source content viewing user information retrieving unit 281 selects one of the user having viewed the starting content and the user having evaluated the starting content as having a high standard and retrieves information identifying the selected user.

FIG. 63 illustrates an example of five-level evaluation of the contents by users. As shown in FIG. 63, the content 5 is ranked as having the highest evaluation level while the content 1 is ranked as having the lowest evaluation level.

In the evaluation table of FIG. 63, the user 1 ranks the content 1 as having level 3, the content 2 as having level 3, the content 3 as having level 5, the content 4 as having level 4 and the content 5 as having level 5.

Similarly, in the evaluation table of FIG. 63, the user 2 ranks the content 1 as having level 2, the content 2 as having level 3, the content 3 as having level 4, the content 4 as having level 2 and the content 5 as having level 2.

Also, in the evaluation table of FIG. 63, the user 3 ranks the content 1 as having level 3, the content 2 as having level 5, the content 3 as having level 2, the content 4 as having level 2 and the content 5 as having level 1. In the evaluation table of FIG. 63, the user 4 ranks the content 1 as having level 5, the content 2 as having level 1, the content 3 as having level 4, the content 4 as having level 5 and the content 5 as having level 1.

For example, if the content 3 of FIG. 63 is a starting content, the related source content viewing user information retrieving unit 281 retrieves the evaluation values of the related contents listed in FIG. 63 from the user viewing information database 282, and selects the users 1, 2 and 4 having ranked the content 3 as having level 4 or higher. The related source content viewing user information retrieving unit 281 retrieves information identifying the users 1, 2 and 4, such as the user name or the user ID.

The related source content viewing user information retrieving unit 281 supplies the user viewing content information retrieving unit 283 with the information identifying the users thus selected.

The user viewing content information retrieving unit 283 retrieves from the user viewing information database 282 the evaluation values of the contents viewed and evaluated by the users selected by the related source content viewing user information retrieving unit 281. The user viewing content information retrieving unit 283 supplies the candidate content selection criterion calculator 284 with the evaluation values of the contents viewed and evaluated by the selected users.

The candidate content selection criterion calculator 284 calculates a criterion for selecting the content as a candidate content. The candidate content selection criterion calculator 284 supplies the calculated criterion to the candidate content selector 285. For example, the candidate content selection criterion calculator 284 sets a mean value of the evaluation values of the selected users as a criterion for selecting the candidate contents to be applied to all contents viewed by the selected users.

The candidate content selector 285 selects the candidate content according to the criterion. If the user viewing content information retrieving unit 283 supplies the evaluation values of the contents by the users as listed in FIG. 63, the candidate content selector 285 sets as the candidate contents all contents except the content 3, namely, the contents 1, 4 and 5 highly evaluated by the selected users, namely, the users 1, 2 and 4.

In this case, contents unviewed by the users may be selected as candidate contents.

The arrangement order of the candidate contents may be determined by the mean evaluation value of the selected candidate contents. For example, in the evaluations of the contents by the users as shown in FIG. 63, the mean evaluation value of the content 1 is (3+2+5)/3=3.33, the mean evaluation value of the content 4 is (4+2+5)/3=3.67 and the mean evaluation value of the content 5 is (5+2+1)/3=2.67. The models are then arranged in the high to low mean evaluation value order, i.e., the content 4, the content 1 and the content 5 are arranged in that order.

The selection of the candidate content and the calculation of the mean evaluation value may be performed regardless of user's intervention.

The candidate content selector 285 supplies the candidate content metadata retrieving unit 286 with the information identifying the selected candidate content together with the information indicating the arrangement order of the candidate contents.

The candidate content metadata retrieving unit 286 retrieves from the metadata database 61 the metadata of the candidate content in accordance with the information identifying the candidate contents supplied from the candidate content selector 285. The candidate content metadata retrieving unit 286 supplies the candidate content display method specifier 287 with the retrieved metadata of the candidate contents together with the information indicating the arrangement order of the candidate contents.

In accordance with the information indicating the arrangement order of the candidate contents and the metadata of the candidate contents, the candidate content display method specifier 287 determines the display method of each model of the candidate contents. The candidate content display method specifier 287 supplies the model parameter determiner 53 with information indicating the display method of each model of the candidate contents.

Figure 64:
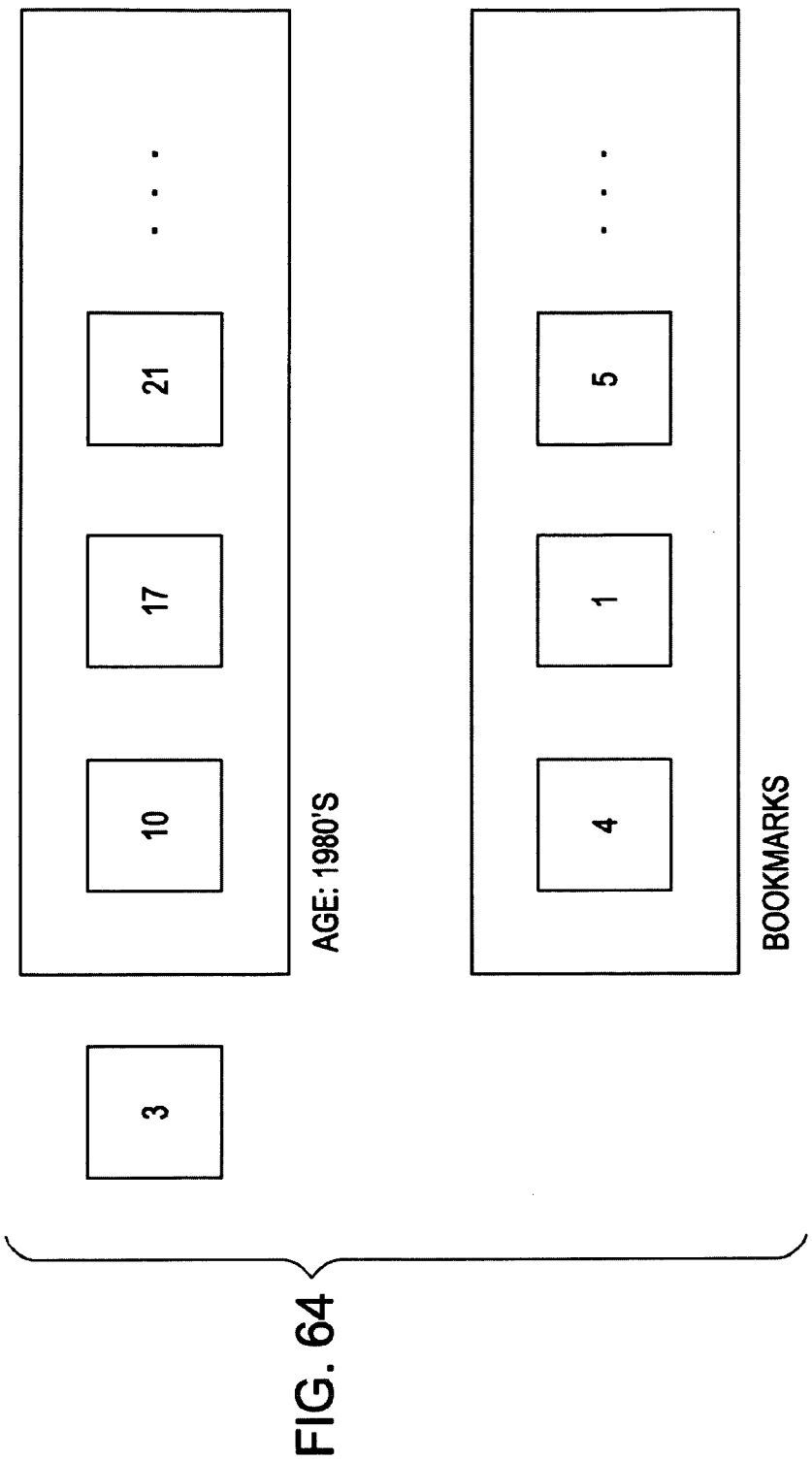
FIG. 64 illustrates a display example displayed on a display in an output unit.

As shown in FIG. 64, the thumbnail images of the candidates are displayed by displaying the thumbnail images of the related contents.

The candidate content display method specifier 287 may determine the display method of each model of the candidate contents so that the thumbnail image of each candidate content is displayed in light color or deep color depending on the mean evaluation value.

For example, the candidate content display method specifier 287 determines the display method of each model of the candidate contents so that the thumbnail image of the candidate content having a high mean evaluation value is displayed closer to the thumbnail image of the starting content and so that the thumbnail image of the candidate content having a low mean evaluation value is displayed farther from the thumbnail image of the starting content.

For example, as shown in FIG. 52C, the candidate content display method specifier 287 determines the display method of each model of the candidate contents so that the distance between the thumbnail image of the starting content and the thumbnail image of the related content changes depending on the mean evaluation value.

Figure 65:
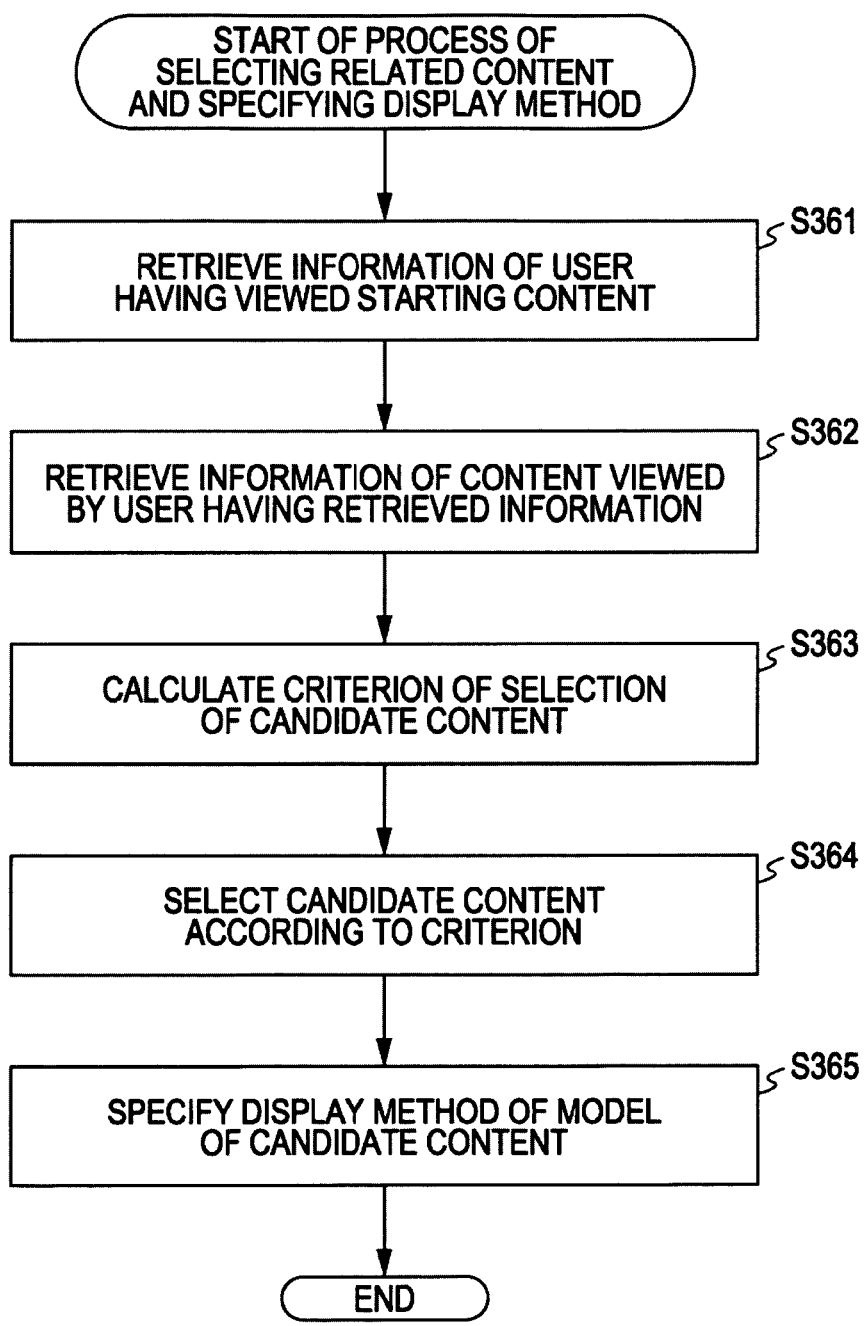
FIG. 65 is a flowchart illustrating a process for searching a related content and specifying a display method.

FIG. 65 is a flowchart illustrating another process of selecting the candidate content and specifying the display method. In step S361, the related source content viewing user information retrieving unit 281 retrieves the information regarding the user having viewed the starting content from the user viewing information database 282. More specifically, in step S361, the related source content viewing user information retrieving unit 281 retrieves from the user viewing information database 282 the viewing history and evaluation of the contents by the users having viewed the starting content indicated by data input from the input controller 51 in response to the user operation on the input unit 16. The related source content viewing user information retrieving unit 281 selects one of the user having viewed the starting content and the user having evaluated the starting content as having a high standard and retrieves information identifying the selected user.

In step S362, the user viewing content information retrieving unit 283 retrieves the information regarding the content viewed by the selected user. For example, in step S362, the user viewing content information retrieving unit 283 retrieves the evaluation value of the content viewed and evaluated by the user selected in step S361 from the user viewing information database 282.

In step S363, the candidate content selection criterion calculator 284 calculates the selection criterion of the candidate contents.

In step S364, the candidate content selector 285 selects the candidate content according to the selection criterion. The candidate content metadata retrieving unit 286 retrieves the metadata of the candidate content from the metadata database 61.

In step S365, the candidate content display method specifier 287 specifies the display method of each model of the candidate content to the model parameter determiner 53 based on the evaluation value of the candidate content or the metadata of the candidate content. The process of selecting the candidate content and specifying the display method is thus completed.

The contents likely to be preferred by the user can be efficiently displayed by arranging the models of the candidate contents based on the viewing experience of other users interested in the starting content.

A content in a different domain can be searched as a related content in a cross-domain manner and recommended. The term domain refers to a type of content. For example, music and movies belong to different domain, and books and television programs are different domains.

Contents in different domains may have different metadata but still share in common many pieces of metadata including release year, persons related to production, or keywords.

Figure 66:
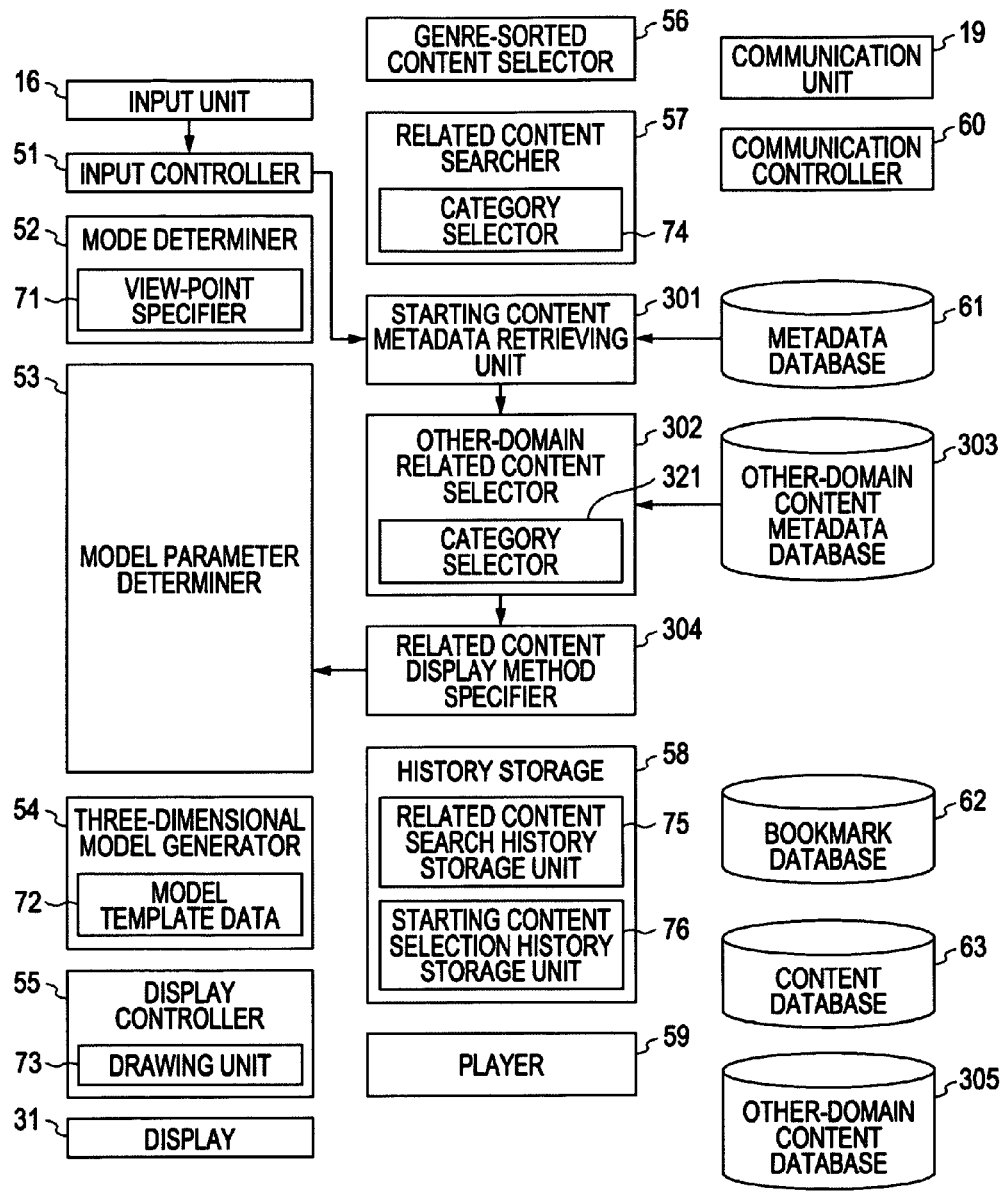
FIG. 66 is a functional block diagram illustrating a personal computer executing a program.

FIG. 66 is a functional block diagram illustrating yet another personal computer performing a program. The elements of FIG. 66 are implemented when the personal computer executes the program. The personal computer includes the input controller 51 controlling the input unit 16, the mode determiner 52, the model parameter determiner 53, the three-dimensional model generator 54, the display controller 55 controlling the display 31, the genre-sorted content selector 56, the related content searcher 57, the history storage 58, the player 59, the communication controller 60 controlling the communication unit 19, the metadata database 61, the bookmark database 62, and the content database 63. The personal computer further includes a starting content metadata retrieving unit 301, an other-domain related content selector 302, an other-domain content metadata database 303, a related content display method specifier 304 and an other-domain content database 305.

In FIG. 66, elements identical to those illustrated in FIG. 2 are designated with the same reference numerals and the discussion thereof is omitted here.

The starting content metadata retrieving unit 301 retrieves the metadata of the starting content from the metadata database 61 based on the information identifying the starting content supplied from the related content related content searcher 57. The starting content metadata retrieving unit 301 retrieves from the metadata database 61 the metadata of the starting content indicated by data input from the input controller 51 in response to the user operation on the input unit 16.

If the starting content is music recorded on one compact disk, an ID identifying the compact disk is supplied from the related content searcher 57 to the starting content metadata retrieving unit 301 as the information identifying the starting content. As shown in FIG. 67, the starting content metadata retrieving unit 301 retrieves from the metadata database 61 metadata indicating 1980's as age and metadata as a keyword having a value for melancholiness with reference to the starting content as the music recorded on the compact disk identified by album 1 as ID. The age and the keyword are the categories of metadata. The age of the starting content as the metadata indicates 1980's and the keyword of the starting content as the metadata indicates melancholiness.

The starting content metadata retrieving unit 301 supplies the retrieved metadata of the starting content to the other-domain related content selector 302.

In accordance with the metadata of the starting content supplied from the starting content metadata retrieving unit 301, the other-domain related content selector 302 retrieves from the other-domain content metadata database 303 metadata of another content in a domain different from the domain of the starting content but in the same category as the metadata of the starting content.

The other-domain content metadata database 303 stores the metadata of the other domain.

The other-domain content metadata database 303 stores the metadata of the content in the other domain, for example, a movie content. More specifically, as shown in FIG. 68, the other-domain content metadata database 303 stores metadata having a value indicating 1980's in an age category and metadata having a value indicating comical in a keyword category for a content identified by movie 1 as ID, metadata having a value indicating 1990's in the age category and metadata having a value indicating melancholiness in the keyword category for a content identified by movie 2 as ID and metadata having a value indicating 1980's in the age category and metadata having a value indicating melancholiness in the keyword category for a content identified by movie 3 as ID.

Furthermore, the other-domain content metadata database 303 stores metadata of contents of the other domain, for example, book contents. More specifically, as shown in FIG. 69, the other-domain content metadata database 303 stores metadata having a value indicating 1990's in the age category and metadata having a value indicating business in the keyword category for a content identified by book 1 as ID, metadata having a value indicating 2000's in the age category and metadata having a value indicating melancholiness in the keyword category for a content identified by book 2 as ID and metadata having a value indicating 1980's in the age category and metadata having a value indicating environmental problem in the keyword category for a content identified by book 3 as ID.

The metadata in the age category of the starting content as music recorded on one compact disk identified by album 1 as ID has a value indicating 1980's. The content identified by the movie 1 as ID, the content identified by the movie 3 and the content identified by the book 3 as ID have the metadata having a value indicating 1980's in the age category. More specifically, the metadata in the age category attached to the starting content identified by ID album 1 has the same value as the metadata in the age category attached to each of the content identified by ID movie 1, the content identified by ID movie 3 and the content identified by the ID book 3.

The metadata in the keyword category of the starting content as music recorded on one compact disk identified by album 1 as ID has a value indicating melancholiness. The content identified by the movie 2 as ID, the content identified by the movie 3, and the content identified by the book 2 as ID have the metadata having a value indicating melancholiness in the keyword category. More specifically, the metadata in the keyword category attached to the starting content identified by ID album 1 has the same value as the metadata in the keyword category attached to each of the content identified by ID movie 2, the content identified by ID movie 3 and the content identified by the ID book 2.

The other-domain related content selector 302 includes a category selector 321. The category selector 321 selects a category of the related content to be searched in a different domain.

The other-domain related content selector 302 searches for a content in a domain different from the domain of the starting content but having the value of metadata in the category selected by the category selector 321 equal to the value of the metadata in the category of the starting content. For example, the other-domain related content selector 302 reads from the other-domain content metadata database 303 the metadata of the content in the domain different from the domain of the starting content and searches for the content, in the different domain, having the metadata of an attribute identical in attribute value to the attribute of the metadata selected as a category of the starting content.

The other-domain related content selector 302 supplies the related content display method specifier 304 with the information identifying the related content searched and hit in the search in the different domain.

The related content display method specifier 304 determines the display method of each model of the related content in the different domain belonging to the related content group. The related content display method specifier 304 supplies the model parameter determiner 53 with information regarding the display method of each mode of the related content in the different domain.

Figure 70:
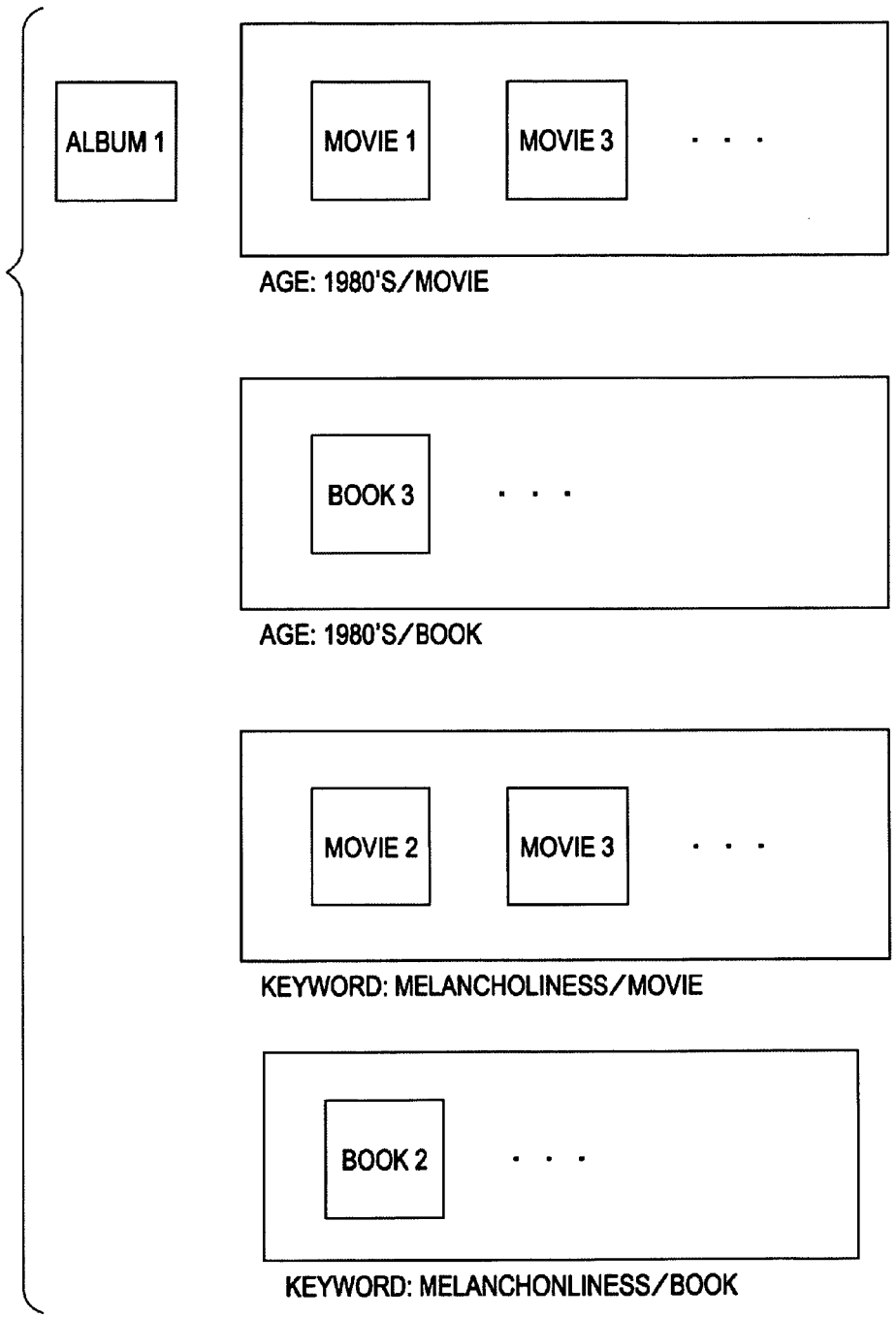
FIG. 70 illustrates display examples displayed on a display in an output unit.

For example, the related content display method specifier 304 determines the display method of each model of the related content in the different domain on a per category basis or on a per domain basis as shown in FIG. 70.

The metadata having a value indicating 1980's in the age category and the metadata having a value indicating melancholiness in the keyword category may be attached to the starting content as music recorded on a compact disk identified by album 1 as ID. In that case, the related content display method specifier 203 determines the display method of each model of the related content so that a thumbnail image of a related content identified by movie 1 as ID and a thumbnail image of a related content identified by movie 2 as ID are arranged in a line. The related content identified by movie 1 as ID is the related content in the movie domain and has the metadata having a value indicating 1980's in the age category. The related content identified by movie 2 as ID is the related content in the movie domain and has the metadata having a value indicating 1980's in the age category.

The metadata having a value indicating 1980's in the age category and the metadata having a value indicating melancholiness in the keyword category may be attached to the starting content as music recorded on the compact disk identified by album 1 as ID. In that case, the related content display method specifier 203 determines the display method of each model of the related content so that thumbnail images of related contents identified by book 3 as ID, falling within the book domain, and having the metadata having a value indicating 1980's in the age category are arranged in a line.

The metadata having a value indicating 1980's in the age category and the metadata having a value indicating melancholiness in the keyword category may be attached to the starting content as music recorded on a compact disk identified by album 1 as ID. In that case, the related content display method specifier 203 determines the display method of each model of the related content so that a thumbnail image of a related content identified by movie 2 as ID and a thumbnail image of a related content identified by movie 3 as ID are arranged in a line. The related content identified by movie 2 is the related content in the movie domain and has the metadata having a value indicating melancholiness in the keyword category. The related content identified by movie 3 is the related content in the movie domain and has the metadata having a value indicating melancholiness in the keyword category.

The metadata having a value indicating 1980's in the age category and the metadata having a value indicating melancholiness in the keyword category may be attached to the starting content as music recorded on the compact disk identified by album 1 as ID. In that case, the related content display method specifier 203 determines the display method of each model of the related content so that thumbnail images of related contents identified by book 2 as ID, falling within the book domain, and having the metadata having a value indicating melancholiness in the age category are arranged in a line.

The thumbnail images of the related contents in the movie domain and having the same metadata value of the age category as the starting content are thus arranged in a line. The thumbnail images of the related contents in the book domain and having the same metadata value of the age category as the starting content are thus arranged in a line. The thumbnail images of the related contents in the movie domain and having the same metadata value of the keyword category as the starting content are thus arranged in a line. The thumbnail images of the related contents in the book domain and having the same metadata value of the keyword category as the starting content are thus arranged in a line. The thumbnail images of these four types are displayed in lines parallel to each other.

Figure 71:
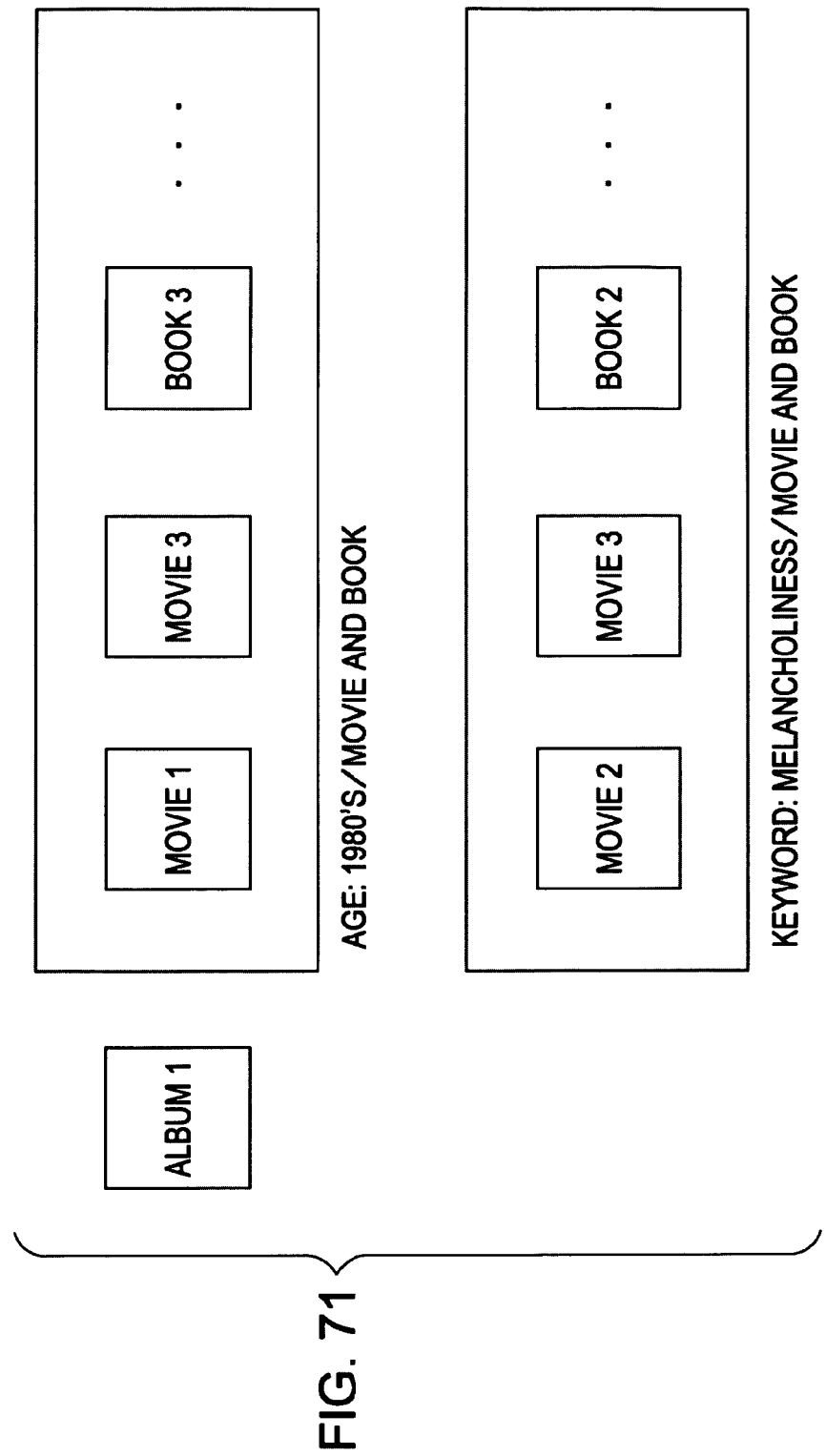
FIG. 71 illustrates display examples displayed on the display in the output unit.

For example, the related content display method specifier 304 may determine the display method of each model of the related contents as shown in FIG. 71 so that thumbnail images of related contents are not sorted by domain but sorted by category and displayed.

The metadata having a value indicating 1980's in the age category and the metadata having a value indicating melancholiness in the keyword category may be attached to the starting content as music recorded on a compact disk identified by album 1 as ID. In that case, the related content display method specifier 203 determines the display method of each model of the related content so that a thumbnail image of a related content identified by movie 1 as ID, a thumbnail image of a related content identified by movie 3 as ID, and a thumbnail image of a related content identified by book 3 as ID are arranged in a line. The related content identified by movie 1 is the related content in the movie domain and has the metadata having a value indicating 1980's in the age category. The related content identified by movie 3 is the related content in the movie domain and has the metadata having a value indicating 1980's in the age category. The related content identified by book 3 is the related content in the book domain and has the metadata having a value indicating 1980's in the age category.

The metadata having a value indicating 1980's in the age category and the metadata having a value indicating melancholiness in the keyword category may be attached to the starting content as music recorded on a compact disk identified by album 1 as ID. In that case, the related content display method specifier 203 determines the display method of each model of the related content so that a thumbnail image of a related content identified by movie 2 as ID, a thumbnail image of a related content identified by movie 3 as ID, and a thumbnail image of a related content identified by book 2 as ID are arranged in a line. The related content identified by movie 1 is the related content in the movie domain and has the metadata having a value indicating melancholiness in the keyword category. The related content identified by movie 3 is the related content in the movie domain and has the metadata having a value indicating melancholiness in the keyword category. The related content identified by book 2 is the related content in the book domain and has the metadata having a value indicating melancholiness in the keyword category.

The thumbnail image in one of the movie domain and the book domain and having the same metadata value of the age category as the starting content and the thumbnail image in one of the movie domain and the book domain and having the same metadata value of the keyword category as the starting content are arranged in lined parallel to each other.

The other-domain content database 305 stores other domain contents.

Figure 72:
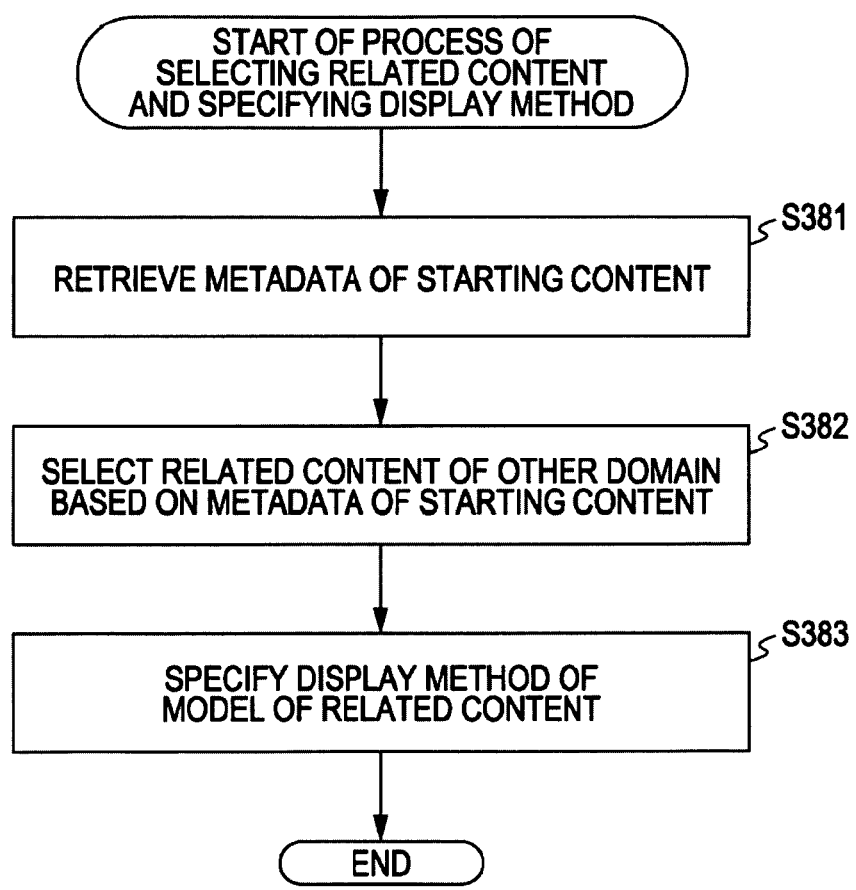
FIG. 72 is a flowchart illustrating a process for searching a related content and specifying a display method.

FIG. 72 is a flowchart illustrating a process of selecting the related content and specifying the display method. In step S381, the starting content metadata retrieving unit 301 retrieves the metadata of a starting content from the metadata database 61.

In step S382, the other-domain related content selector 302 selects the related content in another domain based on the metadata of the starting content. For example, the other-domain related content selector 302 retrieves from the other-domain content metadata database 303 the metadata of the other content in a domain different from the domain of the starting content but in the same category as the metadata of the starting content, in accordance with the metadata of the starting content retrieved in step S381. The other-domain related content selector 302 then selects the content in the domain different from the domain of the starting content and having the metadata value of the selected category equal to the metadata value of the category of the starting content.

In step S383, the related content display method specifier 304 determines the display method of each model of the related content in the different domain falling within the related content group and specifies the display method of each model of the related content to the model parameter determiner 53. The process of selecting the related content and specifying the display method is thus completed.

By displaying the different domain contents linked by the metadata, the user can find a new relationship among the contents.

The contents can be displayed with lines re-arranged.

Figure 73:
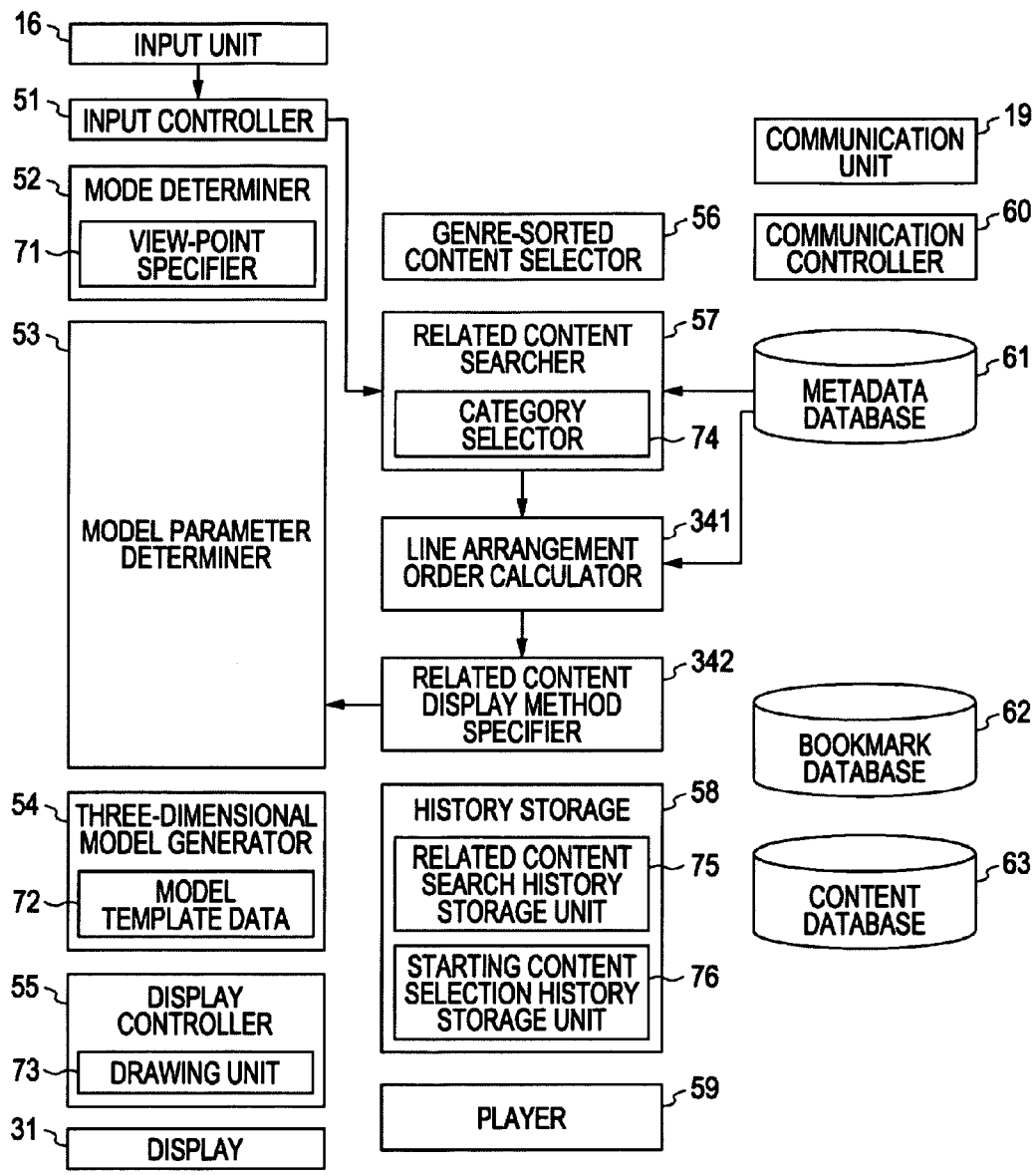
FIG. 73 is a functional block diagram illustrating a personal computer executing a program.

FIG. 73 is a functional block diagram illustrating yet another personal computer performing a program. The elements of FIG. 73 are implemented when the personal computer executes the program. The personal computer includes the input controller 51 controlling the input unit 16, the mode determiner 52, the model parameter determiner 53, the three-dimensional model generator 54, the display controller 55 controlling the display 31, the genre-sorted content selector 56, the related content searcher 57, the history storage 58, the player 59, the communication controller 60 controlling the communication unit 19, the metadata database 61, the bookmark database 62, and the content database 63. The personal computer further includes a line arrangement order calculator 341 and a related content display method specifier 342.

In FIG. 73, elements identical to those illustrated in FIG. 2 are designated with the same reference numerals and the discussion thereof is omitted here.

The related content searcher 57 retrieves from the metadata database 61 the metadata attached to the selected starting content based on data input from the input controller 51 in response to the user operation on the input unit 16. In order to search for the related content, the related content searcher 57 further retrieves from the metadata database 61 the metadata attached to the content different from the starting content but having the same metadata value and the same category as the metadata attached to the starting content. As a result, the related content searcher 57 retrieves identification information identifying the related content. The identification information identifying the related content may be one of the content name and the ID number.

Contents grouped on a per category basis are referred to as a content group.

FIG. 74 illustrates the metadata of the starting content and the related content. As shown in FIG. 74, a content identified by the content 1 as ID is a starting content and contents identified by the contents 2 through 5 as IDs are related contents.

The starting content identified by content 1 as ID has the metadata having a value of 1980's in the age category and the metadata having a value of melancholiness in the keyword category.

The metadata having a metadata value of 1980's in the age category and the metadata having a metadata value of comical in the keyword category are attached to the related content identified by the content 2. The metadata having a metadata value of 1990's in the age category and the metadata having a metadata value of melancholiness in the keyword category are attached to the related content identified by the content 3. The metadata having a metadata value of 1980's in the age category and the metadata having a metadata value of passion in the keyword category are attached to the related content identified by the content 4. The metadata having a metadata value of 2000's in the age category and the metadata having a metadata value of melancholiness in the keyword category are attached to the related content identified by the content 5.

The related content identified by the content 2 and the related content identified by the content 4 are sorted into the same content group, namely, the content group 1 because the two contents have the same metadata value of 1980's in the age category.

The related content identified by the content 3 and the related content identified by the content 5 are grouped into the same content group, namely, the content group 2 different from the content group 1 because the two contents have the same metadata value of melancholiness in the keyword category.

The related content searcher 57 groups the related contents in content groups.

The related content searcher 57 supplies the line arrangement order calculator 341 with the metadata of the starting content and the related contents, information identifying each of the starting content and the related contents and information grouping the related contents into the content group.

The line arrangement order calculator 341 calculates a value determining the arrangement order of the models of the related contents belonging to a content group with respect to the model of the starting content.

For example, on a per content basis, the models of the related contents are arranged in the order of importance of category of the metadata attached to the starting content. More specifically, there are now 100 contents in total. The number of contents having a metadata value of 1980's in the age category is now 20 and the number of contents having a metadata value of melancholiness in the keyword category is now 10. Since the number of contents having a metadata value of melancholiness in the keyword category is smaller than the number of contents having a metadata value of 1980's in the age category, the starting content, namely, the content 1 is more characterized by the metadata having the keyword melancholiness.

The line arrangement order calculator 341 determines the line arrangement order of each model of the related contents so that the line of the models of the related contents grouped in the content group 1 and the line of the models of the related contents grouped in the content group 2 are arranged in an appropriate fashion. More specifically, although the metadata having the same keyword melancholiness is attached, the model of the related content belonging to the content group 2 in the keyword category is arranged closer to the model of the starting content than the model of the related content belonging to the content group 1 in the age category.

The line arrangement order calculator 341 may handle the metadata attached to the content as a vector, determine similarity between the starting content and the related content from the vector of the metadata, calculate the sum or the mean value of the similarities on a content group basis, and arrange the models of the related contents belonging to the content group on a per content group basis in the large to small sum or the large to small mean value of the similarities.

For example, the line arrangement order calculator 341 may calculate as the similarity the cosine distance from the starting content as the content 1 to each of the contents 2 through 5 based on the metadata listed in FIG. 55.

Based on the metadata listed in FIG. 55, the line arrangement order calculator 341 calculates the cosine distances as shown in FIG. 75. More specifically, the line arrangement order calculator 341 results in a cosine distance of 0.927 for the content 2, a cosine distance of 0.694 for the content 3, a cosine distance of 0.766 for the content 4 and a cosine distance of 0.733 for the content 5.

The related content identified by the content 2 as ID and the related content identified by the content 4 as ID are grouped into the content group 1. The related content identified by the content 3 as ID and the related content identified by the content 5 as ID are grouped into the content group 2. The cosine distance, namely, the sum of the similarities between the related content identified by the content 2 and the related content identified by the content 4, both belonging to the content group 1, is 0.927+0.766=1.693. The cosine distance, namely, the sum of similarities between the related content identified by the content 3 and the related content identified by the content 5, both belonging to the content group 2, is 0.694+0.733=1.427.

Since the sum of similarities of the content group 1, namely, 1.693, is greater than the sum of similarities of the content group 2, namely, 1.427, the models of the related contents belonging to the content group 1 is arranged closer to the model of the starting content than the models of the related content belonging to the content group 2.

The related content display method specifier 342 determines the display method of each model of the related contents belonging to the related content group based on the value indicating the arrangement order of the lines calculated by the line arrangement order calculator 341. The models of the related contents are thus displayed in a re-arranged order on a per content group basis. The related content display method specifier 203 supplies the model parameter determiner 53 with the information indicating the display method of each model of the related contents.

Figure 76:
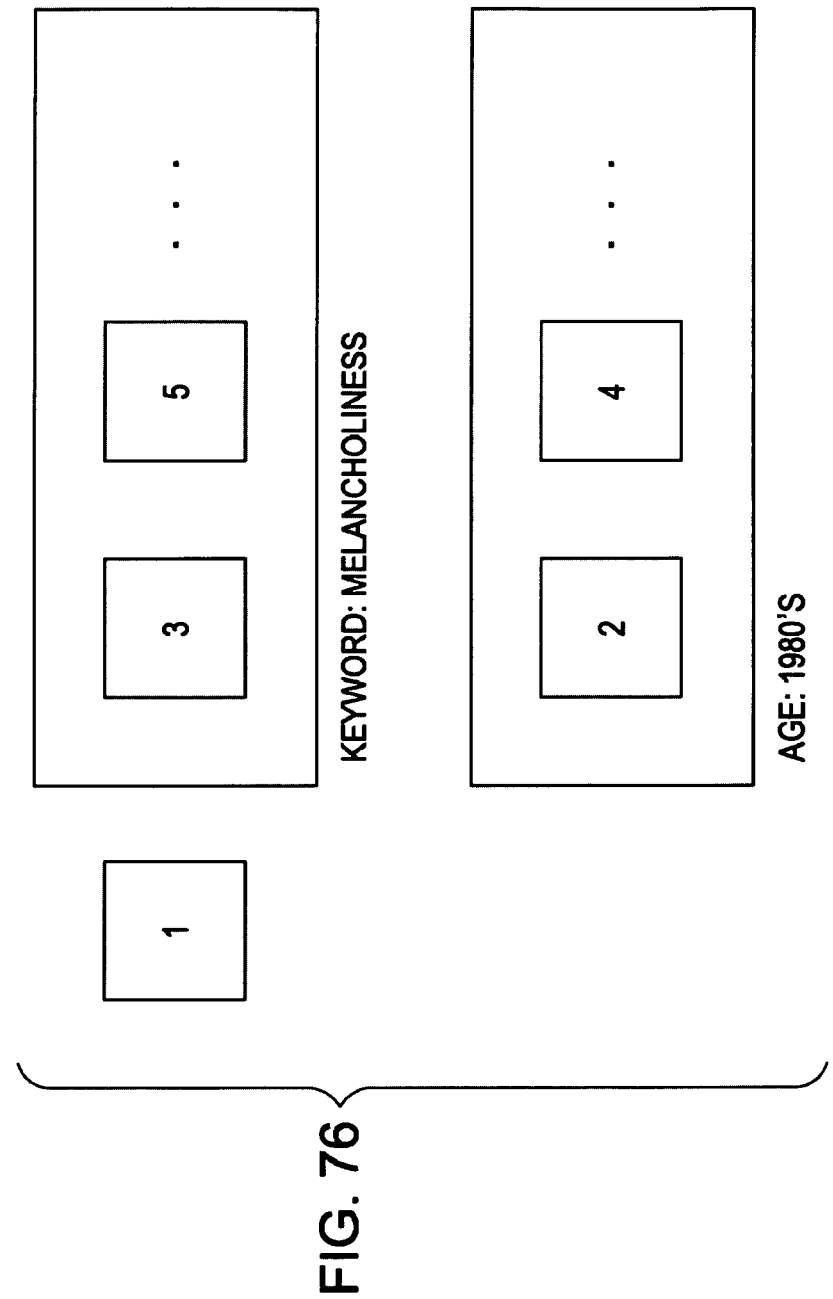
FIG. 76 illustrates display examples displayed on a display in an output unit.
Figure 77:
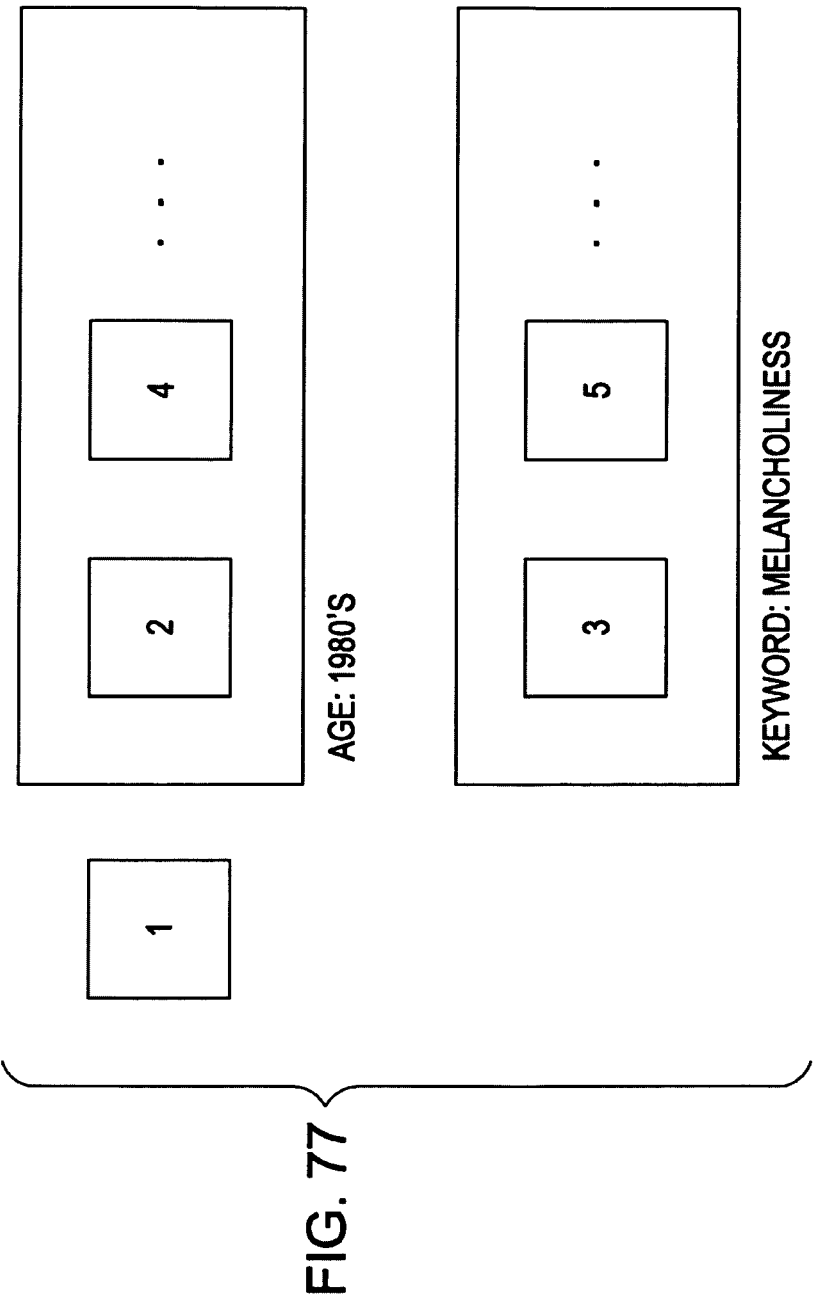
FIG. 77 illustrates display examples displayed on the display in the output unit.

As shown in FIG. 76, the line of the models of the related contents belonging to the content group 2 in the keyword category may be arranged closer to the model of the starting content than the line of the models of the related contents belonging to the content group 1 in the age category. In such a case, the lines are re-arranged and displayed as shown in FIG. 77 so that the line of the models of the related contents belonging the content group 1 in the age category is arranged closer to the model of the starting content than the line of the models of the related contents belonging to the content group 2 in the keyword category.

The lines of the content groups may be spaced from the model of the starting content by a distance responding to one importance and similarity.

Figure 78:
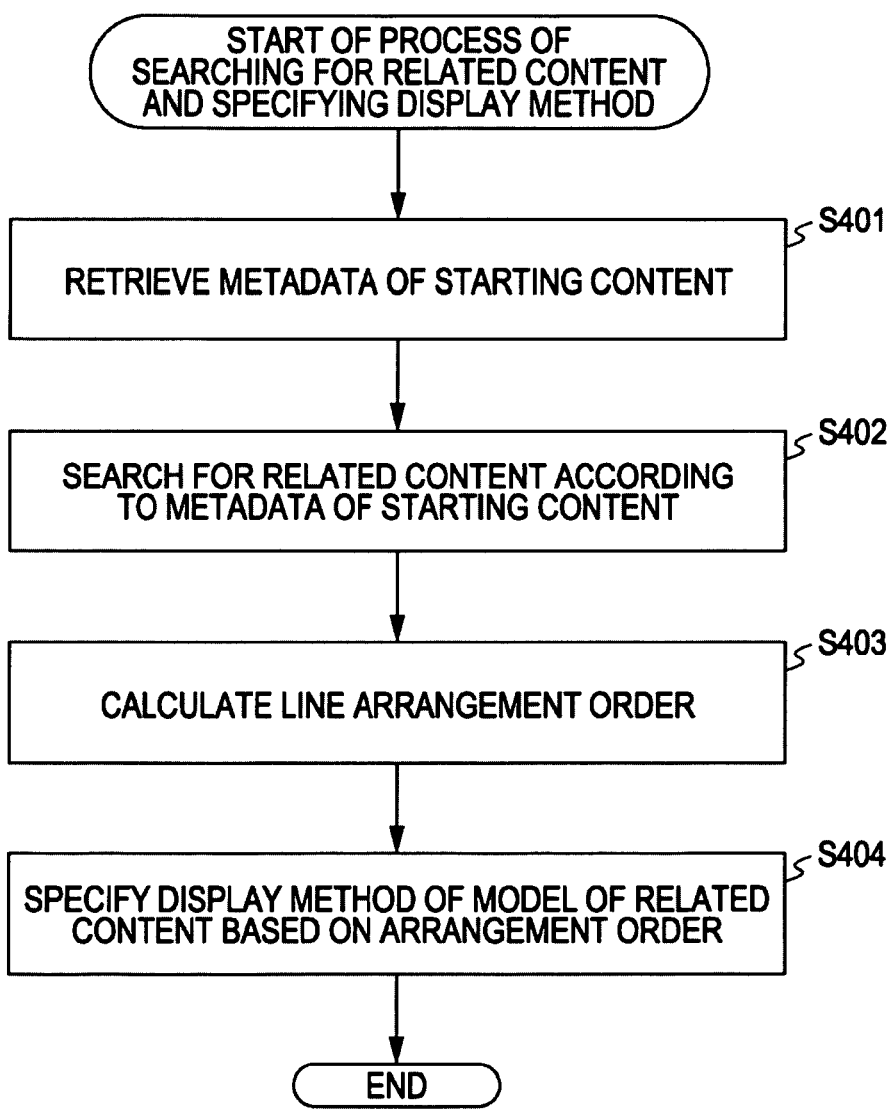
FIG. 78 is a flowchart illustrating a process for searching a related content and specifying a display method.

FIG. 78 is a flowchart illustrating a process of searching for the related content and specifying the display method. In step S401, the related content searcher 57 retrieves the metadata of the starting content from the metadata database 61. In step S402, the related content searcher 57 searches for the starting content based on the metadata of the starting content in the same manner as in step S302.

In step S403, the line arrangement order calculator 341 calculates the arrangement order on a per content group basis. For example, the line arrangement order calculator 341 calculates the line arrangement order on a per content group basis based on the importance of the metadata of the category. Furthermore, the line arrangement order calculator 341 may calculate the line arrangement order on a per content group basis based on the sum or the mean value of the similarities of the models of the content group.

In step S404, the related content display method specifier 342 specifies to the model parameter determiner 53 the display method of each model of the related content based on the arrangement order calculated in step S403. The process of searching for the related content and specifying the display method is thus completed.

The more closely the model of the related content is related to the starting content, the closer the model of the related content is arranged to the model of the starting content. The user can thus easily visibly recognize the relationship between the starting content and the related content. Each content is easily selected.

The selection history of the related content may be stored and from the selection history, a playlist for commanding a content to be played may be produced.

Figure 79:
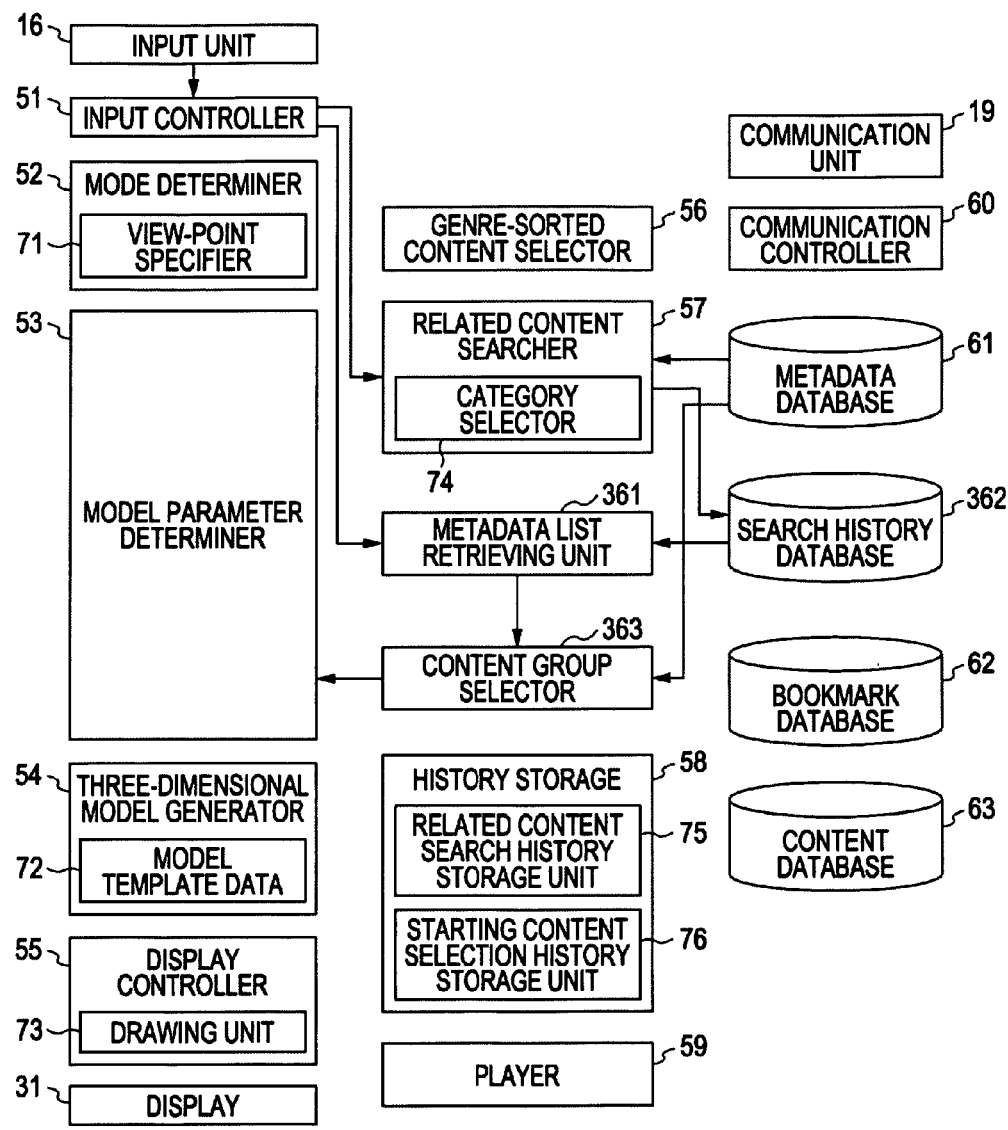
FIG. 79 is a functional block diagram illustrating a personal computer executing a program.

FIG. 79 is a functional block diagram illustrating yet another personal computer performing a program. The elements of FIG. 79 are implemented when the personal computer executes the program. The personal computer includes the input controller 51 controlling the input unit 16, the mode determiner 52, the model parameter determiner 53, the three-dimensional model generator 54, the display controller 55 controlling the display 31, the genre-sorted content selector 56, the related content searcher 57, the history storage 58, the player 59, the communication controller 60 controlling the communication unit 19, the metadata database 61, the bookmark database 62, and the content database 63. The personal computer further includes a metadata list retrieving unit 361, a search history database 362 and a content group selector 363.

In FIG. 79, elements identical to those illustrated in FIG. 2 are designated with the same reference numerals and the discussion thereof is omitted here.

The related content searcher 57 retrieves from the metadata database 61 the metadata attached to the selected starting content based on data input from the input controller 51 in response to the user operation on the input unit 16. In order to search for the related content, the related content searcher 57 further retrieves from the metadata database 61 the metadata attached to the content different from the starting content but having the same metadata value and the same category as the metadata attached to the starting content. As a result, the related content searcher 57 retrieves identification information identifying the related content. The identification information identifying the related content may be one of the content name and the ID number.

When a next starting content is selected from the related contents, the related content searcher 57 causes the search history database 362 to store, as a search history, metadata linking the selected next starting content to the immediately preceding starting content.

For example, when the next starting content is selected form the related contents, the related content searcher 57 causes the search history database 362 to store the metadata common to the selected next starting content and the immediately preceding starting content, namely, metadata having the same category and the same category value out of the metadata attached to both the selected next starting content and the immediately preceding starting content.

The search history database 362 stores the metadata linking the starting content and the starting content newly selected from the related contents related to the first starting content. More specifically, the search history database 362 stores the metadata common to both the starting content and the starting content newly selected from the related contents related to the first starting content in a manner such that the common metadata is associated with the starting content and the newly selected starting content. In other words, the metadata having the same category and the same category value out of the metadata attached to both the selected next starting content and the immediately preceding starting content is stored in association with the starting content and the newly selected starting content.

The search history database 362 stores as a session a metadata group used in the searching of a series of related contents. For example, the session may be defined as a predetermined period of time with respect to a user action of issuing a search command or a predetermined number of contents. The search history database 362 stores one of the order of the starting contents and the order of the related contents and one of the metadata of the starting content and the metadata of the related content within the session on a per session basis.

Figures 80, 81:
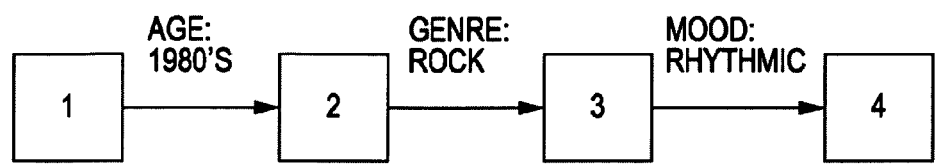
FIG. 80 illustrates metadata linking selected starting contents.
FIG. 81 illustrates an example of search history.

FIG. 80 illustrates an example of metadata to be stored on the search history database 362 and linking the successively selected related contents and the starting content.

As shown in FIG. 80, a related content related to a starting content labeled 1 is searched and hit in accordance with the starting content labeled 1, a starting content labeled 2 is selected from the related contents, related contents related to the starting content labeled 2 are searched and hit in accordance with the starting content labeled 2, and a starting content labeled 3 is selected from the related contents. Related contents related to the starting content labeled 3 are searched and hit in accordance with the starting content labeled 3, and a starting content labeled 4 is selected from the related contents. The starting content labeled 1, the starting content labeled 2, the starting content labeled 3 and the starting content labeled 4 are arranged in that order from the left.

As shown in FIG. 80, the metadata value in the age category of the metadata linking the starting content labeled 1 to the starting content labeled 2 is 1980's. The metadata value in the genre category of the metadata linking the starting content labeled 2 to the starting content labeled 3 is rock. The metadata value in the mood category of the metadata linking the starting content labeled 3 to the starting content labeled 4 is rhythmic.

More specifically, the metadata in the same category and having the same metadata as the metadata having a metadata value of 1980's in the age category attached to the starting content labeled 1 is also attached to the attached to the starting content labeled 2. The metadata in the same category and having the same metadata as the metadata having a metadata value of rock in the genre category attached to the starting content labeled 2 is also attached to the attached to the starting content labeled 3. Furthermore, the metadata in the same category and having the same metadata as the metadata having a metadata value of rhythmic in the mood category attached to the starting content labeled 3 is also attached to the attached to the starting content labeled 4.

In this way, the related contents related to the starting content labeled 1 are searched and hit in accordance with the starting content labeled 1, the starting content labeled 2 is selected from the related contents, the related contents related to the starting content 2 are searched and hit in accordance with the starting content labeled 2, and the starting content labeled 3 is selected from the related contents. The related contents related to the starting content labeled 3 are searched and hit in accordance with the starting content labeled 3, and the starting content labeled 4 is selected from the related contents. The search history database 362 stores the metadata with the respective starting contents associated therewith. The stored metadata include the metadata having a metadata value of 1980's in the age category linking the starting content labeled 1 to the starting content labeled 2, the metadata having a metadata value of rock in the genre category linking the starting content labeled 2 and the starting content labeled 3, the metadata having a metadata value of rhythmic in the mood category linking the starting content labeled 3 to the starting content labeled 4.

More specifically, the search history database 362 stores the session ID identifying the session, the order within the session, the category, and the metadata value in association with each other. As shown in FIG. 81, the search history database 362 associates the session ID having 1, the order within the session having 1, the age as the category, and 1980's as the metadata value in association with each other. The search history database 362 associates the session ID having 1, the order within the session having 2, the genre as the category, and rock as the metadata value in association with each other. The search history database 362 associates the session ID having 1, the order within the session having 3, the mood as the category, and rhythmic as the metadata value in association with each other.

The metadata list retrieving unit 361 retrieves the search history of an appropriate session from the search history database 362. The session for retrieving the search history may be selected based on data input from the input controller 51 in response to the user operation on the input unit 16. Alternatively, the session for retrieving the search history may be the one having at the head thereof the metadata attached to the starting content currently being played or the starting content with the model thereof being displayed.

The search history of the appropriate session retrieved from the search history database 362 by the metadata list retrieving unit 361 is referred to as a metadata list.

The metadata list retrieving unit 361 supplies the metadata list to the content group selector 363.

The content group selector 363 retrieves from the metadata database 61 the metadata matching the metadata list supplied from the metadata list retrieving unit 361 and links the contents in order to fit the metadata into the metadata list. Since there are typically a plurality of contents having a predetermined metadata value in a predetermined category, the metadata matching the metadata list cannot be uniquely determined.

The metadata may be randomly determined or the metadata of a content group sharing metadata unrelated to the metadata list may be selected. In this way, the metadata may be selected based on some sort of similarity.

Figures 82, 83:
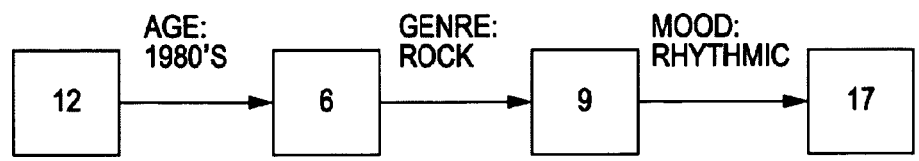
FIG. 82 illustrates an example of metadata.
FIG. 83 illustrates linked contents.

If the search history of FIG. 81 is selected as a metadata list, the content group selector 363 retrieves from the metadata database 61 the metadata of FIG. 82. As shown in FIG. 82, the content group selector 363 retrieves the metadata from the metadata database 61. More specifically, the content group selector 363 retrieves from the metadata database 61 metadata having a metadata value of 1980's in the age category and metadata having a metadata value of rock in the genre category attached to a content identified by content 6 as ID. The content group selector 363 retrieves from the metadata database 61 metadata having a metadata value of rock in the genre category and metadata having a metadata value of rhythmic in the mood category attached to a content identified by content 9 as ID. The content group selector 363 retrieves from the metadata database 61 metadata having a metadata value of melancholiness in the keyword category and metadata having a metadata value of 1980's in the age category attached to a content identified by content 12 as ID. The content group selector 363 retrieves from the metadata database 61 metadata having a metadata value of rhythmic in the mood category and metadata having a metadata value of 2000's in the age category attached to a content identified by content 17 as ID.

As shown in FIG. 81, the starting contents are linked in the metadata list by the metadata having a metadata value of 1980's in the age category, the metadata having a metadata value of rock in the genre category and the metadata having a metadata value of rhythmic in the mood category. As shown in FIG. 83, the content group selector 363 selects the contents so that the metadata fits in the metadata list. The content group selector 363 selects the content identified by content 12 as ID, the content identified by content 6 as ID, the content identified by content 9 as ID and the content identified by content 17 as ID in that order. More specifically, the content group selector 363 selects the contents in the following order: the content with the metadata having a metadata value of 1980's in the age category, the content with the metadata having a metadata value of 1980's in the age category and the metadata having a metadata value of rock in the genre category, the content with the metadata having a metadata value of rock in the genre category and the metadata having a metadata value of rhythmic in the mood category, and the content with the metadata having a metadata value of rhythmic in the mood category.

Figure 84:
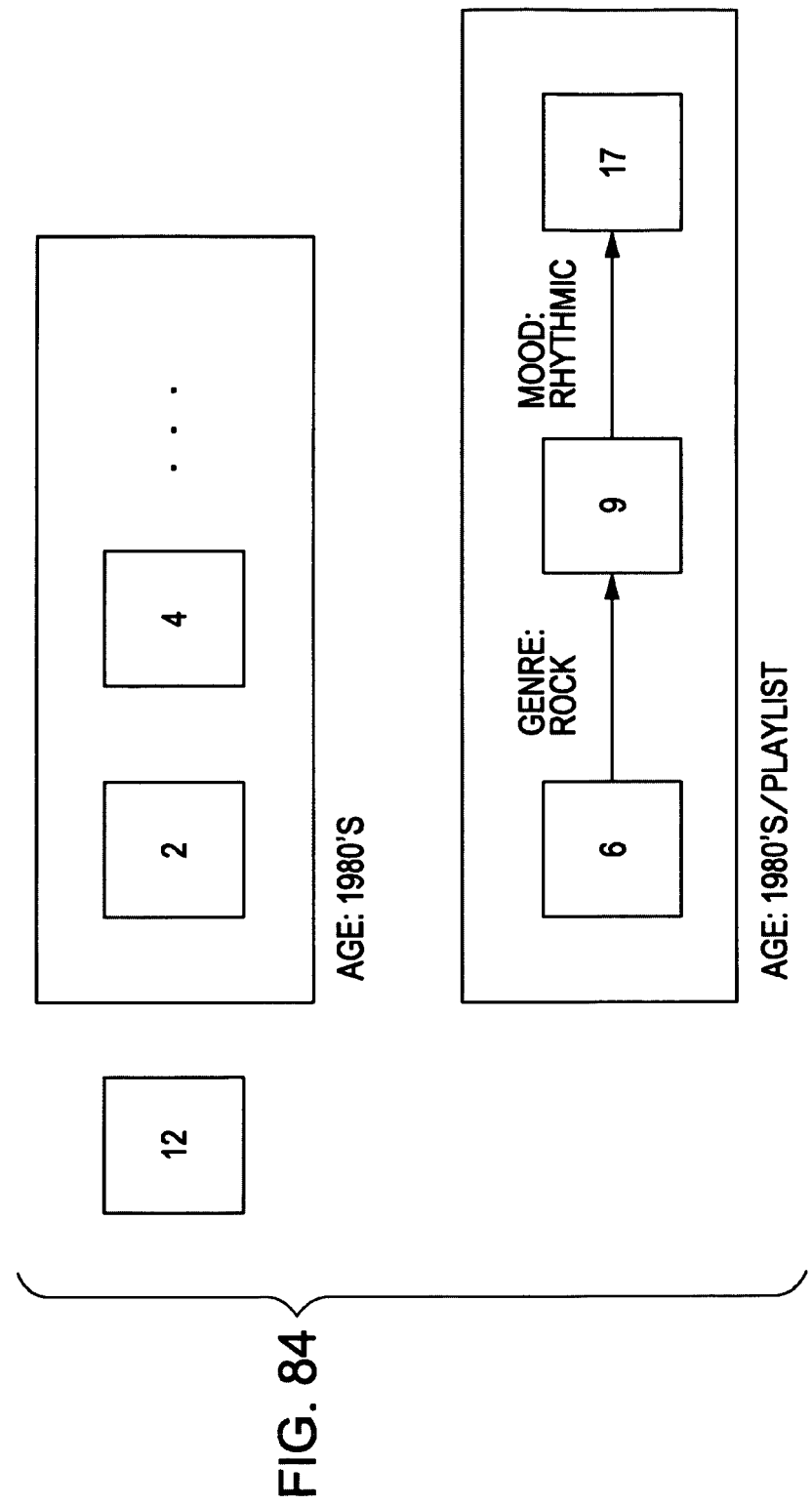
FIG. 84 illustrates a display example displayed on a display in an output unit.

The models of the contents linked in accordance with the metadata list may be displayed in the same way as the models of the related contents. Optionally, the contents linked in accordance with the metadata list may be displayed using arrow-headed lines as shown in FIG. 84.

Figure 85:
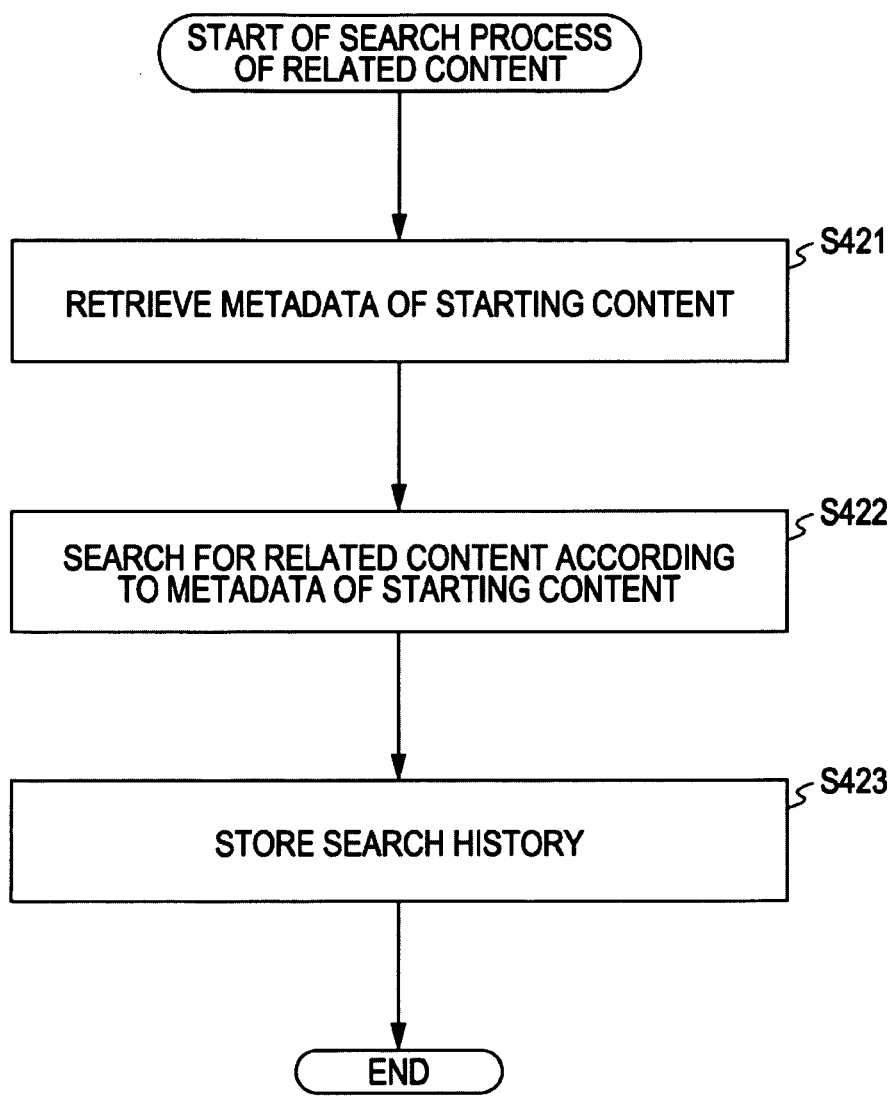
FIG. 85 is a flowchart illustrating a search process of the related content.

FIG. 85 is a flowchart illustrating a search process of the related content. In step S421, the related content searcher 57 retrieves the metadata of the starting content from the metadata database 61. In step S422, the related content searcher 57 searches for the related content in accordance with the metadata of the starting content. For example, in step S422, the related content searcher 57 retrieves from the metadata database 61 the metadata having the same metadata value as the metadata attached to the starting content but attached to a content different from the starting content. In order to search for the related content, the related content searcher 57 retrieves identification information identifying the related content to which the metadata identical to the metadata of the starting content is attached.

In step S423, the search history database 362 stores the search history supplied from the related content searcher 57. The search process of the related content is thus completed.

For example, in step S423, the search history database 362 stores the search history containing the session ID identifying the session, the order within the session, the category and the metadata value with each associated with the other.

Figure 86:
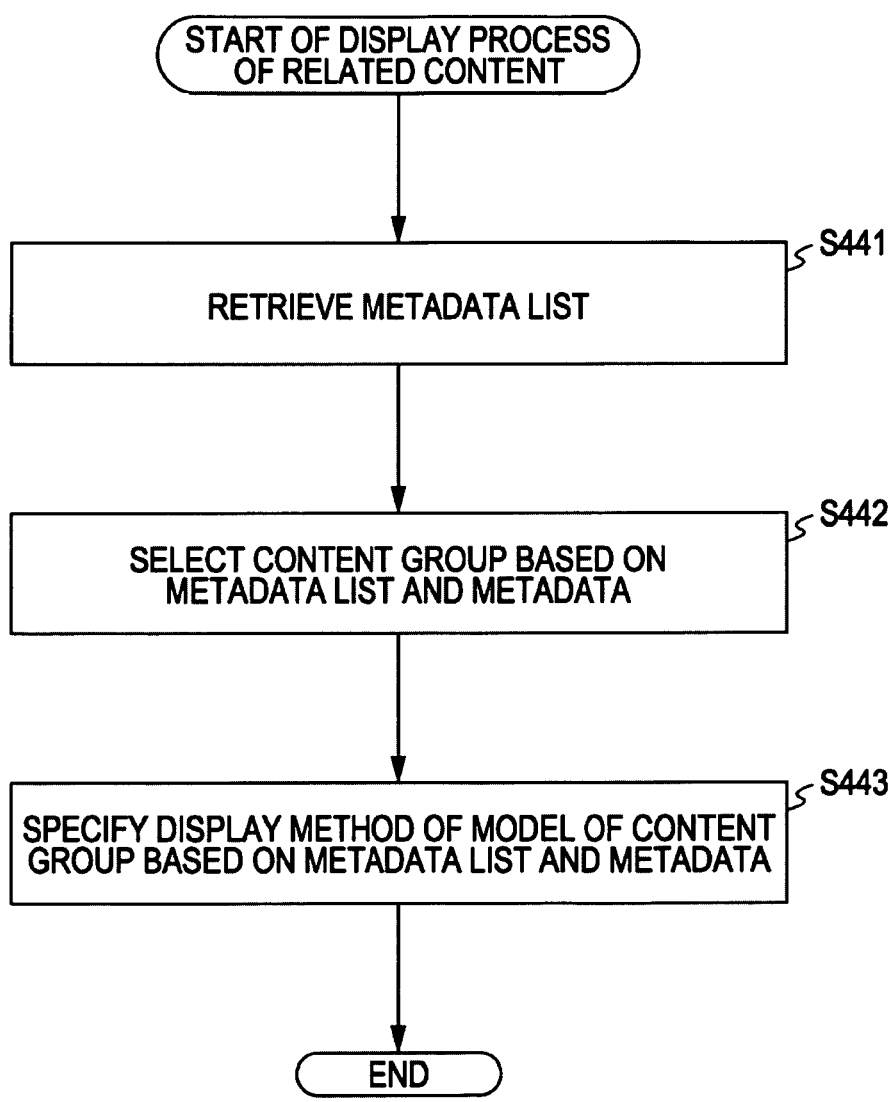
FIG. 86 is a flowchart illustrating a display process of the related content.

FIG. 86 is a flowchart illustrating a display process of the related content. In step S441, the metadata list retrieving unit 361 retrieves the metadata list from the search history database 362. For example, in step S441, the metadata list retrieving unit 361 retrieves from the search history database 362 as the metadata list the search history related to a current session or a session specified by the user.

In step S442, the content group selector 363 selects a content group based on the metadata list retrieved in step S441 and the metadata retrieved from the metadata database 61. For example, in step S442, the content group selector 363 selects a content having the metadata matching the metadata list and links the selected contents. The content group selector 363 thus selects the content group.

In step S443, the content group selector 363 specifies to the model parameter determiner 53 the display method of each model of the content group selected in step S442 based on the metadata list and the metadata. The display process of the related content is thus completed.

A learning process of preference is described below.

Figure 87:
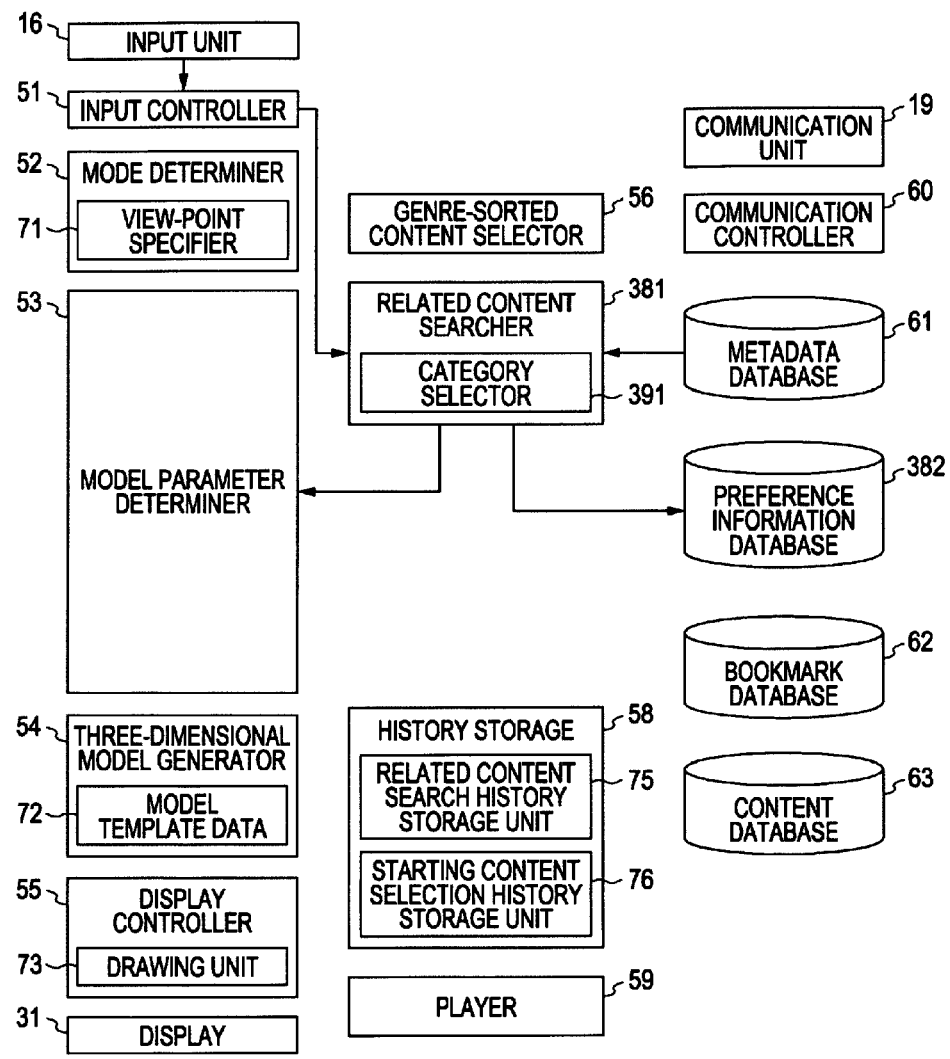
FIG. 87 is a functional block diagram illustrating a personal computer executing a program.

FIG. 87 is a functional block diagram of another personal computer performing a program. The elements of FIG. 87 are implemented when the personal computer executes the program. The personal computer includes the input controller 51 controlling the input unit 16, the mode determiner 52, the model parameter determiner 53, the three-dimensional model generator 54, the display controller 55 controlling the display 31, the genre-sorted content selector 56, the related content searcher 57, the history storage 58, the player 59, the communication controller 60 controlling the communication unit 19, the metadata database 61, the bookmark database 62, and the content database 63. The personal computer further includes a related content searcher 381 and a preference information database 382.

In FIG. 87, elements identical to those illustrated in FIG. 2 are designated with the same reference numerals and the discussion thereof is omitted here.

The related content searcher 381 retrieves from the metadata database 61 the metadata attached to the selected starting content based on data input from the input controller 51 in response to the user operation on the input unit 16. The related content searcher 381 searches for the related content by retrieving from the metadata database 61 the metadata attached to a content different from the starting content but belonging to the same category as the metadata of the starting content. As a result, the related content searcher 381 retrieves the identification information identifying the related content. The identification information identifying the identification information may be one of the content name and the ID number.

When a starting content is selected from among the related contents, the related content searcher 381 causes the preference information database 382 to store, as preference information indicating the preference of the user, information identifying the selected starting content and the metadata thereof. When a next starting content is selected from among the related contents, the related content searcher 381 causes the preference information database 382 to store, as the preference information, metadata linking the selected next starting content to the immediately preceding starting content, information identifying the starting content, the metadata of the related content and the metadata of the starting content.

The related content searcher 381 includes a category selector 391. The category selector 391 selects a category of the related content searched and hit by the related content searcher 381.

The preference information database 382 stores, as the preference information, the metadata linking the selected next starting content to the immediately preceding starting content, the information identifying the starting content, the metadata of the related content and the metadata of the starting content.

Figures 88, 89:
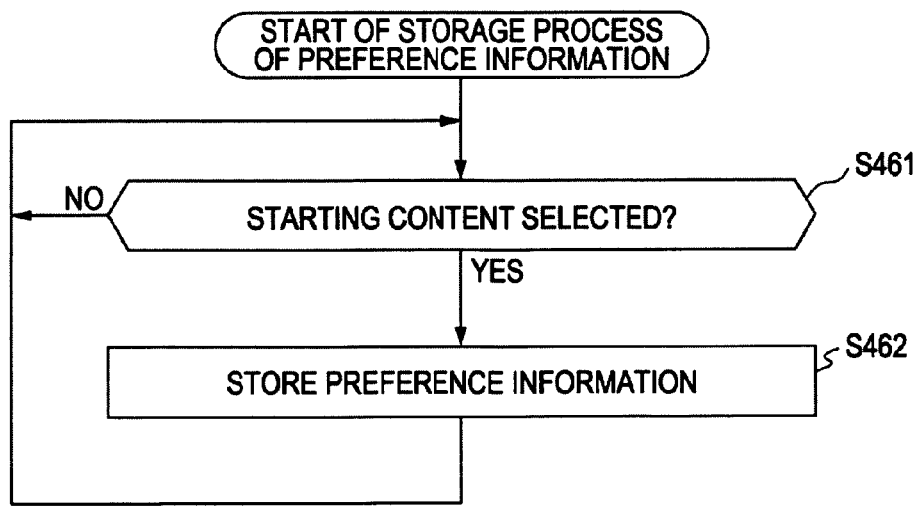
FIG. 88 illustrates preference information as a vector.
FIG. 89 is a flowchart illustrating a storage process of the preference information.

With the metadata of FIG. 55 stored on the metadata database 61, the content 1 may be first selected as a starting content and then the content 3 may then be selected as a next starting content. The related content searcher 381 handles the metadata 1 through the metadata 5 attached to the content 1 as a vector, and the metadata 1 through the metadata 5 attached to the content 3 as a vector, sums the two vectors and sets the summing results as the preference information indicating the preference of the user. For example, FIG. 88 shows the preference information as the vectors. The value of the metadata 1 is 11, the value of the metadata 2 is 7, the value of the metadata 3 is 5, the value of the metadata 4 is 11 and the value of the metadata 5 is 9.

The preference information stored on the preference information database 382 can be used in any recommendation system. The preference information can also be used in the search process of the related content based on the user's preference previously discussed with reference to FIGS. 58 through 61.

FIG. 89 is a flowchart illustrating a storage process of the preference information. The related content searcher 381 determines in step S461 whether a starting content has been selected, based on data input from the input controller 51 in response to the user operation on the input unit 16. If it is determined in step S461 that no starting content has been selected, the determination process in step S461 is repeated until a starting content is selected.

If it is determined in step S461 that a starting content has been selected, processing proceeds to step S462. In step S462, the related content searcher 381 causes the preference information database 382 to store the preference information. Processing returns to step S461 subsequent to step S462.

When a next starting content is selected from among the related contents, the related content searcher 381 causes the preference information database 382 to store the preference information in step S462. The preference information contains the metadata linking the selected next starting content to the immediately preceding starting content, the information identifying the starting content, the metadata of the related content and the metadata of the starting content. If a plurality of starting contents are selected, the related content searcher 381 handles the metadata attached to each starting content as a vector, sums the values of the metadata for each piece of metadata and causes the preference information database 382 to store the summing results as the preference information indicating the user's preference.

This arrangement allows the user to be freed from expressly evaluating each content as to whether the user likes the content or not. By simply performing search operations, the user can accumulate information for content recommendation. Workload on the user is thus reduced.

A process of narrowing and selecting the related content is described below.

Figure 90:
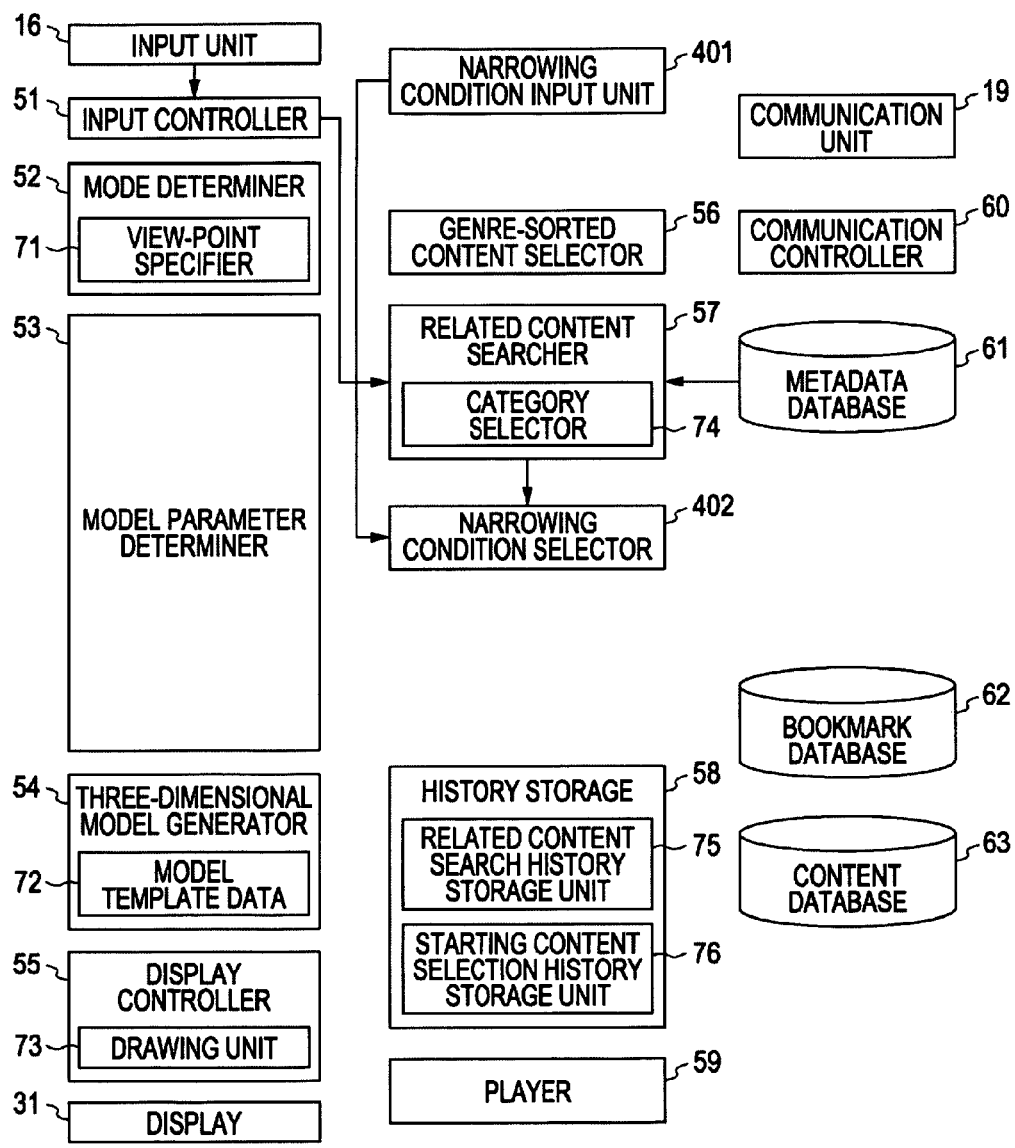
FIG. 90 is a functional block diagram illustrating a personal computer executing a program.

FIG. 90 is a functional block diagram of another personal computer performing a program. The elements of FIG. 90 are implemented when the personal computer executes the program. The personal computer includes the input controller 51 controlling the input unit 16, the mode determiner 52, the model parameter determiner 53, the three-dimensional model generator 54, the display controller 55 controlling the display 31, the genre-sorted content selector 56, the related content searcher 57, the history storage 58, the player 59, the communication controller 60 controlling the communication unit 19, the metadata database 61, the bookmark database 62, and the content database 63. The personal computer further includes a narrowing condition input unit 401 and a narrowing condition selector 402.

In FIG. 90, elements identical to those illustrated in FIG. 2 are designated with the same reference numerals and the discussion thereof is omitted here.

The related content searcher 57 retrieves from the metadata database 61 the metadata attached to the selected starting content in response to data input from the input controller 51 in response to a user operation applied to the input unit 16. The related content searcher 57 further retrieves from the metadata database 61 the metadata having the same category value as the metadata of the starting content but attached to a content different from the starting content. The related content searcher 57 thus searches for the related content. As a result, the related content searcher 57 retrieves identification information identifying the related content. The identification information identifying the related content is one of a content name and an ID number.

The related content searcher 57 supplies the narrowing condition selector 402 with the identification information identifying the related content as a related content list.

The narrowing condition input unit 401 retrieves metadata for narrowing and selecting the related contents in a process separate from the process of selecting the starting content or searching for the related content and supplies the retrieved metadata to the narrowing condition selector 402. For example, the narrowing condition input unit 401 retrieves the metadata by operating the input unit 16 or receiving the metadata via the communication unit 19. Furthermore, the narrowing condition input unit 401 can retrieve the metadata by storing metadata specified beforehand by the user and reading the stored metadata.

Alternatively, the input controller 51 may supply the narrowing condition selector 402 with the metadata that the user has specified using the input unit 16 as the metadata for narrowing and selecting the related contents.

With the metadata supplied from the narrowing condition input unit 401 as a condition, the narrowing condition selector 402 selects contents that satisfy the condition. For example, the narrowing condition selector 402 selects, from the related contents presented in a list, the contents having the same metadata as the metadata supplied from the narrowing condition input unit 401.

Figures 91, 92:
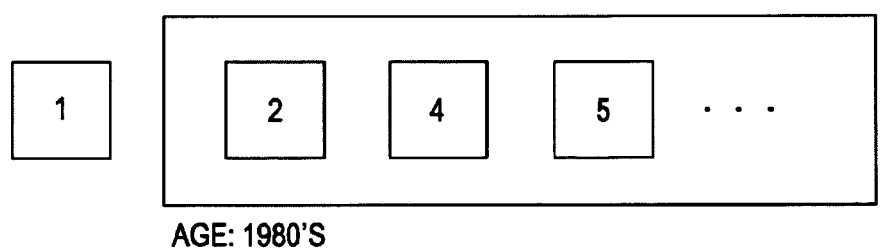
FIG. 91 illustrates an example of metadata.
FIG. 92 illustrates a display example displayed on a display in an output unit.

FIG. 91 illustrates an example of metadata attached to the content. As shown in FIG. 91, the content identified by content 1 as ID is a starting content and contents identified by content 2 through 5 as IDs are related contents.

The starting content identified by content 1 has the metadata having a metadata value of 1980's in the age category and the metadata having a metadata value of melancholiness in the keyword category.

The related content identified by content 2 has the metadata having a metadata value of 1980's in the age category and the metadata having a metadata value of melancholiness in the keyword category. The related content identified by content 3 has the metadata having a metadata value of 1980's in the age category and the metadata having a metadata value of comical in the keyword category. The related content identified by content 4 has the metadata having a metadata value of 1980's in the age category and the metadata having a metadata value of passion in the keyword category. The related content identified by content 5 has the metadata having a metadata value of 1980's in the age category and the metadata having a metadata value of melancholiness in the keyword category.

Age is now selected as a search category of the related contents. Displayed on the display 31 as shown in FIG. 92 are a model of a related content identified by content 2, a model of a related content identified by content 4 and a model of related content identified by content 5, each with the metadata having a metadata value of 1980's in the age category.

The narrowing condition selector 402 receives the metadata having a metadata value of melancholiness in the keyword category from the narrowing condition input unit 401. The narrowing condition selector 402 then selects the related content identified by content 2 and the related content identified by content 5, each with a metadata value of melancholiness in the keyword category, from among the related contents identified by contents 2, 4 and 5.

Figure 93:
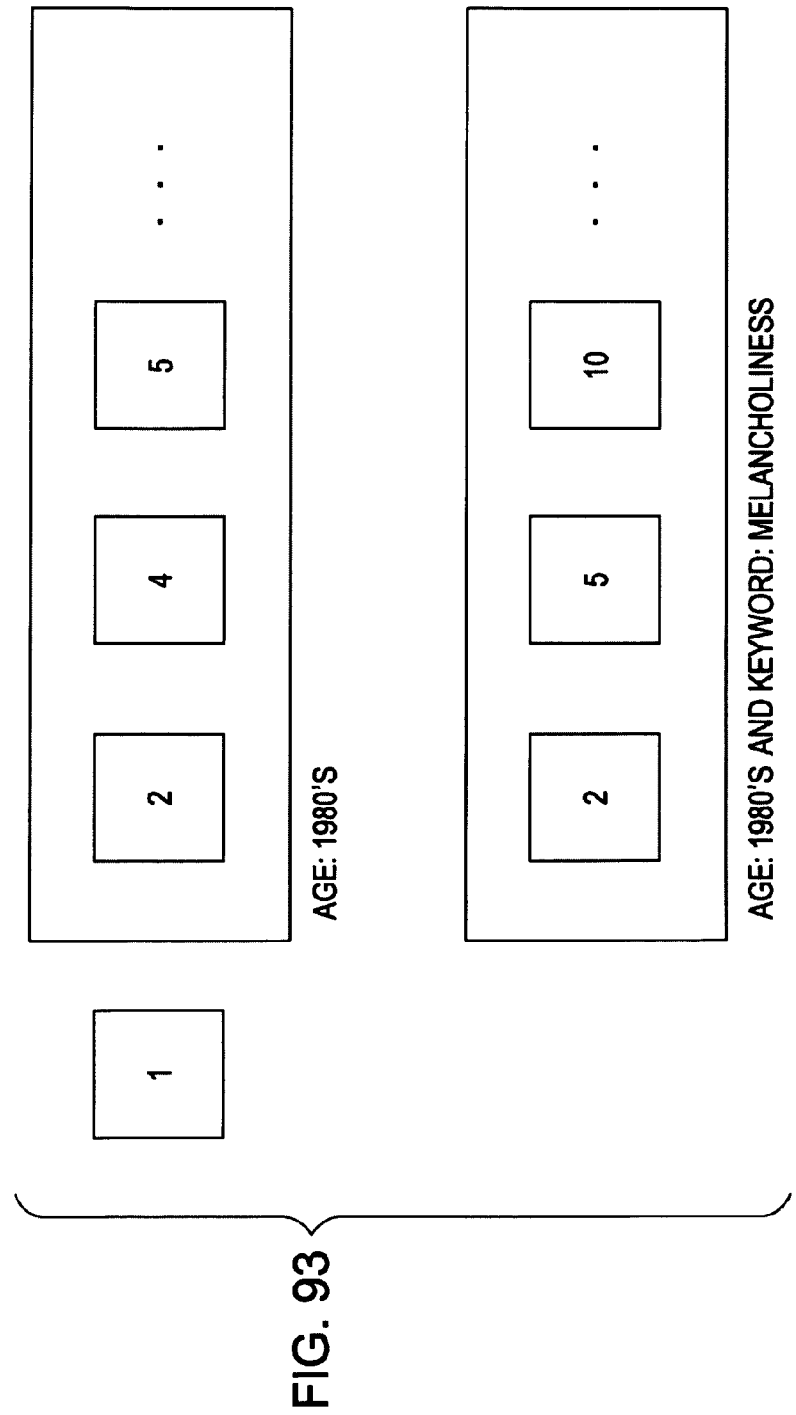
FIG. 93 illustrates a display example displayed on the display in the output unit.

With reference to FIG. 93, the display 31 displays a line of the models of the related contents selected according to a metadata value of melancholiness in the keyword category, namely, a line of the models of the related contents identified by contents 2 and 5 in parallel with a line of the models of the related contents identified by contents 2, 4 and 5.

As shown in FIG. 93, the line of models of narrowed and selected related contents is labeled with a selected category and a metadata value in that category and as narrowing and selection conditions a category and a metadata value in that category.

Figure 94:
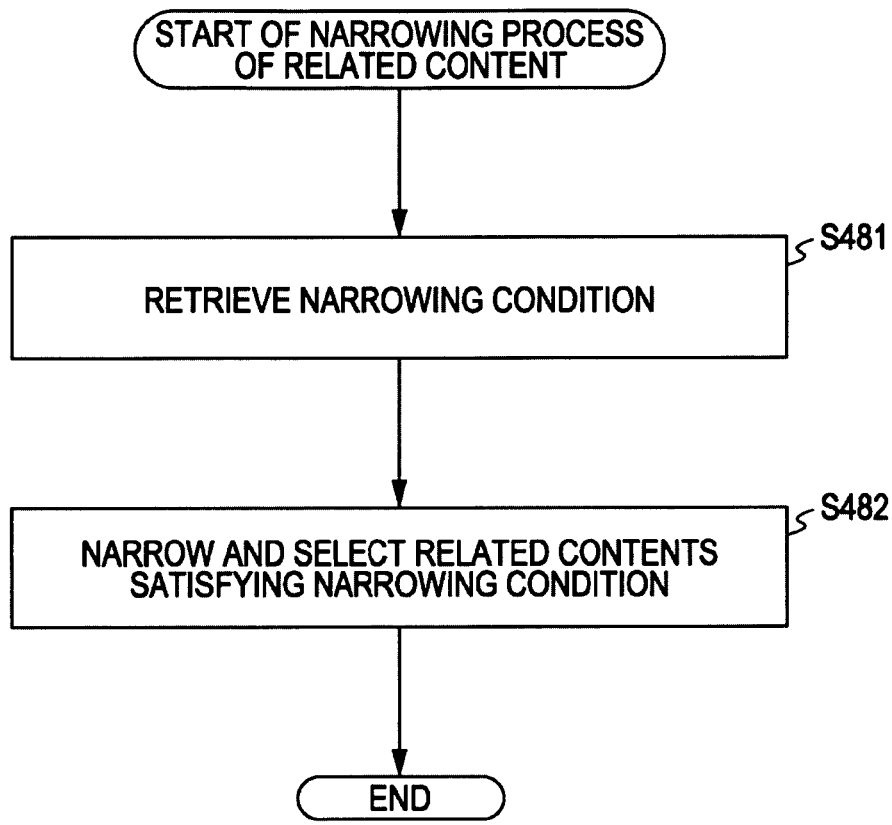
FIG. 94 is a flowchart illustrating a narrowing process of the related contents.

FIG. 94 is a flowchart illustrating a narrowing process of the related contents. In step S481, the narrowing condition input unit 401 retrieves a narrowing condition. For example, in step S481, the narrowing condition input unit 401 retrieves a narrowing condition composed of a category of metadata and a metadata value in that category provided in response to an instruction from the user.

In step S482, the narrowing condition selector 402 narrows and selects the related contents. The process of narrowing and selecting the related contents is thus completed.

For example, in step S482, the narrowing condition selector 402 selects, from among the related contents, the related content having the metadata in the category indicated in the narrowing condition and the metadata value indicated in the narrowing condition.

By displaying the models of the contents prior to and subsequent to the narrowing and selection process in parallel, the user can easily find an appropriate condition in the content search.

Windows and layout may be differentiated not only in two-dimensional display, but also in both two-dimensional and three-dimensional display. By presenting the modes with two-dimensional and three-dimensional mixed displays, function to function shifting can be easily performed. The user can intuitively recognize the modes of the contents.

Recommendations provided by the computer are not unilateral but takes into user's interests. The computer displays information regarding candidate contents and related contents of interest to the user in a flexible way.

A plurality of contents related to any content are displayed while information about the contents is displayed in a manner such that the relationship of the contents and the grouping of the contents are easily recognized.

In the related content search, a second content related to a first content is displayed, and a new content related to the second content is further displayed. In such a presentation of the contents, information is basically continually presented from a starting point from left to right on the display screen. The user can easily come to grips with the current user's operation position on the screen.

A three-dimensional display method is used to introduce a new content serving as a reference. Layer presentation is used to display contents in a continual manner but with a distinct delimitation inserted between layers of contents. The user can intuitively learn the structure of the layout of contents.

The use of the three-dimensional structure eliminates the need for displaying related contents to be displayed in a two-dimensional layout of the same plane in a congested manner. Closely related contents are neatly displayed in a close location without any difficulty.

Information regarding a content related to any other content is displayed along with a predetermined pieces of information of contents for comparison purposes. The user can thus enjoy selecting a content like selecting a content while viewing a catalog as the user's interest shifts, and then feel convinced with the selection results.

Since a plurality of related contents are displayed, an unviewed content can be mixed with viewed contents. This serves as an incentive to the user's feeling to view all contents and thus draws the user's interest in the contents.

Since three-dimensional depth is given to content information display, the user feels that each content has something therewithin rather than simply mere digital data. The user is thus motivated to be in possession of and to collect the contents. The user feels that the content deserves the cost thereof.

The results of repeated related searching are summarized in conjunction with relationship of the starting contents and then displayed along with relation reason. The user can briefly recognize the shifting of the user's own interest. Since not only the user but also the content provider can learn how such interest shifting has been caused, such data may be used in marketing purposes.

Instead of displaying the thumbnail image of the related content, characters representing the related content such as a title of the related content may be displayed. The character representing the related content may be displayed together with the thumbnail image of the related content.

When the metadata of the content is read and displayed, information relating to the content is also displayed. The second content linked to the first content is searched for and display of a search history of content search is controlled. The content search is performed in accordance with one of the first image and the first character, each indicating the first content, one of the second image and the second character, each indicating the second content and the link information linking the first content to the second content. When the contents are tracked, a relation of the tracked contents is viewed and recognized at a glance.

In the above embodiments, the present invention is applied to the personal computers. The present invention is applicable to not only the personal computer but also a variety of consumer electronics. The consumer electronics include mobile devices such as a cellular phone, and stationary devices such as a set-top box and a hard disk recorder.

Another apparatus such as a server may include the metadata database 61, the bookmark database 62, the content database 63, the viewing information database 202, the user preference database 262, the user viewing information database 282, the other-domain content metadata database 303, the other-domain content database 305, the search history database 362 and the preference information database 382. A variety of data including metadata may be read from or recorded onto the server via a network and the communication unit 19.

The above-referenced series of steps may be performed using hardware or software.

The program to be executed by the computer may be performed in the time-series order discussed previously, or may be performed in parallel or may be performed at a timing call is placed.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus comprising:
   a processor that executes;
   search means for searching for a second media file linked to a first media file;
   display control means for controlling display of a search history of media file search performed in accordance with the first media file, the second media file and link information linking the first media file to the second media file; and
   generating means for generating a three-dimensional model to be used by the display control means, the three-dimensional model including a first layer having a graphic representing the first media file arranged therewithin, a second layer having the graphic representing the first media file, a graphic representing the second media file, and text indicating the link information between the first media file and the second media file arranged therewithin;
   wherein when the graphic representing the first media file is selected, the first layer is changed so that an x-axis, a y-axis, and a z-axis of the first layer is at a slant angle with respect to a screen of a display;
   the second layer having the selected graphic representing the first media file and the graphic representing the second media file arranged in parallel with the x-axis and the y-axis of the first layer, wherein the second layer is displayed and overlays the first layer at a predetermined distance in a direction along the z-axis of the first layer; and
   wherein the graphic representing the first media file and the graphic representing the second media file in the second layer are arranged along the x-axis of the second layer, and wherein the graphic representing the second media file includes a plurality of categories by which the first and second media files are related, wherein the link information indicates both a category related to each of the first media file and the second media file and a specific name from the category, the link information displayed at a negative position along the y-axis of the second media file, wherein each category includes items arranged in a line parallel to the x-axis but offset along the y-axis of the second layer.

2. The display control apparatus according to claim 1, wherein the graphic representing the first media file and the graphic representing the second media file include a thumbnail image.

3. The display control apparatus according to claim 1, wherein the search means searches for the second media file having the same metadata as metadata of the first media file.

4. The display control apparatus according to claim 1, wherein the search means searches for the second media file linked to the first media file in accordance with at least part of metadata attached to each of the first media file and the second media file.

5. A computer implemented display method comprising steps of:
   using at least a processor of the computer to:
   search for a second media file linked to a first media file;
   display a search history of media file search performed in accordance with the first media file, the second media file and link information linking the first media file to the second media file; and
   generate a three-dimensional model including a first layer having a graphic representing the first media file arranged therewithin, a second layer having the graphic representing the first media file, a graphic representing the second media file, and text indicating the link information between the first media file and the second media file arranged therewithin;
   wherein when the graphic representing the first media file is selected, the first layer is changed so that an x-axis, a y-axis, and a z-axis of the first layer is at a slant angle with respect to a screen of a display;
   the second layer having the selected graphic representing the first media file and the graphic representing the second media file arranged in parallel with the x-axis and the y-axis of the first layer, wherein the second layer is displayed and overlays the first layer at a predetermined distance in a direction along the z-axis of the first layer; and
   wherein the graphic representing the first media file and the graphic representing the second media file in the second layer are arranged along the x-axis of the second layer, and wherein the graphic representing the second media file includes a plurality of categories by which the first and second media files are related, wherein the link information indicates both a category related to each of the first media file and the second media file and a specific name from the category, the link information displayed at a negative position along the y-axis of the second media file, wherein each category includes items arranged in a line parallel to the x-axis but offset along the y-axis of the second layer.

6. A non-transitory computer readable storage medium storing a computer program, which when executed by a computer performs a display control method, the method comprising the steps of:

searching for a second media file linked to a first media file;

controlling display of a search history of media file search performed in accordance with the first media file, the second media file, and link information linking the first media file to the second media file; and generating a three-dimensional model including a first layer having a graphic representing the first media file arranged therewithin, a second layer having the graphic representing the first media file, a graphic representing the second media file, and text indicating the link information between the first media file and the second media file arranged therewithin;

wherein when the graphic representing the first media file is selected, the first layer is changed so that an x-axis, a y-axis, and a z-axis of the first layer is at a slant angle with respect to a screen of a display;

the second layer having the selected graphic representing the first media file and the graphic representing the second media file content is arranged in parallel with the x-axis and the y-axis of the first layer, wherein the second layer is displayed and overlays the first layer at a predetermined distance in a direction along the z-axis of the first layer; and wherein the graphic representing the first media file and the graphic representing the second media file in the second layer are arranged along the x-axis of the second layer, and wherein the graphic representing the second media file includes a plurality of categories by which the first and second media files are related, wherein the link information indicates both a category related to each of the first media file and the second media file and a specific name from the category, the link information displayed at a negative position along the y-axis of the second media file, wherein each category includes items arranged in a line parallel to the x-axis but offset along the y-axis of the second layer.

7. A display control apparatus according to claim 1, wherein the graphic representing the first media file in the first layer and the graphic representing the first media file in the second layer have the same positions along the x-axis and the y-axis of the first layer and the second layer.

\* \* \* \* \*